(12) United States Patent
Niikura et al.

(10) Patent No.: US 10,706,790 B2
(45) Date of Patent: Jul. 7, 2020

(54) DISPLAY DEVICE, DISPLAY MODULE INCLUDING THE DISPLAY DEVICE, AND ELECTRONIC DEVICE INCLUDING THE DISPLAY DEVICE OR THE DISPLAY MODULE

(71) Applicant: SEMICONDUCTOR ENERGY LABORATORY CO., LTD., Atsugi-shi, Kanagawa-ken (JP)

(72) Inventors: Yasuhiro Niikura, Tokyo (JP); Makoto Ikenaga, Kyoto (JP); Daisuke Kubota, Kanagawa (JP); Ryo Hatsumi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 217 days.

(21) Appl. No.: 15/529,363

(22) PCT Filed: Nov. 26, 2015

(86) PCT No.: PCT/IB2015/059136
§ 371 (c)(1),
(2) Date: May 24, 2017

(87) PCT Pub. No.: WO2016/087999
PCT Pub. Date: Jun. 9, 2016

(65) Prior Publication Data
US 2018/0336840 A1    Nov. 22, 2018

(30) Foreign Application Priority Data

Dec. 1, 2014 (JP) ................................ 2014-243436
Mar. 9, 2015 (JP) ................................ 2015-045866
May 29, 2015 (JP) ................................ 2015-109635

(51) Int. Cl.
G09G 3/34 (2006.01)
C09K 19/02 (2006.01)
G02F 1/139 (2006.01)

(52) U.S. Cl.
CPC ............. *G09G 3/34* (2013.01); *C09K 19/02* (2013.01); *G02F 1/139* (2013.01); *G02F 1/1396* (2013.01)

(58) Field of Classification Search
CPC .......... G09G 3/35; C09K 19/02; G02F 1/139; G02F 1/1396
See application file for complete search history.

(56) References Cited

U.S. PATENT DOCUMENTS 6,191,833 B1    2/2001    Hirakata
6,423,385 B1    7/2002    Kagawa et al.
(Continued)

FOREIGN PATENT DOCUMENTS

CN    001416004 A    5/2003
CN    001800931 A    7/2006
(Continued)

OTHER PUBLICATIONS

International Search Report (Application No. PCT/IB2015/059136) dated Mar. 15, 2016.
(Continued)

*Primary Examiner* — Ariel A Balaoing
(74) *Attorney, Agent, or Firm* — Nixon Peabody LLP; Jeffrey L. Costellia

(57) ABSTRACT

Provided is a novel display device without deterioration of display quality or a novel display device in which flickering due to a reduced refresh rate is suppressed. The display device includes a pixel for displaying a still image at a frame frequency of less than or equal to 1 Hz. The pixel includes a liquid crystal layer. The liquid crystal layer includes a
(Continued)

molecule whose dipole moment is greater than or equal to 0 debye and less than or equal to 3 debye. Thus, flickering due to a reduced refresh rate can be suppressed, which leads to an improvement in display quality.

10 Claims, 54 Drawing Sheets

(56) References Cited

U.S. PATENT DOCUMENTS

| | | | |
|---|---|---|---|
| 6,704,082 | B2 | 3/2004 | Tomioka et al. |
| 6,943,861 | B2 | 9/2005 | Tomioka et al. |
| 7,084,849 | B2 | 8/2006 | Noguchi et al. |
| 7,297,377 | B2 | 11/2007 | Kagawa et al. |
| 7,758,772 | B2 | 7/2010 | Roberts et al. |
| 7,843,533 | B2 | 11/2010 | Noguchi et al. |
| 9,129,568 | B2 | 9/2015 | Kubota et al. |
| 2001/0048498 | A1* | 12/2001 | Tomioka ............ G02F 1/133723 349/123 |
| 2002/0033923 | A1 | 3/2002 | Shimoshikiryou et al. |
| 2002/0093619 | A1 | 7/2002 | Furuie |
| 2002/0186340 | A1 | 12/2002 | Kagawa et al. |
| 2003/0112213 | A1 | 6/2003 | Noguchi et al. |
| 2003/0201422 | A1* | 10/2003 | Ohe .................. C09K 19/3003 252/299.01 |
| 2004/0179165 | A1* | 9/2004 | Kinoshita ......... G02F 1/133305 349/158 |
| 2007/0125981 | A1 | 6/2007 | Roberts et al. |
| 2008/0048966 | A1 | 2/2008 | Liao et al. |
| 2010/0060836 | A1 | 3/2010 | Kunimatsu et al. |
| 2011/0037914 | A1 | 2/2011 | Noguchi et al. |
| 2011/0090183 | A1 | 4/2011 | Yamazaki et al. |
| 2011/0090204 | A1 | 4/2011 | Yamazaki et al. |
| 2011/0102696 | A1 | 5/2011 | Yamazaki et al. |
| 2011/0115839 | A1 | 5/2011 | Takahashi et al. |
| 2011/0128461 | A1 | 6/2011 | Koyama et al. |
| 2011/0134350 | A1 | 6/2011 | Yamazaki et al. |
| 2011/0148826 | A1 | 6/2011 | Koyama et al. |
| 2011/0148846 | A1 | 6/2011 | Arasawa et al. |
| 2011/0149185 | A1 | 6/2011 | Yamazaki |
| 2011/0157131 | A1 | 6/2011 | Miyake |
| 2011/0175833 | A1 | 7/2011 | Kurokawa et al. |
| 2011/0175874 | A1 | 7/2011 | Wakimoto et al. |
| 2011/0175894 | A1 | 7/2011 | Wakimoto et al. |
| 2011/0175895 | A1 | 7/2011 | Hayakawa et al. |
| 2011/0181560 | A1 | 7/2011 | Yamazaki |
| 2011/0193836 | A1 | 8/2011 | Umezaki |
| 2011/0199404 | A1 | 8/2011 | Umezaki et al. |
| 2011/0205254 | A1* | 8/2011 | Umezaki ............... G09G 3/3648 345/690 |
| 2011/0210957 | A1 | 9/2011 | Koyama et al. |
| 2011/0216023 | A1 | 9/2011 | Kurokawa et al. |
| 2011/0216043 | A1 | 9/2011 | Tamura et al. |
| 2011/0216048 | A1 | 9/2011 | Koyama et al. |
| 2011/0267297 | A1 | 11/2011 | Yamazaki et al. |
| 2011/0267330 | A1 | 11/2011 | Yamazaki et al. |
| 2011/0267331 | A1 | 11/2011 | Yamazaki et al. |
| 2011/0267381 | A1 | 11/2011 | Yamazaki et al. |
| 2011/0279356 | A1 | 11/2011 | Takemura |
| 2011/0279419 | A1 | 11/2011 | Takemura |
| 2011/0285372 | A1 | 11/2011 | Takahashi et al. |
| 2011/0285426 | A1 | 11/2011 | Takahashi et al. |
| 2012/0001874 | A1 | 1/2012 | Kurokawa et al. |
| 2012/0001954 | A1 | 1/2012 | Yamazaki et al. |
| 2012/0002127 | A1 | 1/2012 | Yamazaki et al. |
| 2012/0032942 | A1 | 2/2012 | Toyotaka et al. |
| 2012/0033151 | A1 | 2/2012 | Toyotaka et al. |
| 2012/0038618 | A1 | 2/2012 | Koyama |
| 2012/0062811 | A1 | 3/2012 | Miyake |
| 2012/0273773 | A1 | 11/2012 | Ieda et al. |
| 2012/0293202 | A1 | 11/2012 | Nishijima et al. |
| 2012/0293209 | A1 | 11/2012 | Takewaki |
| 2012/0319107 | A1 | 12/2012 | Miyake |
| 2013/0134416 | A1 | 5/2013 | Nishijima et al. |
| 2013/0235689 | A1 | 9/2013 | Koyama |
| 2014/0132870 | A1* | 5/2014 | Kubota ................ G02F 1/1396 349/43 |
| 2015/0115200 | A1* | 4/2015 | Kawamura ........ C09K 19/3003 252/299.63 |
| 2015/0379945 | A1 | 12/2015 | Kubota et al. |

FOREIGN PATENT DOCUMENTS

| | | |
|---|---|---|
| CN | 001914297 A | 2/2007 |
| DE | 2815860 | 10/1978 |
| EP | 1033606 A | 9/2000 |
| EP | 1541661 A | 6/2005 |
| JP | 53-129183 A | 11/1978 |
| JP | 2000-310797 A | 11/2000 |
| JP | 2003-315766 A | 11/2003 |
| JP | 2007-534782 | 11/2007 |
| JP | 2011-237760 A | 11/2011 |
| JP | 2015-043054 A | 3/2015 |
| KR | 2003-0024640 A | 3/2003 |
| KR | 2006-0115894 A | 11/2006 |
| KR | 2015-0085035 A | 7/2015 |
| TW | I263086 | 10/2006 |
| TW | I302620 | 11/2008 |
| TW | 201426145 | 7/2014 |
| WO | WO-2005/059061 | 6/2005 |
| WO | WO-2014/077295 | 5/2014 |

OTHER PUBLICATIONS

Written Opinion (Application No. PCT/IB2015/059136) dated Mar. 15, 2016.
Chinese Office Action (Application No. 201580065425.3) dated Feb. 3, 2020.

\* cited by examiner

| | DLi | DLi+1 |
|---|---|---|
| first frame period | + | − |
| ↓ | ↓ | ↓ |
| second frame period | − | + |
| ↓ | ↓ | ↓ |
| third frame period | + | − |

FIG. 18A
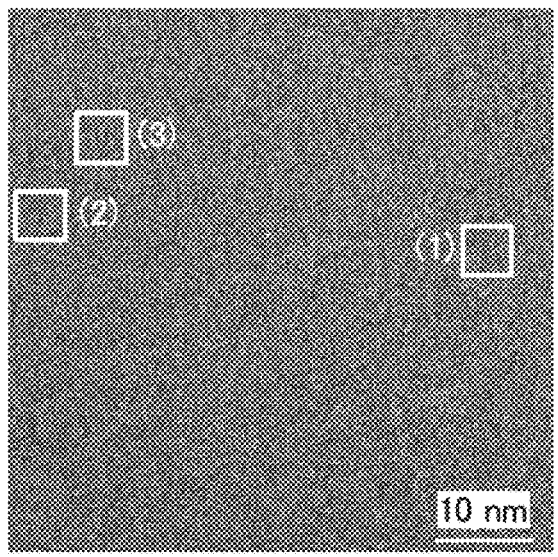
FIG. 18B   FIG. 18C   FIG. 18D
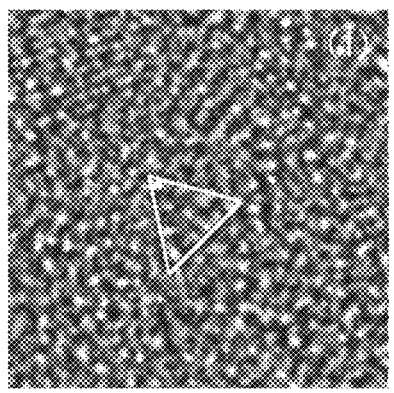 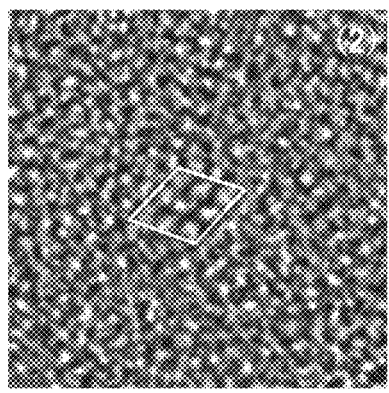 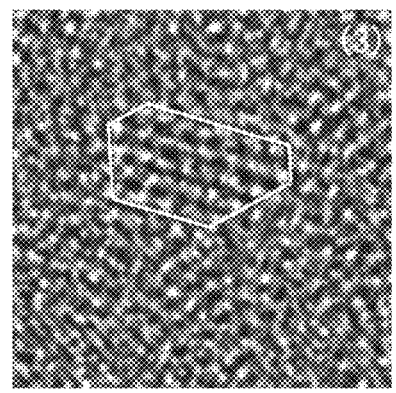

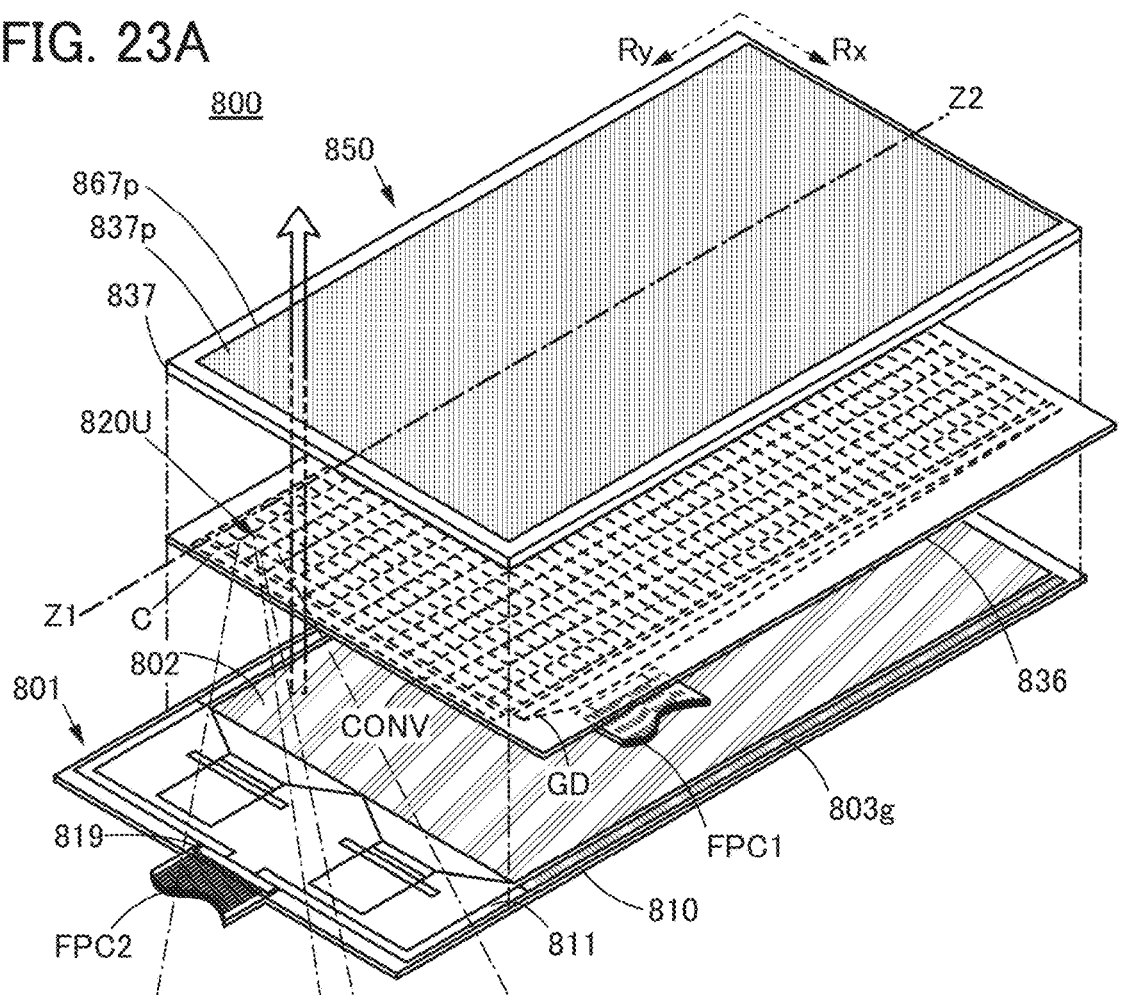
FIG. 23A
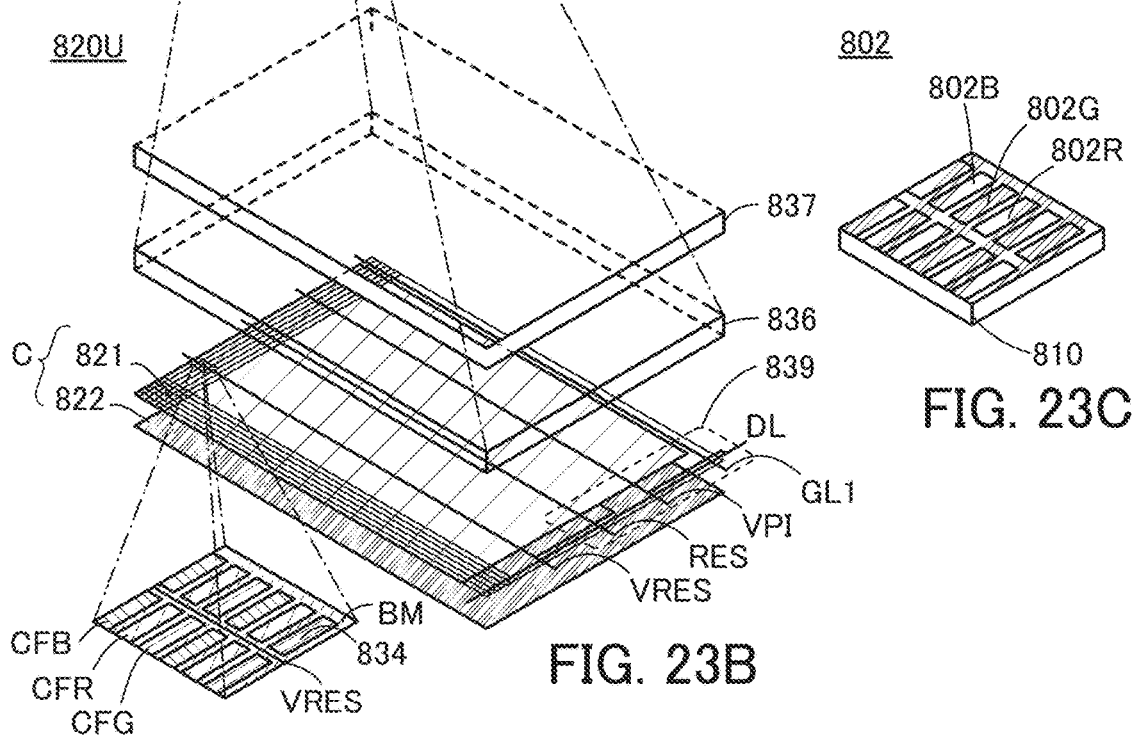
FIG. 23B
FIG. 23C

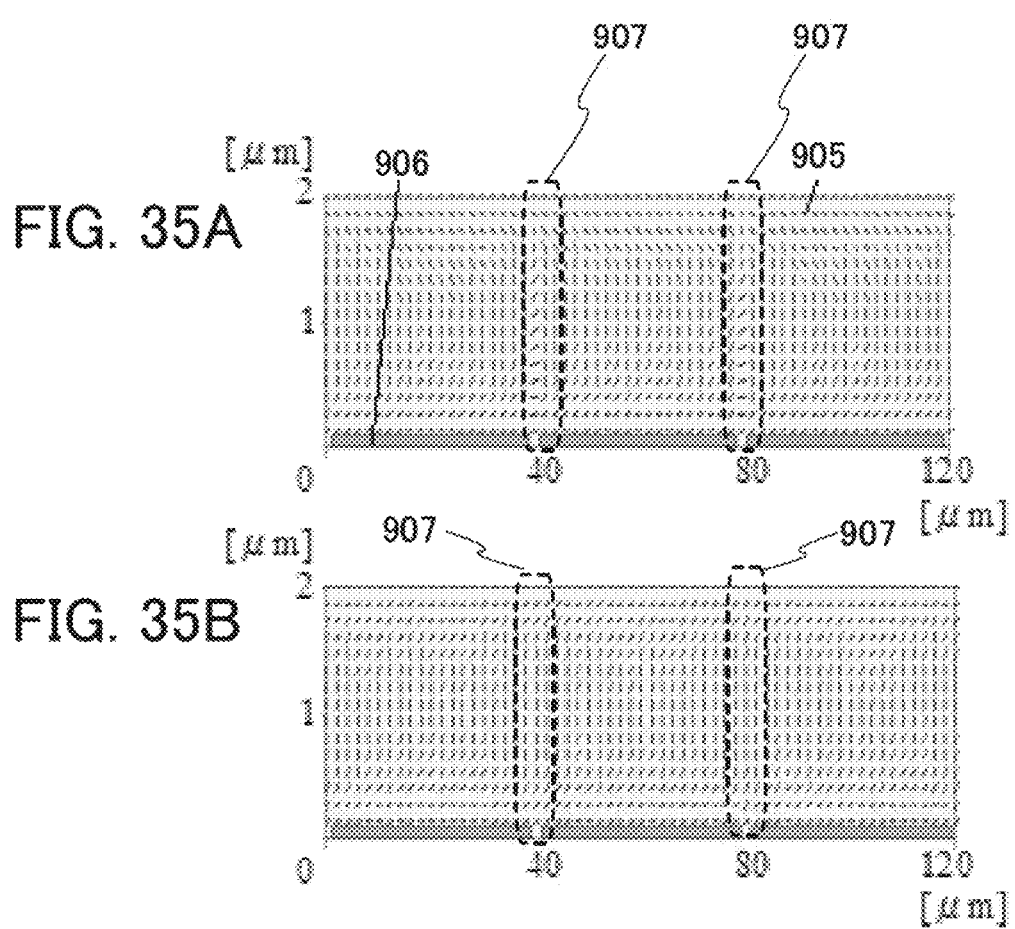

Checker

Stripe

Vertical stripe

Horizontal Stripe

Vertical stripe

Horizontal Stripe

DISPLAY DEVICE, DISPLAY MODULE INCLUDING THE DISPLAY DEVICE, AND ELECTRONIC DEVICE INCLUDING THE DISPLAY DEVICE OR THE DISPLAY MODULE

TECHNICAL FIELD

One embodiment of the present invention relates to a display device, in particular, a liquid crystal display device including a liquid crystal element.

Note that one embodiment of the present invention is not limited to the above technical field. The technical field of one embodiment of the invention disclosed in this specification and the like relates to an object, a method, or a manufacturing method. The present invention relates to a process, a machine, manufacture, or a composition of matter. In particular, one embodiment of the present invention relates to a semiconductor device, a display device, a light-emitting device, a power storage device, a storage device, a driving method thereof, and a manufacturing method thereof.

Note that in this specification and the like, the display device refers to any device having a display function. The display device may include a semiconductor element such as a transistor, a semiconductor circuit, an arithmetic device, a memory device, and the like. The display device also includes a driver circuit for driving a plurality of pixels, and the like. Furthermore, the display device includes a control circuit, a power supply circuit, a signal generation circuit, and the like which are provided over another substrate.

BACKGROUND ART

Commoditization of display devices has progressed as a result of recent technological innovation. Higher-value-added products are being required and have still been actively developed.

As added value for display devices, a reduction in power consumption has attracted attention for the purpose of extending operation time of a mobile device or the like.

For example, Patent Document 1 discloses a structure of a display device in which the frequency of writing signals (also referred to as refresh) for the same image is decreased to reduce its power consumption in displaying the same image (still image) continuously.

In addition, a change in an image at the refresh should not be noticed by users. Note that refresh frequency is referred to as refresh rate.

PRIOR ART DOCUMENT

Patent Document

[Patent Document 1] Japanese Published Patent Application No. 2011-237760

SUMMARY OF THE INVENTION

Problems to be Solved by the Invention

In driving a display device at a low refresh rate, a change in a still image over time should not be noticed by users.

However, a voltage corresponding to a signal that has been written to a pixel will change over time. When a change in the voltage that has been applied to the pixel exceeds the limit of an acceptable gray-level deviation for displaying the same still image, flickers in the image are perceived by users, which results in poor display quality.

In view of the above, an object of one embodiment of the present invention is to provide a novel display device with no loss of display quality. Another object of one embodiment of the present invention is to keep a change in voltage that has been applied to a pixel within a range of an acceptable gray-level deviation for displaying the same still image. Another object of one embodiment of the present invention is to suppress flickers at a low refresh rate. Another object of one embodiment of the present invention is to provide a novel display device consuming less electric power. Another object of one embodiment of the present invention is to provide a novel display device. Note that the descriptions of these objects do not disturb the existence of other objects. Note that one embodiment of the present invention has no need to achieve all the objects. Note that other objects will be apparent from the description of the specification, the drawings, the claims, and the like, and can be derived from the description of the specification, the drawings, the claims, and the like.

A display device which is one embodiment of the present invention is characterized in including a pixel for displaying a still image at a frame frequency of less than or equal to 1 Hz. The pixel includes a liquid crystal layer. The liquid crystal layer includes a molecule whose dipole moment is greater than or equal to 0 debye and less than or equal to 3 debye.

A display device which is another embodiment of the present invention is characterized in including a pixel for displaying a still image at a frame frequency of less than or equal to 1 Hz. The pixel includes a transistor and a liquid crystal layer. The liquid crystal layer includes a molecule whose dipole moment is greater than or equal to 0 debye and less than or equal to 3 debye.

A display device which is another embodiment of the present invention is characterized in including a pixel for displaying a still image at a frame frequency of less than or equal to 1 Hz. The pixel includes a transistor, a liquid crystal layer, and a reflective electrode. The liquid crystal layer includes a molecule whose dipole moment is greater than or equal to 0 debye and less than or equal to 3 debye.

In the above structure, the transistor preferably includes a semiconductor layer. The semiconductor layer preferably includes an oxide semiconductor.

In the above structure, a resistivity of the liquid crystal layer is preferably greater than or equal to $1.0 \times 10^{14}$ ($\Omega \cdot$cm).

In the above structure, a voltage holding ratio of the pixel is preferably higher than or equal to 98.8% and lower than or equal to 100%.

In the above structure, a frame frequency is preferably lower than or equal to 0.2 Hz.

In the above structure, the reflective electrode preferably has a projection and a depression.

Effect of the Invention

Another embodiment of the present invention is a display element and a display device including the semiconductor device according to any one of the above structures. Another embodiment of the present invention is a display module including the display device and a touch sensor. Another embodiment of the present invention is an electronic appliance including the semiconductor device according to any one of the above structures, the display device, or the display module; and an operation key or a battery.

According to one embodiment of the present invention, a novel display device with no loss of display quality can be provided. According to one embodiment of the present invention, a change in voltage that has been applied to a pixel can be kept within a range of an acceptable gray-level deviation for displaying the same still image. According to one embodiment of the present invention, flickers can be suppressed at a low refresh rate. According to one embodiment of the present invention, a novel display device consuming less electric power can be provided. According to one embodiment of the present invention, a novel display device can be provided. Note that the descriptions of these effects do not disturb the existence of other effects. Note that one embodiment of the present invention has no need to achieve all the effects. Note that other effects will be apparent from the description of the specification, the drawings, the claims, and the like, and can be derived from the description of the specification, the drawings, the claims, and the like.

BRIEF DESCRIPTION OF DRAWINGS

FIG. 18 A Cs-corrected high-resolution TEM image of a plane of a CAAC-OS.

FIG. 23 A projection view illustrating a structure of an input/output device of one embodiment.

FIG. 35 A diagram illustrating simulation of liquid crystal alignment.

MODE FOR CARRYING OUT THE INVENTION

Figure 1:
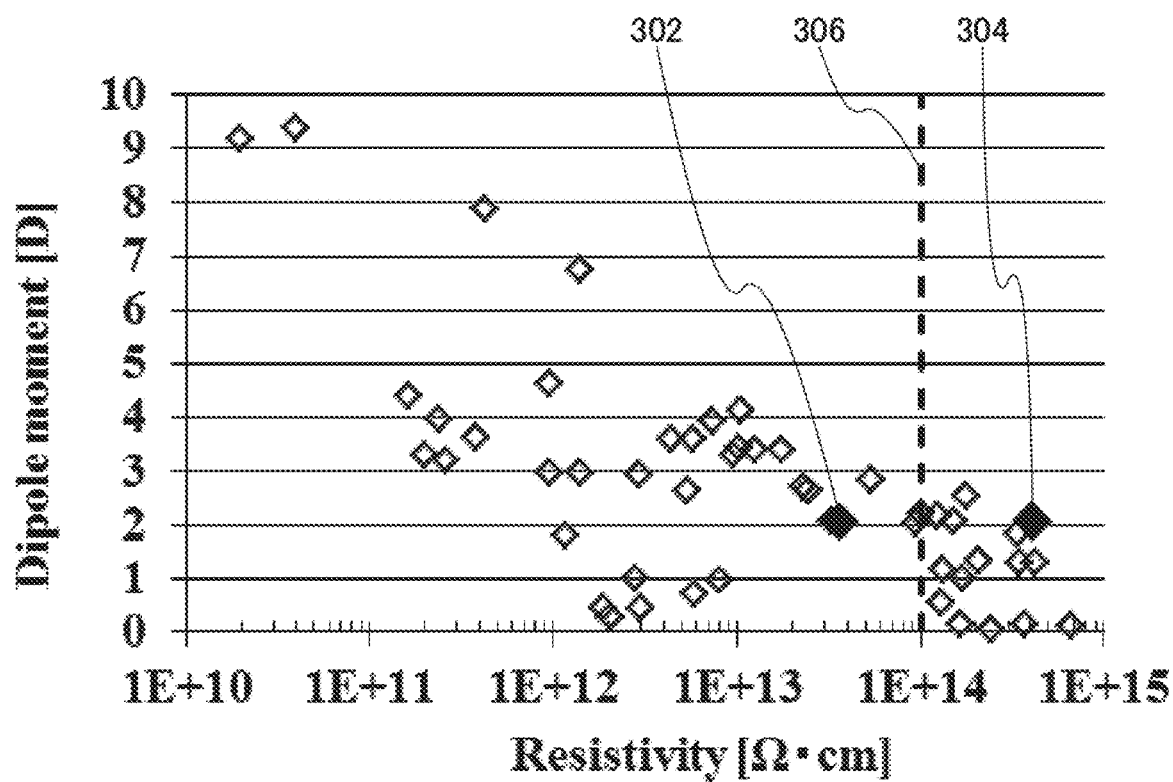
FIG. 1 A graph showing the relationship between resistivity of a liquid crystal layer and dipole moment of a molecule of the liquid crystal layer.

Hereinafter, embodiments will be described with reference to drawings. Note that the embodiments can be implemented with various modes, and it will be readily appreciated by those skilled in the art that modes and details can be changed in various ways without departing from the spirit and scope of the present invention. Thus, the present invention should not be interpreted as being limited to the following description of the embodiments.

In the reference drawings, the size, the thickness of layers, and/or regions may be exaggerated for clarity in some cases. Therefore, embodiments of the present invention are not limited to such scales. Note that drawings are schematic views of ideal examples, and the embodiments of the present invention are not limited to the shape or the value illustrated in the drawings. For example, variation in signal, voltage, or current due to noise or difference in timing can be included.

Note that in this specification and the like, a transistor is an element having at least three terminals of a gate, a drain, and a source. In addition, the transistor has a channel region between a drain (a drain terminal, a drain region, or a drain electrode) and a source (a source terminal, a source region, or a source electrode), and current can flow through the drain, the channel region, and the source.

Here, since the source and the drain of the transistor change depending on the structure, operating conditions, and the like of the transistor, it is difficult to define which is a source or a drain. Thus, a portion which functions as the source and a portion which functions as the drain are not called a source and a drain and one of the source and the drain is referred to as a first electrode and the other thereof is referred to as a second electrode in some cases.

Note that in this specification, ordinal numbers such as "first", "second", and "third" are used in order to avoid confusion among components, and the terms do not limit the components numerically.

Note that in this specification, when it is described that "A and B are connected to each other", the case where A and B are electrically connected to each other is included in addition to the case where A and B are directly connected to each other. Here, the description "A and B are electrically connected to each other" means the following case: when an object having any electrical function exists between A and B, an electric signal can be transmitted and received between A and B.

Note that in this specification, terms for describing arrangement, such as "over" and "under", are used for convenience for describing a positional relation between components with reference to drawings. Further, a positional relation between components is changed as appropriate in accordance with a direction in which each component is described. Thus, there is no limitation to terms used in this specification, and description can be made appropriately depending on the situation.

Note that positional relations of circuit blocks in block diagrams are specified for description, and even in the case where different circuit blocks have different functions, they may be provided in an actual circuit or region so that different functions are achieved in the same circuit or block. In addition, functions of circuit blocks in block diagrams are specified for description, and even in the case where one circuit block is illustrated, blocks may be provided in an actual circuit or region so that processing performed by one circuit block is performed by a plurality of circuit blocks.

Note that a pixel corresponds to a display unit controlling the luminance of one color component (e.g., any one of R (red), G (green), and B (blue)). Therefore, in a color display device, the minimum display unit of a color image is composed of three pixels of an R pixel, a G pixel and a B pixel. Note that the color of the color elements is not necessarily of three varieties and may be of three or more varieties or may include a color other than RGB (e.g., white (W), yellow (Y)).

In this specification and the like, the term "parallel" indicates that the angle formed between two straight lines is greater than or equal to −10° and less than or equal to 10°, and accordingly includes the case where the angle is greater than or equal to −5° and less than or equal to 5°. The term "substantially parallel" indicates that the angle formed between two straight lines is greater than or equal to −30° and less than or equal to 30°. In addition, the term "perpendicular" indicates that an angle formed between two straight lines is greater than or equal to 80° and less than or equal to 100°, accordingly includes the case where the angle is greater than or equal to 85° and less than or equal to 95°. The term "substantially perpendicular" indicates that the angle formed between two straight lines is greater than or equal to 60° and less than or equal to 120°.

Unless otherwise specified, the off-state current in this specification and the like refers to a drain current of a transistor in the off state (also referred to as non-conduction state and cutoff state). Unless otherwise specified, the off state of an n-channel transistor means that the voltage between its gate and source (gate-source voltage) Vgs is lower than the threshold voltage Vth, and the off state of a p-channel transistor means that the voltage Vgs between its gate and source is higher than the gate-source voltage Vth. For example, in some cases, the off-state current of an n-channel transistor sometimes refers to a drain current that flows when the gate-source voltage Vgs is lower than the threshold voltage Vth.

The off-state current of a transistor depends on Vgs in some cases. Thus, "the off-state current of a transistor is smaller than or equal to I" means "there is Vgs with which the off-state current of a transistor becomes smaller than or equal to I" in some cases. Furthermore, "the off-state current of a transistor" means "the off-state current in an off state at predetermined Vgs", "the off-state current in an off state at Vgs in a predetermined range", "the off-state current in an off state at Vgs with which sufficiently reduced off-state current is obtained", or the like.

As an example, the assumption is made of an n-channel transistor where the threshold voltage Vth is 0.5 V and the drain current is $1\times10^{-9}$ A at Vgs of 0.5 V, $1\times10^{-13}$ A at Vgs of 0.1 V, $1\times10^{-19}$ A at Vgs of −0.5 V, and $1\times10^{-22}$ A at Vgs of −0.8 V. The drain current of the transistor is $1\times10^{-19}$ A or lower at Vgs of −0.5 V or at Vgs in the range of −0.8 V to −0.5 V; therefore, it can be said that the off-state current of the transistor is 1×10⁻¹⁹ A or lower. Since there is Vgs at which the drain current of the transistor is 1×10⁻²² A or lower, it may be said that the off-state current of the transistor is 1×10⁻²² A or lower.

In this specification and the like, the off-state current of a transistor with a channel width W is expressed by a value of a current flowing per channel width W or a value of a current flowing per predetermined channel width (e.g., 1 µm) in some cases. In the latter case, the unit of off-state current may be represented by current per length (e.g., A/µm).

The off-state current of a transistor depends on temperature in some cases. Unless otherwise specified, the off-state current in this specification and the like may be an off-state current at room temperature, 60° C., 85° C., 95° C., or 125° C. Alternatively, the off-state current may be an off-state current at a temperature at which the reliability of a semiconductor device or the like including the transistor is ensured or a temperature at which the semiconductor device or the like including the transistor is used (e.g., temperature in the range of 5° C. to 35° C.). "The off-state current of a transistor is less than or equal to I" means that there is a value of Vgs with which the off-state current of a transistor is less than or equal to I at room temperature, 60° C., 85° C., 95° C., 125° C., a temperature at which the reliability of a semiconductor device including the transistor is ensured, or a temperature at which the semiconductor device or the like including the transistor is used (e.g., a temperature in the range of 5° C. to 35° C.) in some cases.

The off-state current of a transistor depends on voltage Vds between its drain and source in some cases. Unless otherwise specified, the off-state current in this specification and the like may be an off-state current at Vds of 0.1 V, 0.8 V, 1 V, 1.2 V, 1.8 V, 2.5 V, 3 V, 3.3 V, 10 V, 12 V, 16 V, or 20 V. Alternatively, the off-state current may be an off-state current at Vds at which the reliability of a semiconductor device or the like including the transistor is ensured or Vds used in the semiconductor device or the like including the transistor. "The off-state current of a transistor is less than or equal to I" means that there is a value of Vgs with which the off-state current of a transistor is less than or equal to I at Vds of 0.1 V, 0.8 V, 1V, 1.2 V, 1.8 V, 2.5 V, 3 V, 3.3 V, 10 V, 12 V, 16 V, or 20 V, Vds at which the reliability of a semiconductor device including the transistor is ensured, or Vds at which the semiconductor device or the like including the transistor is used in some cases.

In the above description of off-state current, a drain may be replaced with a source. That is, the off-state current sometimes refers to a current that flows through a source of a transistor in the off state.

In this specification and the like, the term "leakage current" sometimes expresses the same meaning as off-state current. In this specification and the like, the off-state current sometimes refers to a current that flows between a source and a drain when a transistor is off, for example.

Note that in this specification and the like, the dielectric constant anisotropy of a liquid crystal layer is measured under the conditions that the measurement frequency is 1 kHz and the measurement temperature is 20° C.

(Embodiment 1)

In this embodiment, a basic structure of one embodiment of the present invention is described. The basic operation of one embodiment of the present invention can be explained using graphs and schematic diagrams of FIG. 1 to FIG. 5.

One embodiment of the present invention is a display device (also referred to as a liquid crystal display device) characterized in including a pixel for displaying a still image at a frame frequency of less than or equal to 1 Hz. The pixel includes a liquid crystal layer. The liquid crystal layer includes a molecule whose dipole moment is greater than or equal to 0 debye and less than or equal to 3 debye.

<Dipole Moment>

First described is the influence of a molecule whose dipole moment is greater than or equal to 0 debye and less than or equal to 3 debye, which is included in the liquid crystal layer. A graph of FIG. 1 shows the relation between the dipole moment of the molecule and the resistivity as an example of the liquid crystal layer including the molecule whose dipole moment is greater than or equal to 0 debye and less than or equal to 3 debye.

A vertical axis in the graph of FIG. 1 indicates the dipole moment of the molecule. The dipole moment can be obtained by the following method and calculating electron distribution of molecules. For measurement of the resistivity in FIG. 1, a mother liquid crystal and an additive material added to the mother liquid crystal are mixed to form the liquid crystal layer. The dipole moment is a dipole moment of a molecule of the additive material. A horizontal axis in FIG. 1 indicates the resistivity of the liquid crystal layer, that is, a mixture of the mother liquid crystal and the additive material. As for a mixing ratio of the mother liquid crystal and the additive material, the ratio of the additive material to the entire mixed material is 20 atomic %. Hereinafter, the mixture of the mother liquid crystal and the additive material is referred to as a mixed liquid crystal. Each point in FIG. 1 shows the relationship between the dipole moment of a molecule contained in an additive material and the resistivity of a mixed liquid crystal to which the additive material is added, which is obtained by changing kinds of additive material added to the mother liquid crystal.

In FIG. 1, the resistivity of the mixed liquid crystal is increased with the decrease in the dipole moment of the molecule of the additive material. In other words, the resistivity is decreased as the dipole moment of the additive material is increased.

According to FIG. 1, the resistivity of a mixed liquid crystal whose molecule of the additive material has a dipole moment of less than or equal to 3 debye is 1.0×10¹⁴ Ω·cm. The resistivity is increased as the dipole moment of the molecule of the additive material is decreased. However, the minimum dipole moment of zero is a state with no deviation of electric charges of a molecule. For example, when the molecule structure is symmetric with respect to the center of the molecule, there is no distribution deviation of electric charges and thus the dipole moment is zero. For this reason, in the display device of one embodiment of the present invention, the eternal dipole moment of the molecule of the additive material is preferably greater than or equal to 0 debye and less than or equal to 3 debye. The resistivity is preferably higher than or equal to 1.0×10¹⁴ Ω·cm.

<Description of Relationship Between Dipole Moment and Operation of Liquid Crystal Layer>

Here, the dipole moment is described. In a molecule consisting of different kinds of atoms, the electronegativity of each atom generally differs from each other. When the atoms are combined to be a molecule, a distribution deviation of electric charges occurs in the molecule due to the difference in electronegativity. The dipole moment quantitatively represents the degree of the deviation. Note that the deviation of electric charges in the molecule can be represented as the presence of the eternal dipole moment.

When the deviation of electric charges is schematically represented as a state in which dot electric charges +q and −q having different polarities are separated by a distance 1. In that case, the dipole moment is the product q1. The unit is C·m (coulomb meter) denoting the product of electric charges and the length.

The dipole moment is expressed as "debye" conventionally. In some cases, "debye" is represented as "debye unit" or "debye" or is represented as an alphabet "D" or "DU". Formula 1 shows the relationship between debye and SI unit. As is found from Formula 1, debye represented by SI unit is extremely small. In general, a dipole moment of a molecule is approximately 1 debye. Therefore, the debye unit is generally used to represent the size of the dipole moment. The size of the dipole moment is represented by debye in this specification as well, and can be converted into SI unit using the relational expression of Formula 1.

[Formula 1]

$$1 \text{ debye} = 3.33564 \times 10^{-30} \text{ Cm} \qquad (1)$$

As for the liquid crystal layer, a molecule included in the liquid crystal layer (hereinafter referred to as a liquid crystal molecule) is a compound obtained by a combination of a plurality of different atoms. Thus, the liquid crystal layer has a distribution deviation of electric charges in the liquid crystal molecule, and has a dipole moment.

The distribution of electric charges depends on shapes of molecules; thus, the distribution state is generally obtained by an electron density analysis or the like. Specifically, the most stable structure of a molecule is obtained by structure optimization. Furthermore, the distribution state of electric charges in the most stable structure is calculated to obtain dipole moment. A density functional theory (hereinafter referred to as DFT) is a typical calculation method.

The total energy of the DFT is represented as the sum of potential energy, electrostatic energy between electrons, electron kinetic energy, and exchange-correlation energy including all the complicated interactions between electrons. In the DFT, an exchange-correlation interaction is approximated by a functional (that is, a function of another function) of one electron potential represented in terms of electron density. A functional B3LYP is commonly used in the DFT. When B3LYP is used, 6-311G(d,p) or the like can be used as a basis function.

The liquid crystal molecule of the liquid crystal layer which is suitable for a display device generally has a stick-like shape. The liquid crystal layer is a dielectric having a dielectric anisotropy in which the dielectric constant is changed depending on the orientation direction of the stick-form liquid crystal molecules.

An electron-withdrawing group and an electron-donating group, such as cyano and halogen, in the molecule are related to the expression of dielectric anisotropy. The dielectric anisotropy is a property that has a direct relation to the response operation of a liquid crystal molecule with respect to an external field such as an electric field. A molecule structure showing a strong dielectric anisotropy is selected appropriately. However, when the number of electron-withdrawing groups is increased, for example, to increase the dielectric anisotropy, the deviation of electric charges, that is, the dipole moment becomes too large. As a result, the liquid crystal layer easily absorbs ionic impurities.

When the concentration of ionic impurities in the liquid crystal layer is increased, ion conduction easily occurs in the liquid crystal layer, so that the voltage holding ratio of the liquid crystal layer is reduced. Moreover, electric charges arisen from the ionic impurities are built up on the surface of the liquid crystal layer. This becomes a cause of an increase in the residual DC which appears when voltage is generated in the liquid crystal layer. The amount of the residual DC serves as a measure of possibility of burn-in of the display device and thus is preferably small.

The ionic impurities can enter at various steps, such as the material synthesizing step and the panel fabricating step. It is needless to say to avoid impurity contamination in each step. Moreover, the reduction of impurity ions in the material itself is effective in increasing the voltage holding ratio of the liquid crystal layer and in reducing the residual DC. Therefore, the material is preferably selected so that each liquid crystal molecule can have a small dipole moment.

The relationship between the resistivity of the liquid crystal layer containing the obtained material and the dipole moment of the molecule contained in the liquid crystal layer is shown in FIG. 1. As described above, when the dipole moment of the molecule exceeds 3, the influence of impurities contained in the liquid crystal layer becomes significant. The impurity that remains in the liquid crystal layer decreases the resistivity of the liquid crystal layer and increases the conductivity of the liquid crystal layer. This makes it difficult to keep voltage which has been applied to a pixel when the refresh rate of the display device is lowered.

When the dipole moment of the molecule contained in the liquid crystal layer is small, the amount of impurities in the liquid crystal layer can be reduced, so that the liquid crystal layer can have a low conductivity. For this reason, the liquid crystal layer whose molecule has a small dipole moment has an advantage in that voltage applied to a pixel can be kept longer when the refresh rate is low.

However, a simple reduction in dipole moment of the molecule of the liquid crystal layer may lead to a tendency to lower the interaction with an electric field. In that case, the behavior of the liquid crystal layer is slow; thus, the driving voltage needs to be set higher to facilitate high-speed operation. For this reason, this structure is not suitable for a liquid crystal layer with lower refresh rate for the purpose of low power consumption.

In particular, high driving voltage is not preferable because the total power consumption of the liquid crystal display device significantly increases when driving at a low refresh rate is changed to driving at a higher refresh rate for displaying moving images.

Therefore, it is preferable in one mode of this embodiment that the dipole moment of the molecule contained in the liquid crystal layer be greater than or equal to 0 debye and less than or equal to 3 debye. The liquid crystal layer whose molecule has a dipole moment of greater than or equal to 0 debye and less than or equal to 3 debye can reduce the proportion of the impurity contained in the liquid crystal layer and does not increase power consumption when moving image display is performed. Thus, driving voltage of the liquid crystal layer can be set in a preferable range.

Note that when the dipole moment of the molecule contained in the liquid crystal layer is greater than or equal to 0 debye and less than or equal to 3 debye, the driving voltage of the liquid crystal layer is preferably set high within a range without an increase in power consumption. A high driving voltage of the liquid crystal layer broadens an acceptable range of a deviation in gray level. In other words, flickers can be reduced owing to the high driving voltage and a small deviation in gray level in accordance with a change in voltage.

Note that the dipole moment of the molecule contained in the liquid crystal layer is greater than or equal to 0 debye and less than or equal to 3 debye in the description above, and is preferably greater than or equal to 0 debye and less than or equal to 2.5 debye, further preferably greater than or equal to 0 debye and less than or equal to 1.8 debye.

Note that the liquid crystal layer described in this embodiment is a liquid crystal layer in a TN (twisted nematic) mode as an example, but other modes can be employed.

As an operation mode of the liquid crystal layer other than the TN mode, an ECB (electrically controlled birefringence) mode, an IPS (in-plane-switching) mode, an FFS (fringe field switching) mode, an MVA (multi-domain vertical alignment) mode, a PVA (patterned vertical alignment) mode, an ASM (axially symmetric aligned micro-cell) mode, an OCB (optical compensated birefringence) mode, an FLC (ferroelectric liquid crystal) mode, an AFLC (anti-ferroelectric liquid crystal) mode, or the like can be used. Note that the structure of a pixel electrode in each pixel in the display device can be changed as appropriate in accordance with the display mode.

Note that FIG. 1 shows, as described above, the relationship between the resistivity of the liquid crystal layer and the dipole moment of the molecule contained in the liquid crystal layer, which shows that the liquid crystal layer has a tendency to have higher resistivity as the dipole moment of the molecule is small. Purification after the synthesis of liquid crystal molecules produces the effect of further increasing the resistivity and is thus desirable.

FIG. 1 shows an example of the effect of the purification of a liquid crystal material. A point 302 and a point 304 in FIG. 1 respectively indicate a value when a liquid crystal material before purified is added to a mother liquid crystal and a value when the liquid crystal material after purified is added thereto. A dotted line 306 in FIG. 1 is a line with a resistivity of $1.0 \times 10^{14}$ Ω·cm. The resistivity of the point 304 is higher than that of the point 302, and in addition, is higher than $1.0 \times 10^{14}$ Ω·cm, which shows the effect of purification.

As described above, when the dipole moment of a molecule contained in the liquid crystal layer is greater than or equal to 0 debye and less than or equal to 3 debye, a deviation in gray level can be kept within the acceptable range for displaying the same still image, so that flickers can be reduced. As a result, the display quality can be improved.

Note that the acceptable range of a deviation in gray level for displaying the same still image means a deviation in gray level of 0 or more and 3 or less when the image is displayed by controlling 256 levels of transmittance, for example. When the deviation in gray level for displaying the same still image is 0 or more and 3 or less, viewers hardly perceive flickers. As another example, when the image is displayed by controlling 1024 levels of transmittance, the acceptable range of a deviation in gray level is 0 or more and 12 or less. That is, the acceptable range of a deviation in gray level for displaying the same still image is preferably more than or equal to 1% and less than or equal to 1.2% of the maximum gray levels for the displaying.

A deviation in gray level in this specification means the amount of deviation between gray levels with which the display device is supposed to display and the actual luminance of the displayed image. This deviation in gray level is described using an example of a transmissive liquid crystal element in some cases. However, the deviation in gray level in a reflective or semi-transmissive liquid crystal element is similar to that in the transmissive liquid crystal element, and the difference is only an extraction direction of incident light. Therefore, the term "transmissive" in this specification can be replaced with the term "reflective", though there are structure differences such as components between the transmissive, reflective, and semi-transmissive liquid crystal elements.

It is particularly preferable that the structure in which the dipole moment of a molecule contained in the liquid crystal layer is greater than or equal to 0 debye and less than or equal to 3 debye, which is one embodiment of the present invention, be combined with a driving method by which moving image display and still image display are performed at different refresh rates. In a liquid crystal display device which operates at different refresh rates, when moving image display is changed to still image display, the frame frequency is changed from 60 Hz to less than or equal to 1 Hz, preferably from 60 Hz to less than or equal to 0.2 Hz, whereby the power consumption is reduced. That is, the structure of this embodiment is suitable as a structure in which the refresh rate is reduced at the time of still image display.

In the display device which performs display at different refresh rates, it is preferable to reduce power consumption and prevent a decrease in display quality at the time of moving image display and at the time of still image display. At the time of still image display, as the refresh rate is set lower, the time interval between applications of voltage to a pixel gets longer. In other words, when the refresh rate at the time of still image display is decreased, there is a certain period of time during which voltage is not applied to a pixel.

Accordingly, in the case of driving at a decreased refresh rate at the time of still image display, it is important to keep voltage applied to a pixel at a certain value. In addition, since the frame frequency is increased in the case of driving at an increased refresh rate at the time of moving image display, setting driving voltage low is important for reducing power consumption.

In one embodiment of the present invention, an impurity in the liquid crystal layer is reduced as compared with in a liquid crystal layer whose molecule has a dipole moment in excess of 3 debye. Accordingly, leakage current caused by impurity in the liquid crystal layer is small, so that voltage applied to a pixel can be kept when the refresh rate is low.

In one embodiment of the present invention, since leakage current caused by an impurity in the liquid crystal layer can be small, flickers can be reduced without providing a large storage capacitor in a pixel in advance. Since the design for reducing flickers with a large storage capacitor is not necessary, a design with a small storage capacitor is possible, so that the pixel resolution can be increased. The high pixel resolution and a low refresh rate can reduce eye strain.

<Description of Voltage Holding Ratio>

Figure 2:
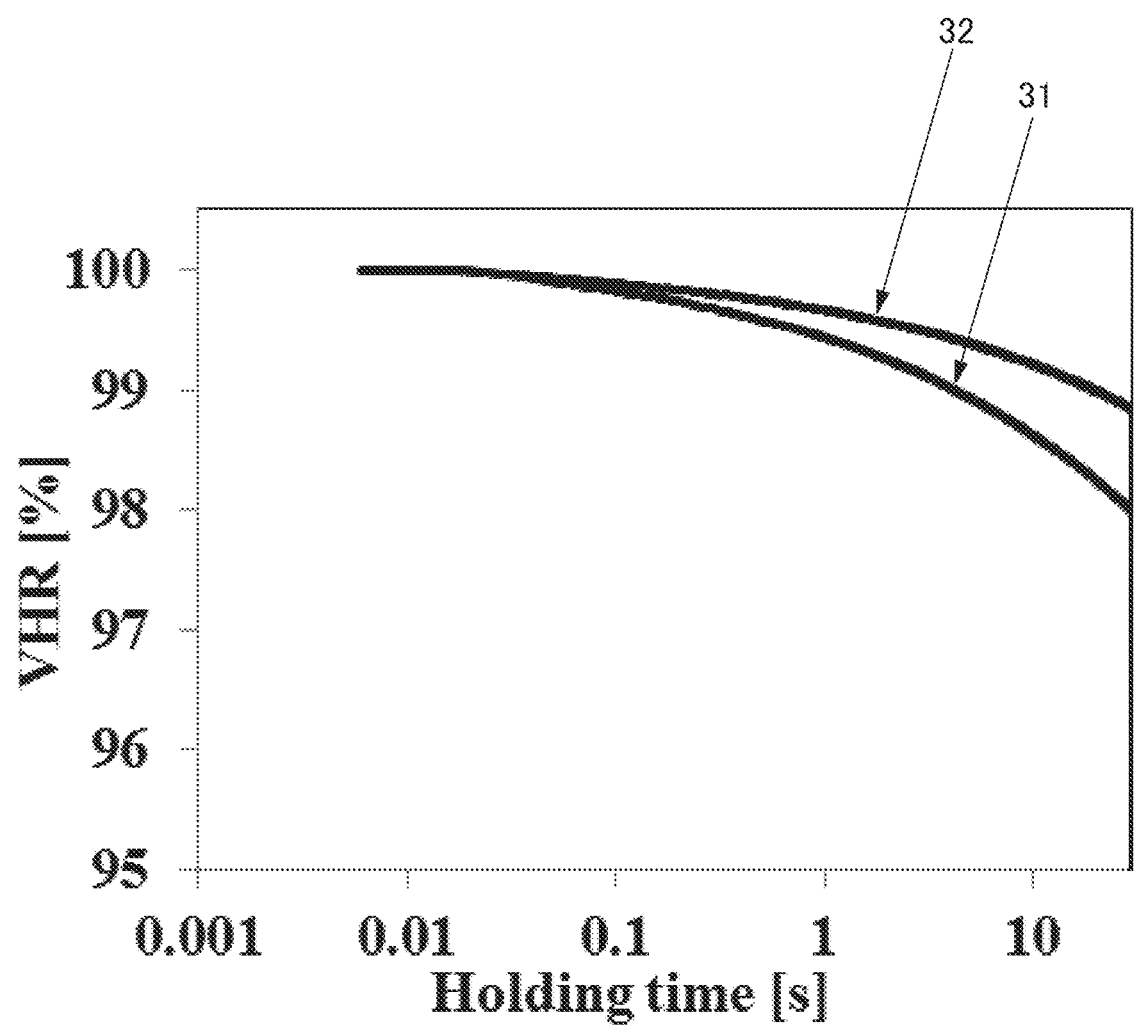
FIG. 2 A diagram showing voltage holding ratio of a liquid crystal layer.

Described here is the relationship between the dipole moment of a molecule contained in the liquid crystal layer which is greater than or equal to 0 debye and less than or equal to 3 debye and the voltage holding ratio of the liquid crystal layer. FIG. 2 is a graph showing change over time in voltage holding ratio (VHR) of the liquid crystal layer. For the voltage holding ratio, calculated is an area ratio with a voltage held after a voltage of 3 V is applied to electrodes with the liquid crystal layer interposed therebetween for 16.6 ms and the electrodes are open-circuited. The horizontal axis of FIG. 2 shows holding time.

The graph of FIG. 2 shows an example of the liquid crystal layer whose molecule has a dipole moment of greater than or equal to 0 debye and less than or equal to 3 debye. The dipole moments of molecules contained in a plurality of materials are from 0.05 debye to 2.18 debye. An example of a material obtained by mixing them (hereinafter referred to as improved material) is shown. In addition, results of a conventional material are shown as a comparative example. A line 32 in FIG. 2 indicates change over time in VHR of the improved material. A line 31 indicates change over time in VHR of the conventional material.

According to the graph in FIG. 2, the VHR of the conventional material after a lapse of 30 seconds is 98.0%, whereas the VHR of the improved material after a lapse of 30 seconds is 98.8%. Even in a period of time when no voltage is applied to the liquid crystal layer, the VHR is preferably high in order to reduce a deviation in gray level.

<Description of Improvement in Gray-level Deviation>

Figure 3A:
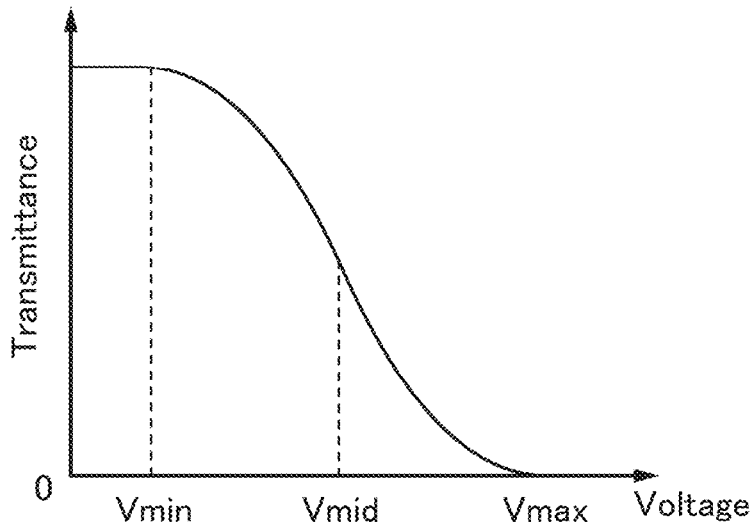
FIG. 3 A graph showing transmittance-voltage characteristics of a liquid crystal layer and a schematic cross-sectional view of the liquid crystal layer.
Figure 3B:
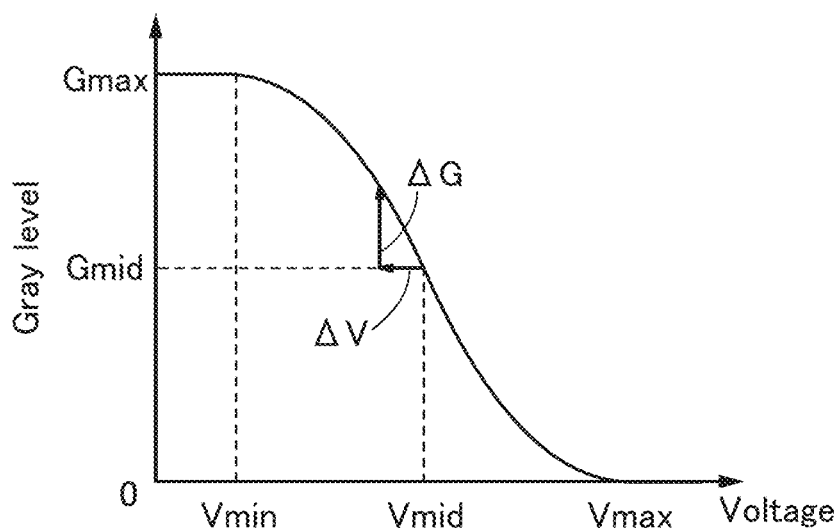
Figure 3C:
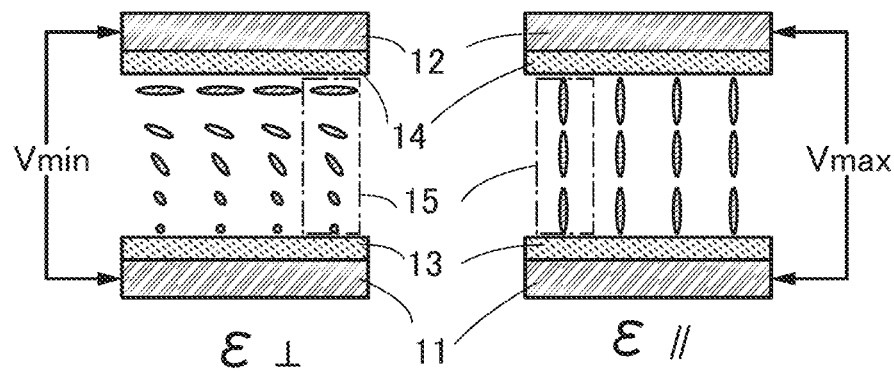
Figure 4:
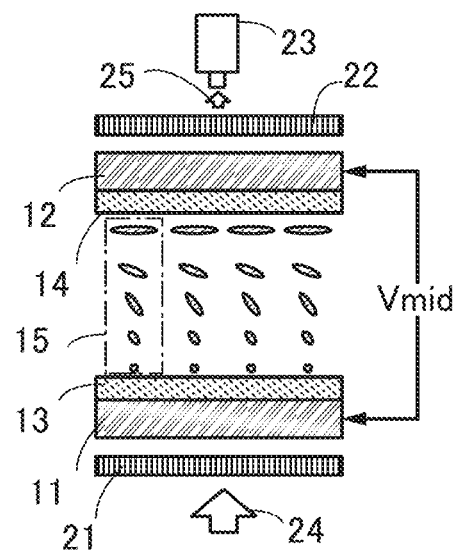
FIG. 4 A schematic cross-sectional view of a liquid crystal layer for observing the transmittance of the liquid crystal layer.

Next, using FIG. 3 and FIG. 4, description is made on the structure described using FIG. 1 and FIG. 2 in which a deviation in gray level in accordance with change in voltage applied to a pixel can be kept within an acceptable range by setting the dipole moment of a molecule greater than or equal to 0 debye and less than or equal to 3 debye.

First, the characteristics of the liquid crystal layer are described using FIG. 3.

Although the example of a transmissive liquid crystal element is described here, the reflective or semi-transmissive liquid crystal element may be used as described above.

FIG. 3A is a graph showing voltage-transmittance of a TN mode which can be used for the liquid crystal layer.

The graph shown in FIG. 3A shows a curve of a normally-white liquid crystal element. In a liquid crystal layer, orientations of liquid crystal molecules in the liquid crystal layer are changed by an electric field in accordance with voltage applied between electrodes between which the liquid crystal layer is sandwiched, whereby the transmittance of polarized light is controlled. In FIG. 3A, the voltage Vmax is voltage at which the transmittance of light through the liquid crystal layer becomes 0. The voltage Vmin is voltage at which the transmittance of light through the liquid crystal layer becomes the maximum. The voltage Vmid is voltage at which the transmittance of light through the liquid crystal layer becomes half (50%).

The graph shown in FIG. 3B is related to voltages applied to the liquid crystal layer and gray levels. In FIG. 3B, for example, in the case where a black image or a white image is displayed, the light transmittance is changed by application of the voltage Vmax or the voltage Vmin; thus, the image can be displayed by switching the gray level between 0 and Gmax.

Moreover, in FIG. 3B, in the case where an image is displayed with multi gray levels for expressing a color shade, a plurality of voltages such as Vmax, Vmid, and Vmin are applied to change the light transmittance. The gray level is also switched between Gmax, Gmid, and 0 to perform display. In order to increase the gray levels, a plurality of voltage levels is set between the voltage Vmax and the voltage Vmin. The light transmittance is changed in accordance with the voltage level, which is utilized for achieving a liquid crystal display device capable of displaying an image with a plurality of gray levels.

In that case, when a value of voltage applied to the liquid crystal layer is not changed, the light transmittance is not changed as well; thus, a desired gray level can be obtained. On the other hand, a value of voltage applied to a liquid crystal layer in a pixel in an active-matrix display device including a liquid crystal is changed with time due to current flowing through the liquid crystal layer. Specifically, the value of voltage is changed by ΔV after a certain period of time, and the gray level is accordingly changed by ΔG. When the value of voltage that has been applied to a pixel is beyond the acceptable range of a deviation in gray level for displaying the same still image, flickers might be perceived by viewers, which results in a decrease in display quality.

Next, a cross-sectional schematic view of electrodes between which a liquid crystal layer is sandwiched is shown in FIG. 3C. FIG. 3C illustrates an oriented state of the liquid crystal layer to which the voltage Vmin described in FIG. 3A is applied ("initial orientation state") and an oriented state of the liquid crystal layer to which the voltage Vmax is applied ("saturated orientation state").

Note that the initial orientation state refers to a state of liquid crystal molecules to which voltage is not applied. The initial orientation state in the TN liquid crystal is a state where liquid crystal molecules are twisted by 90° between electrodes. The saturated orientation state refers to a state of liquid crystal molecules to which voltage is applied in which the liquid crystal molecules are tilted or rise and the orientations are hardly changed by application of a higher voltage.

In FIG. 3C, cross sections of a first electrode 11, a second electrode 12, an alignment film 13, an alignment film 14, and a liquid crystal molecules 15 are illustrated. Note that the first electrode 11 corresponds to a pixel electrode. The second electrode 12 corresponds to a counter electrode.

A dielectric constant in the initial orientation state is represented by $\varepsilon\perp$. A dielectric constant in the saturated orientation state is represented by $\varepsilon//$. A difference between the dielectric constant $\varepsilon\perp$ in the initial orientation state and the dielectric constant $\varepsilon//$ in the saturated orientation state corresponds to the above-described dielectric constant anisotropy ($\Delta\varepsilon$).

FIG. 4 is a schematic view for observing a change in transmittance in the case where the voltage Vmid is applied between the electrodes illustrated in FIG. 3C between which the liquid crystal layer is sandwiched.

FIG. 4 illustrates an orientation state (also referred to as a middle orientation state, a gray level, or a half tone) of the liquid crystal layer to which the voltage Vmid described with reference to FIG. 3A is applied. FIG. 4 illustrates a polarizing plate 21, a polarizing plate 22, and a light detector 23, in addition to the first electrode 11, the second electrode 12, the alignment film 13, the alignment film 14, and the liquid crystal molecules 15 illustrated in FIG. 3C. In FIG. 4, arrows represent light; an arrow 24 represents light that enters the liquid crystal layer and an arrow 25 represents light that is transmitted through the liquid crystal layer. Note that the light represented by the arrow 24 corresponds to backlight of the display device. Note that a liquid crystal element may refer to a structure including the first electrode 11, the second electrode 12, the alignment film 13, the alignment film 14, the liquid crystal molecules 15, the polarizing plate 21, and the polarizing plate 22 illustrated in FIG. 4.

<Acceptable Range of Gray-level Deviation>

Next, an acceptable range of gray-level deviation is described. When an object whose luminance changes over time is observed, there actually is a limit on frequency at which flickers are perceived, and there is frequency dependence. It is quantified and represented by t-MTF (temporal-Modulation Transfer Function). It is easily identified as the contrast sensitivity is high, whereas it is difficult to be identified as the contrast sensitivity is low.

For the calculation of t-MTF, the Peter G. J. Barten's model (Formula 2) was employed. The relationships between the contrast sensitivity S(u,w), spatial frequency (u), and temporal frequency were shown.

[Formula 2]

$$S(u, w) = \frac{M_{spat}(u)/k}{\sqrt{\frac{2}{T}\left(\frac{1}{X_O^2} + \frac{1}{X_{max}^2} + \frac{u^2}{N_{max}^2}\right)\left(\frac{1}{\eta p E} + \frac{\Phi_0}{[H_1(w)\{1 - H_2(w)F(u)\}]^2}\right)}} \quad (2)$$

In Formula 2, S(u,w) represents the contrast sensitivity, u represents the spatial frequency, w represents the temporal frequency, $M_{spat}$ represents the visual spatial modulation transfer function, k represents the signal-noise ratio at a 50% detection probability, T represents the eye integration time, $X_O$ represents the size of an observation object in the x direction, $X_{max}$ represents the upper limit of integration in the x direction, $N_{max}$ represents the maximum number of integration cycles, η represents quantum efficiency, p represents a photon conversion ratio, E represents retinal illuminance, $\Phi_0$ represents the spectral density of neural noise, $H_1(w)$ represents a modulation transfer function for temporal processing of a photoreceptor signal, $H_2(w)$ represents a modulation transfer function for temporal processing of a spatial suppression signal, and F(u) represents a modulation transfer function for an integrand of a spatial suppression filter.

The relationship between the contrast sensitivity S and the temporal frequency is obtained by Formula 2. Then, the amount of luminance change difficult to be perceived as flickers is calculated from the result. This amount of luminance change difficult to be perceived is the acceptable amount of gray-scale deviation. In addition, the amount of change in voltage applied to the liquid crystal layer, which corresponds to this amount of luminance change, is obtained, whereby the allowable amount of voltage changing in a certain period is obtained. Using this as a guide, a material satisfying the acceptable amount is selected.

<Residual DC and Gray-level Deviation>

Here, the residual DC corresponding to a change in voltage written to a pixel when the dipole moment of a molecule is greater than or equal to 0 debye and less than or equal to 3 debye, which is described with reference to FIG. 1 and FIG. 2, is described with reference to FIG. 5.

Note that the residual DC refers to voltage generated by electric charges remaining between the electrodes when voltage is applied to the liquid crystal layer. By the residual DC, an extra voltage is applied between the electrodes when a predetermined voltage is applied to the liquid crystal layer. In addition, even in a period of time when voltage is not applied to the liquid crystal layer, voltage remains between the electrodes due to electric charges which remain in the liquid crystal layer. Note that in the structure in which a liquid crystal material is sandwiched between electrodes and alignment films are provided on the electrodes, "between the electrodes" means between the alignment films.

Figure 5:
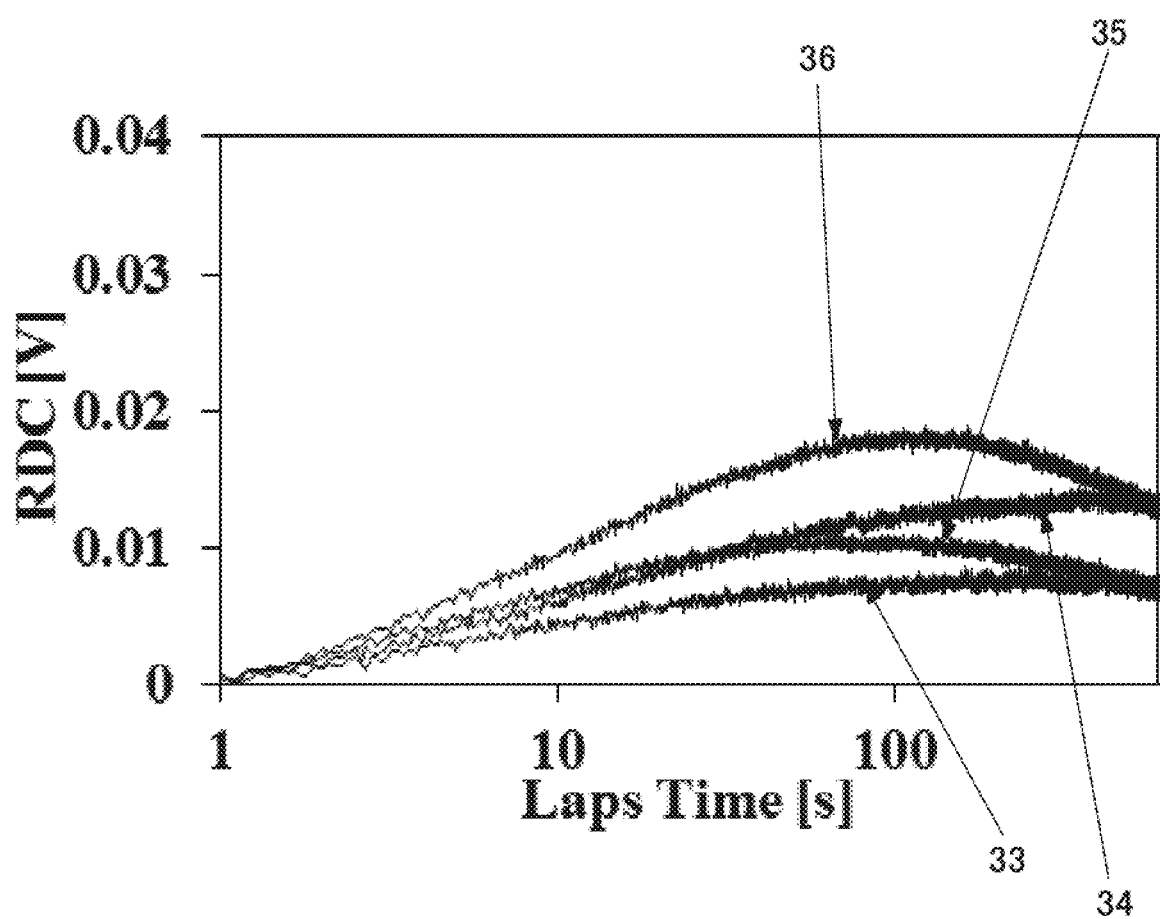
FIG. 5 A graph showing residual DC voltage of a liquid crystal layer.

FIG. 5 is a graph showing residual DC characteristics of a material ("improved material") obtained by mixing a plurality of materials and of a conventional material which is a comparative example. The dipole moments of molecules contained in the plurality of materials which are examples of the liquid crystal layer whose molecule has a dipole moment of greater than or equal to 0 debye and less than or equal to 3 debye are from 0.05 debye to 2.18 debye.

In the measurement of the residual DC shown in FIG. 5, a voltage of 3 V is applied for charging between the electrodes between which the liquid crystal layer is sandwiched for 10 seconds or 30 seconds, and the electrodes are short-circuited for one second, and then the electrodes are open-circuited. FIG. 5 shows time-dependent change in voltage in this state. Note that the horizontal axis and the vertical axis in FIG. 5 represent time (Laps Time) and voltage (RDC), respectively. A line 33 in FIG. 5 shows the time-dependent change of the residual DC which is an improved material when the charging is performed for 10 seconds. A line 34 shows the time-dependent change of the residual DC which is an improved material when the charging is performed for 30 seconds. A line 35 shows the time-dependent change of the residual DC which is a conventional material when the charging is performed for 10 seconds. A line 36 shows the time-dependent change of the residual DC which is a conventional material when the charging is performed for 30 seconds.

As shown in the graph in FIG. 5, the improved material for the liquid crystal layer has lower residual DC voltage.

When a comparison is made in the graph shown in FIG. 5, it is found that the liquid crystal layer (conventional material) with larger dipole moment of a molecule has a larger voltage just after the electrodes are open-circuited. A reason of the difference in voltage depending on the liquid crystal materials is that a large dipole moment increases the proportion of an impurity in the liquid crystal layer. Therefore, by employing the structure of one embodiment of the present invention in which the dipole moment of a molecule contained in a liquid crystal layer is greater than or equal to 0 debye and less than or equal to 3 debye, in which the proportion of an impurity in the liquid crystal layer is low, an influence of the residual DC just after the electrodes are open-circuited can be reduced.

Note that when Formula 3 derived from Maxwell-Wagner theory about multilayer dielectric is satisfied, electric charges accumulated at the interface between the alignment film and the liquid crystal layer can be reduced, so that the residual DC can be reduced. Note that in Formula 1, $\varepsilon_{LC}$ represents a dielectric constant of the liquid crystal layer, $\rho_{LC}$ represents a resistivity of the liquid crystal layer, $\varepsilon_{AL}$ represents a dielectric constant of the alignment film, and $\rho_{AL}$ represents a resistivity of the alignment film.

[Formula 3]

$$\varepsilon_{LC} \cdot \rho_{LC} = \varepsilon_{AL} \cdot \rho_{AL} \quad (3)$$

To be closer to the condition of Formula 3, it is preferable that the resistivity of the liquid crystal layer and the resistivity of the alignment film be close to each other as much as possible. Since the alignment film has higher resistivity than the liquid crystal layer, to make the resistivities of the liquid crystal layer and the alignment film close to each other, it is necessary to increase the resistivity of the liquid crystal layer or decrease the resistivity of the alignment film. As described above, it is preferable to increase the resistivity of the liquid crystal layer.

In order to achieve this, it is preferable that the liquid crystal layer be formed of a material that attracts few ionic impurities, and it is effective in use a liquid crystal layer containing a molecule having a dipole moment of greater than or equal to 0 debye and less than or equal to 3 debye.

As described above, with the use of the liquid crystal layer containing a molecule having a dipole moment of greater than or equal to 0 debye and less than or equal to 3 debye and a material which makes the voltage holding ratio of the liquid crystal layer high, the residual DC can be suppressed. In other words, a change in voltage written to a pixel can be kept within an acceptable range of a deviation in gray level for displaying the same still image. Thus, a novel display device without deterioration in the display quality can be provided.

In this embodiment, one embodiment of the present invention has been described. Other embodiments of the present invention are described in Embodiments below. Note that one embodiment of the present invention is not limited to these. In other words, various embodiments of the invention are described in this embodiment and the other embodiments, and one embodiment of the present invention is not limited to a particular embodiment. The example in which one embodiment of the present invention is applied to a low-refresh-rate display device has been described; however, one embodiment of the present invention is not limited thereto. Depending on circumstances or conditions, in one embodiment of the present invention, display may be performed at a normal refresh rate of 60 Hz or at a double-frame rate of 120 Hz or more. Alternatively, for example, depending on circumstances or conditions, the refresh rate is not necessarily reduced in one embodiment of the present invention.

Note that this embodiment can be combined with any of the other embodiments in this specification as appropriate.

(Embodiment 2)

In this embodiment, an example of a liquid crystal display device including the liquid crystal layer described in Embodiment 1 is described with reference to FIG. 6 and FIG. 7.

Specifically, a liquid crystal display device which has a first mode in which a G signal is output at a frequency of 60 Hz or higher and a second mode in which the G signal is output at a frequency of 1 Hz or lower, preferably 0.2 Hz or lower is described. The G signal selects a pixel.

Figure 6:
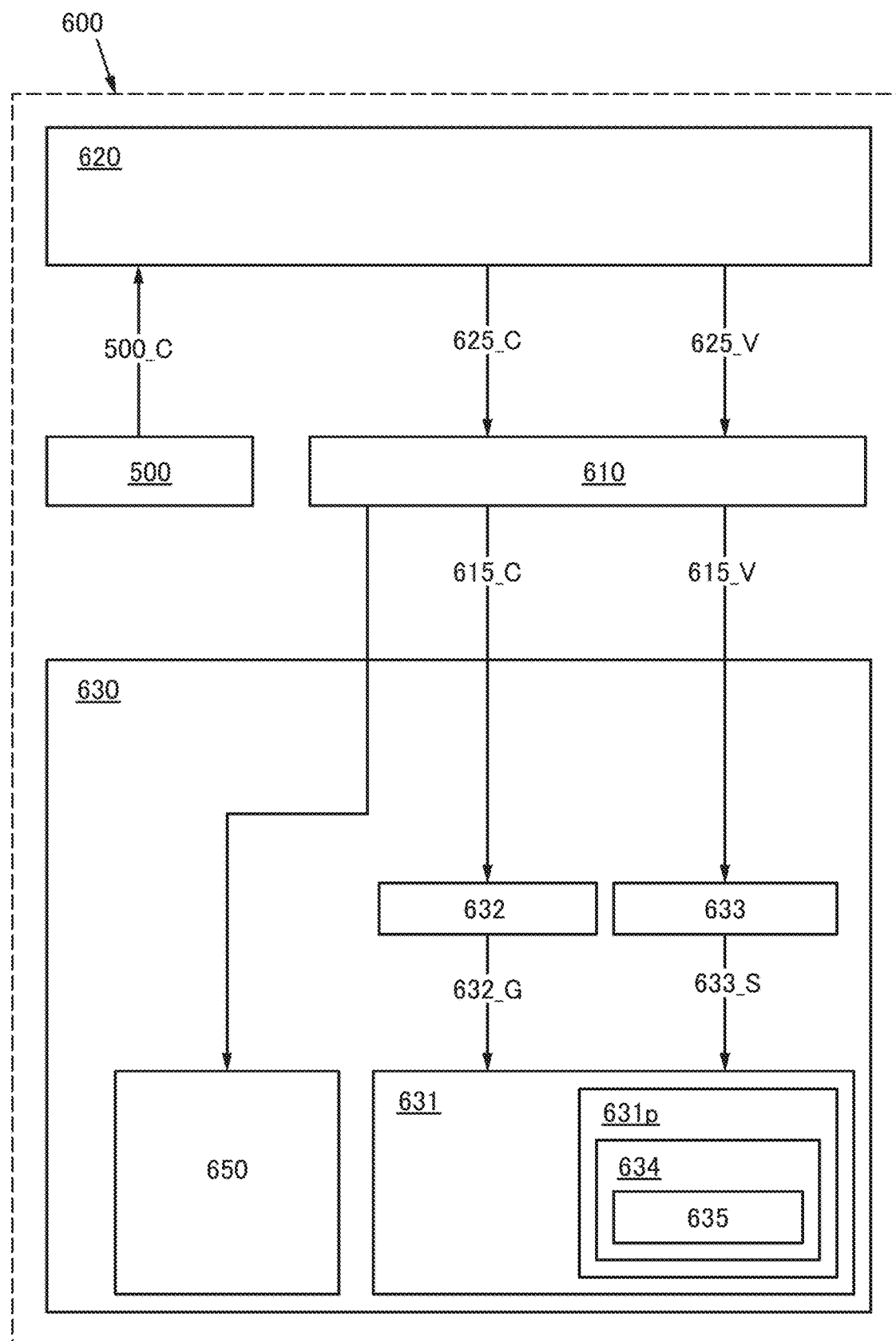
FIG. 6 A block diagram illustrating a structure of a liquid crystal display device having a display function of one embodiment of the present invention.

FIG. 6 is a block diagram of a structure of a liquid crystal display device having a display function of one embodiment of the present invention.

FIG. 7 are a block diagram and a circuit diagram of a structure of a display portion in the liquid crystal display device having a display function of one embodiment of the present invention.

<1. Structure of Liquid Crystal Display Device>

A liquid crystal display device 600 having a display function, which is described as an example in this embodiment and illustrated in FIG. 6, includes a pixel portion 631 including pixel circuits 634; the pixel circuits 634 which hold first driving signals (also referred to as S signals) 633_S input and include display elements 635; the display elements 635 display an image on the pixel portion 631 in accordance with the S signals 633_S; a first driver circuit (also referred to as S driver circuit) 633 which outputs the S signals 633_S to the pixel circuits 634; and a second driver circuit (also referred to as G driver circuit) 632 which outputs second driving signals (also referred to as G signals) 632_G for selecting the pixel circuits 634 to the pixel circuits 634.

The G driver circuit 632 has a first mode in which a G signal 632_G is output to a pixel at a frequency of 30 or more times per second, preferably a frequency of 60 or more times and less than 960 times per second and a second mode in which the G signal 632_G is output to a pixel at a frequency of one or more times per day and less than 0.1 time per second, preferably a frequency of one or more times per hour and less than once per second.

Note that in the G driver circuit 632, the first mode and the second mode are switched in accordance with a mode-switching signal.

The pixel circuit 634 is provided in a pixel 631p. A plurality of pixels 631p is provided in the pixel portion 631. The pixel portion 631 is provided in a display portion 630.

The liquid crystal display device 600 having a display function includes an arithmetic unit 620. The arithmetic unit 620 outputs a first-order control signal 625_C and a first-order image signal 625_V.

The liquid crystal display device 600 includes a control unit 610. The control unit 610 controls the S driver circuit 633 and the G driver circuit 632.

In the case where a liquid crystal element is used as the display element 635, a light supply portion 650 is provided in the display portion 630. The light supply portion 650 supplies light to the pixel portion 631 including the liquid crystal element, and functions as a backlight.

In the liquid crystal display device 600 having a display function, the frequency for selecting one from a plurality of pixel circuits 634 in the pixel portion 631 can be changed by the G signal 632_G output from the G driver circuit 632. As a result, the liquid crystal display device 600 can have a display function which gives less eyestrain to users.

Elements included in the liquid crystal display device having a display function of one embodiment of the present invention are described below.

<2. Arithmetic Unit>

The arithmetic unit 620 generates the first-order image signal 625_V and the first-order control signal 625_C.

The first-order control signal 625_C generated by the arithmetic unit 620 includes the mode-switching signal.

For example, the arithmetic unit 620 may output the first-order control signal 625_C including the mode-switching signal in accordance with an image-switching signal 500_C output from an input unit 500.

When the image-switching signal 500_C is input to the G driver circuit 632 in the second mode from the input unit 500 through the control unit 610, the G driver circuit 632 switches its mode from the second mode to the first mode, and outputs a G signal at least once, and then switches its modes to the second mode.

For example, when the input unit 500 senses a page turning operation, the input unit 500 outputs the image-switching signal 500_C to the arithmetic unit 620.

The arithmetic unit 620 generates the first-order image signal 625_V including the page turning operation signal and outputs the first-order image signal 625_V together with the first-order control signal 625_C including the image-switching signal 500_C.

The control unit 610 outputs the image-switching signal 500_C to the G driver circuit 632 and outputs the second-order image signal 615_V including the page turning operation signal to the S driver circuit 633.

The G driver circuit 632 switches its modes from the second mode to the first mode, and outputs the G signal 632_G at a rate at which a change in image by signal rewrite operation is difficult to be perceived.

Meanwhile, the S driver circuit 633 outputs to the pixel circuits 634 the S signals 633_S generated from the second-order image signal 615_V including the page turning operation signal.

The second-order image signal 615_V including the page turning operation signal is applied to the pixel 631p; thus, the pixel 631p can display many frame images including the page turning operation for a short time, resulting in smooth page turning operation.

The arithmetic unit 620 may be configured to determine whether the first-order image signal 625_V output from the arithmetic unit 620 to the display portion 630 is an moving image or a still image, and output a signal for selecting the first mode when the first-order image signal 625_V is a moving image and output a signal for selecting the second mode when the first-order image signal 625_V is a still image.

Whether the first-order image signal 625_V is a moving image or a still image can be determined in accordance with a difference in signal between one frame in the first-order image signal 625_V and the previous or next frame. When the difference is larger than a predetermined value, the signal is a moving image; when the difference is less than or equal to the predetermined value, the signal is a still image.

Alternatively, a structure can be employed in which when the second mode is switched to the first mode, the G signal 632_G is output a predetermined number of times which is larger than or equal to one, and then the first mode is switched to the second mode.

<3. Control Unit>

The control unit 610 outputs the second-order image signal 615_V generated from the first-order image signal 625_V (see FIG. 6). Note that the control unit 610 may be configured to output the first-order image signal 625_V directly to the display portion 630.

The control unit 610 has a function of generating a second-order control signal 615_C (e.g., a start pulse signal SP, a latch signal LP, or a pulse width control signal PWC) from the first-order control signal 625_C including a synchronization signal (e.g., a vertical synchronization signal or a horizontal synchronization signal) and supplying the generated signal to the display portion 630. Note that the second-order control signal 615_C includes a clock signal CK or the like.

The control unit 610 may be provided with an inversion control circuit to have a function of inverting the polarity of the second-order image signal 615_V at a timing notified by the inversion control circuit. Specifically, the inversion of the polarity of the second-order image signal 615_V may be performed in the control unit 610 or in the display portion 630 in accordance with an instruction by the control unit 610.

The inversion control circuit has a function of determining timing of inverting the polarity of the second-order image signal 615_V by using a synchronization signal. For example, the inversion control circuit includes a counter and a signal generation circuit.

The counter has a function of counting the number of frame periods by using the pulse of a horizontal synchronization signal.

The signal generation circuit has a function of notifying timing of inverting the polarity of the second-order image signal 615_V to the control unit 610 so that the polarity of the second-order image signal 615_V is inverted every plural consecutive frame periods by using information on the number of frame periods that is obtained in the counter.

<4. Display Portion>

The display portion 630 includes the pixel portion 631 including a display element 635 in each pixel and driver circuits such as the S driver circuit 633 and the G driver circuit 632. The pixel portion 631 includes a plurality of pixels 631p each provided with the display element 635 (see FIG. 6).

The second-order image signal 615_V that are input to the display portion 630 are supplied to the S driver circuit 633. In addition, power supply potentials and the second-order control signal 615_C are supplied to the S driver circuit 633 and the G driver circuit 632.

Note that the second-order control signals 615_C include an S driver circuit start pulse signal and an S driver circuit clock signal that control the operation of the S driver circuit 633; a latch signal; a G driver circuit start pulse and a G driver circuit clock signal that control the operation of the G driver circuit 632; a pulse width control signal; and the like.

Figure 7A:
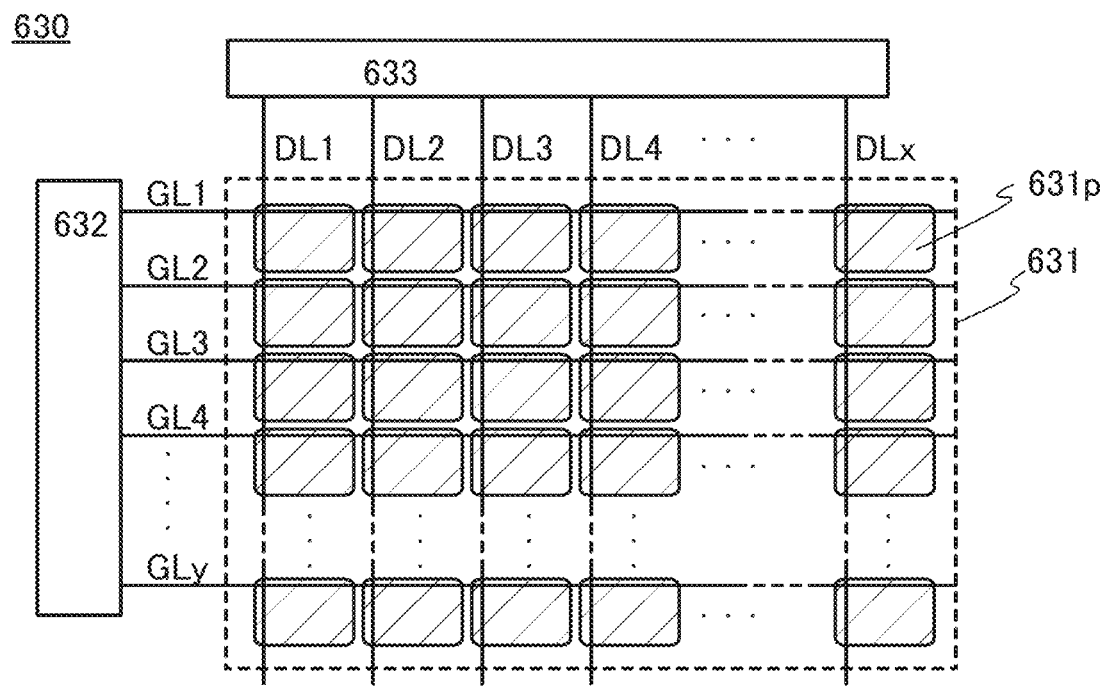
FIG. 7 A diagram illustrating a structure of a display portion of a liquid crystal display device having a display function of one embodiment of the present invention.

FIG. 7A illustrates an example of a structure of the display portion 630.

In the display portion 630 in FIG. 7A, the plurality of pixels 631p, a plurality of scan lines GL for selecting the pixels 631p row by row, and a plurality of signal lines DL for supplying the S signals 633_S generated from the second-order image signal 615_V to the selected pixels 631p are provided in the pixel portion 631.

The input of the G signals 632_G to the scan lines GL is controlled by the G driver circuit 632. The input of the S signals 633_S to the signal lines DL is controlled by the S driver circuit 633. Each of the plurality of pixels 631p is connected to at least one of the scan lines GL and at least one of the signal lines DL.

Note that the kinds and number of the wirings in the pixel portion 631 can be determined by the structure, number, and position of the pixels 631p. Specifically, in the pixel portion 631 illustrated in FIG. 7A, the pixels 631p are arranged in a matrix of x columns and y rows, and the signal lines DL1 to DLx and the scan lines GL1 to GLy are provided in the pixel portion 631.

<4-1. Pixel>

Each pixel 631p includes the display element 635 and the pixel circuit 634 including the display element 635.

<4-2. Pixel Circuit>

Figure 7B:
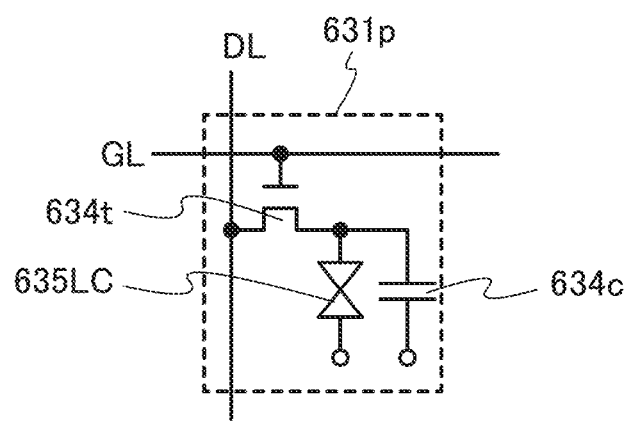

In this embodiment, FIG. 7B illustrates an example of a structure of the pixel circuit 634 in which a liquid crystal element 635LC is used as the display element 635.

The pixel circuit 634 includes a transistor 634t for controlling supply of the S signal 633_S to the liquid crystal element 635LC. An example of connection relation between the transistor 634t and the display element 635 is described.

A gate of the transistor 634t is electrically connected to any one of the scan lines GL1 to GLy. One of a source and a drain of the transistor 634t is electrically connected to any one of the signal lines DL1 to DLx. The other of the source and the drain of the transistor 634t is connected to a first electrode of the display element 635.

Note that pixel 631p may include, in addition to the capacitor 634c for holding voltage between a first electrode and a second electrode of the liquid crystal element 635LC, another circuit element such as a transistor, a diode, a resistor, a capacitor, or an inductor as needed.

In the pixel 631p illustrated in FIG. 7B, one transistor 634t is used as a switching element for controlling input of the S signal 633_S to the pixel 631p. However, a plurality of transistors which serve as one switching element may be used in the pixel 631p. In the case where the plurality of transistors serve as one switching element, the transistors may be connected to one another in parallel, in series, or in combination of parallel connection and series connection.

Note that the capacitance of the pixel circuit 634 may be adjusted as appropriate. For example, in the second mode to be described later, in the case where the S signal 633_S is held for a relatively long time (specifically, greater than or equal to $\frac{1}{60}$ sec), the capacitor 634c is provided. Alternatively, the capacitance of the pixel circuit 634 may be adjusted by utilizing a structure other than the capacitor 634c. For example, with a structure in which the first electrode and the second electrode of the liquid crystal element 635LC are formed to overlap with each other, a capacitor may be substantially formed.

Note that the structure of the pixel circuit 634 can be selected depending on the kind of the display element 635 or the driving method.

<4-2a. Display Element>

The liquid crystal element 635LC includes a first electrode, a second electrode, and a liquid crystal layer including a liquid crystal material to which the voltage between the first electrode and the second electrode is applied. In the liquid crystal element 635LC, the alignment of liquid crystal molecules is changed in accordance with the level of voltage applied between the first electrode and the second electrode, so that the transmittance is changed. Accordingly, the transmittance of the display element 635 is controlled by the potential of the S signal 633_S; thus, gradation can be expressed.

<4-2b. Transistor>

The transistor 634t controls whether to apply the potential of the signal line S to the first electrode of the display element 635. A predetermined reference potential Vcom is applied to the second electrode of the display element 635.

Note that a transistor including an oxide semiconductor can be suitably used as the transistor in the liquid crystal display device of one embodiment of the present invention. Embodiments 6 and 7 can be referred to for details of the transistor including an oxide semiconductor.

<5. Light Supply Portion>

A plurality of light sources is provided in the light supply portion 650. The control unit 610 controls driving of the light sources in the light supply portion 650. Note that in the case of a reflective liquid crystal display device, the light supply portion 650 is not necessarily provided.

The light source in the light supply portion 650 can be a cold cathode fluorescent lamp, a light-emitting diode (LED), an OLED element generating luminescence (electroluminescence) when an electric field is applied thereto, or the like. A coloring method of the light source in the light supply portion 650 is, for example, a method in which light emission of red, green, and blue is used (a three-color method), a method in which part of blue light emission is converted into red or green (a color conversion method or a quantum dot method), or a method in which part of white light emission is converted into red, green, and blue by being transmitted through a color filter (a color filter method).

<6. Input Unit>

As the input unit 500, a touch panel, a touch pad, a finger joystick, a trackball, a data glove, or an imaging device can be used, for example. In the arithmetic unit 620, an electric signal output from the input unit 500 can be associated with coordinates of a display portion. Accordingly, users can input an instruction for processing information displayed on the display portion.

Examples of information input with the input unit 500 by users are instructions for dragging an image displayed on the display portion to another position on the display portion; for swiping a screen for turning a displayed image and displaying the next image; for scrolling a continuous image; for selecting a specific image; for pinching a screen for changing the size of a displayed image; and for inputting handwritten characters.

In this embodiment, one embodiment of the present invention has been described. Other embodiments of the present invention are described in Embodiments below. Note that one embodiment of the present invention is not limited to the above examples. In other words, various embodiments of the invention are described in this embodiment and the other embodiments, and one embodiment of the present invention is not limited to a particular embodiment. Although an example in which a channel formation region, a source region, a drain region, or the like of a transistor includes an oxide semiconductor is described as one embodiment of the present invention, one embodiment of the present invention is not limited thereto. Depending on circumstances or conditions, various transistors or a channel formation region, a source region, a drain region, or the like of a transistor in one embodiment of the present invention may include various semiconductors. Depending on circumstances or conditions, various transistors or a channel formation region, a source region, a drain region, or the like of a transistor in one embodiment of the present invention may include, for example, at least one of silicon, germanium, silicon germanium, silicon carbide, gallium arsenide, aluminum gallium arsenide, indium phosphide, gallium nitride, and an organic semiconductor. Alternatively, for example, depending on circumstances or conditions, various transistors or a channel formation region, a source region, a drain region, or the like of a transistor in one embodiment of the present invention does not necessarily include an oxide semiconductor.

Note that this embodiment can be combined with any of the other embodiments in this specification as appropriate.

(Embodiment 3)

In this embodiment, an example of a method for driving the liquid crystal display device described in Embodiment 2 is described with reference to FIG. 7 and FIG. 8.

FIG. 7 are a block diagram and a circuit diagram illustrating a configuration of a display portion of a liquid crystal display device having a display function in one embodiment of the present invention.

Figure 8:
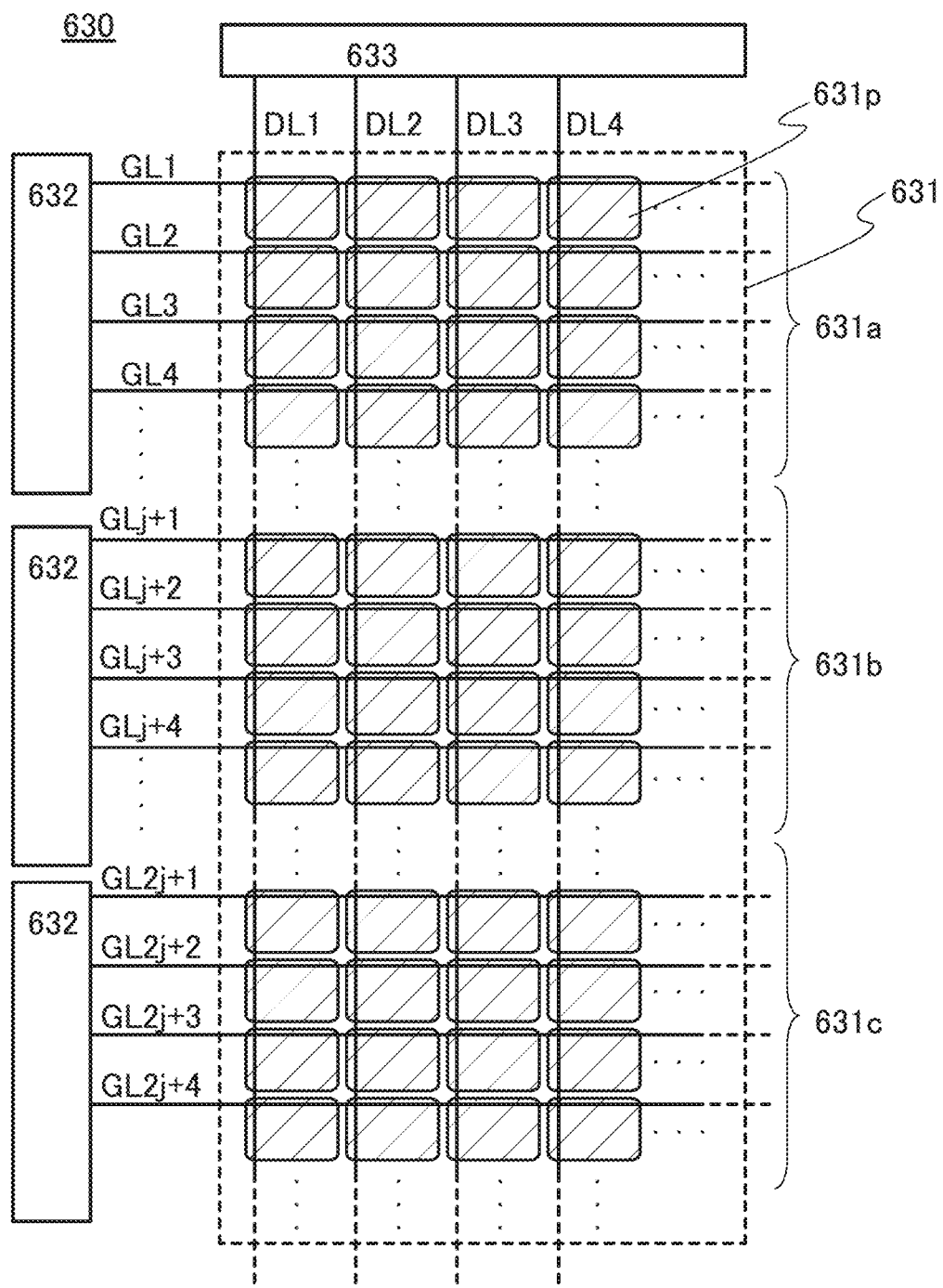
FIG. 8 A diagram illustrating a structure of a display portion of a liquid crystal display device having a display function of one embodiment of the present invention.

FIG. 8 is a block diagram illustrating a modification example of a configuration of a display portion of a liquid crystal display device having a display function in one embodiment of the present invention.

<1. Method for Writing S Signals into Pixel Portion>

An example of a method for writing the S signals 633_S into the pixel portion 631 in FIG. 7A or FIG. 8 is described. Specifically, the method described here is a method for writing the S signal 633_S into each pixel 631p including the pixel circuit illustrated in FIG. 7B in the pixel portion 631.

<Writing Signals into Pixel Portion>

In a first frame period, the scan line GL1 is selected by input of the G signal 632_G with a pulse to the scan line GL1. In each of the plurality of pixels 631p connected to the selected scan line GL1, the transistor 634t is turned on.

When the transistors 634t are on (in one line period), the potentials of the S signals 633_S generated from the second-order image signals 615_V are applied to the signal lines DL1 to DLx. Through each of the transistors 634t that are on, charge corresponding to the potential of the S signal 633_S is accumulated in the capacitor 634c and the potential of the S signal 633_S is applied to a first electrode of the liquid crystal element 635LC.

In a period during which the scan line GL1 is selected in the first frame period, the S signals 633_S having a positive polarity are sequentially input to all the signal lines DL1 to DLx. Thus, the S signals 633_S having a positive polarity are input to first electrodes GL1DL1 to GL1DLx in the pixels 631p that are connected to the scan line GL1 and the signal lines DL1 to DLx. Accordingly, the transmittance of the liquid crystal element 635LC is controlled by the potential of the S signal 633_S; thus, gradation is expressed by the pixels.

Similarly, the scan lines GL2 to GLy are sequentially selected, and the pixels 631p connected to the scan lines GL2 to GLy are sequentially subjected to the same operation as that performed while the scan line GL1 is selected. Through the above operations, an image for the first frame can be displayed on the pixel portion 631.

Note that in one embodiment of the present invention, the scan lines GL1 to GLy are not necessarily selected sequentially.

It is possible to employ dot sequential driving in which the S signals 633_S are sequentially input to the signal lines DL1 to DLx from the S driver circuit 633 or line sequential driving in which the S signals 633_S are input all at once. Alternatively, a driving method in which the S signals 633_S are sequentially input to every plural signal lines DL may be employed.

In addition, the method for selecting the scan lines GL is not limited to progressive scan; interlaced scan may be employed for selecting the scan lines GL.

In given one frame period, the polarities of the S signals 633_S input to all the signal lines may be the same, or the polarities of the S signals 633_S to be input to the pixels may be inverted signal line by signal line.

<Writing Signals into Pixel Portion Divided into Plurality of Regions>

FIG. 8 illustrates a modification example of the structure of the display portion 630.

In the display portion 630 in FIG. 8, the plurality of pixels 631p, the plurality of scan lines GL for selecting the pixels 631p row by row, and the plurality of signal lines DL for supplying the S signals 633_S to the selected pixels 631p are provided in the pixel portion 631 divided into a plurality of regions (specifically, a first region 631a, a second region 631b, and a third region 631c).

The input of the G signals 632_G to the scan lines GL in each region is controlled by the corresponding G driver circuit 632. The input of the S signals 633_S to the signal lines S is controlled by the S driver circuit 633. Each of the plurality of pixels 631p is connected to at least one of the scan lines GL and at least one of the signal lines DL.

Such a structure allows the pixel portion 631 to be divided into separately driven regions.

For example, the following operation is possible: when information is input from a touch panel used as the input unit 500, coordinates specifying a region to which the information is to be input are obtained, and the G driver circuit 632 driving the region corresponding to the coordinates operates in the first mode and the G driver circuit 632 driving the other region operates in the second mode. Thus, it is possible to stop the operation of the G driver circuit for a region where information has not been input from the touch panel, that is, a region where rewriting of a displayed image is not necessary.

<2. G Driver Circuit in First Mode and Second Mode>

The S signal 633_S is input to the pixel circuit 634 to which the G signal 632_G output by the G driver circuit 632 is input. In a period during which the G signal 632_G is not input, the pixel circuit 634 holds the potential of the S signal 633_S. In other words, the pixel circuit 634 holds a state where the potential of the S signal 633_S is written in.

The pixel circuit 634 into which display data is written maintains a display state corresponding to the S signal 633_S. Note that to maintain a display state is to keep the amount of change in display state within a given range. This given range is set as appropriate, and is preferably set so that a user viewing displayed images can recognize the displayed images as the same image.

The G driver circuit 632 has the first mode and the second mode.

<2-1. First Mode>

The G driver circuit 632 in the first mode outputs the G signals 632_G to pixels at a rate of higher than or equal to 30 times per second, preferably higher than or equal to 60 times per second and lower than 960 times per second.

The G driver circuit 632 in the first mode rewrites signals at a speed such that change in images which occurs each time signals are rewritten is difficult to be recognized by the user.

As a result, a smooth moving image can be displayed.

<2-2. Second Mode>

The G driver circuit 632 in the second mode outputs the G signals 632_G to pixels at a rate of higher than or equal to once per day and lower than 0.1 times per second, preferably higher than or equal to once per hour and lower than once per second.

More preferably, it outputs at a rate of higher than or equal to once per 30 seconds and lower than once per second.

In a period during which the G signal 632_G is not input, the pixel circuit 634 keeps holding the S signal 633_S and maintains the display state corresponding to the potential of the S signal 633_S.

In this manner, display without flickering due to rewriting of the display in the pixel can be performed in the second mode.

As a result, eyestrain of a user of the liquid crystal display device having a display function can be reduced.

Power consumed by the G driver circuit 632 is reduced in a period during which the G driver circuit 632 does not operate.

Note that the pixel circuit that is driven by the G driver circuit 632 having the second mode is preferably configured to hold the S signal 633_S for a long period. For example, the off-state leakage current of the transistor 634t is preferably as low as possible.

Embodiments 6 and 7 can be referred to for examples of a structure of the transistor 634t with low off-state leakage current.

Note that this embodiment can be combined with any of the other embodiments in this specification as appropriate.

(Embodiment 4)

In this embodiment, an example of a method for driving the liquid crystal display device described in Embodiment 2 is described with reference to FIG. 9 to FIG. 11.

Figure 9:
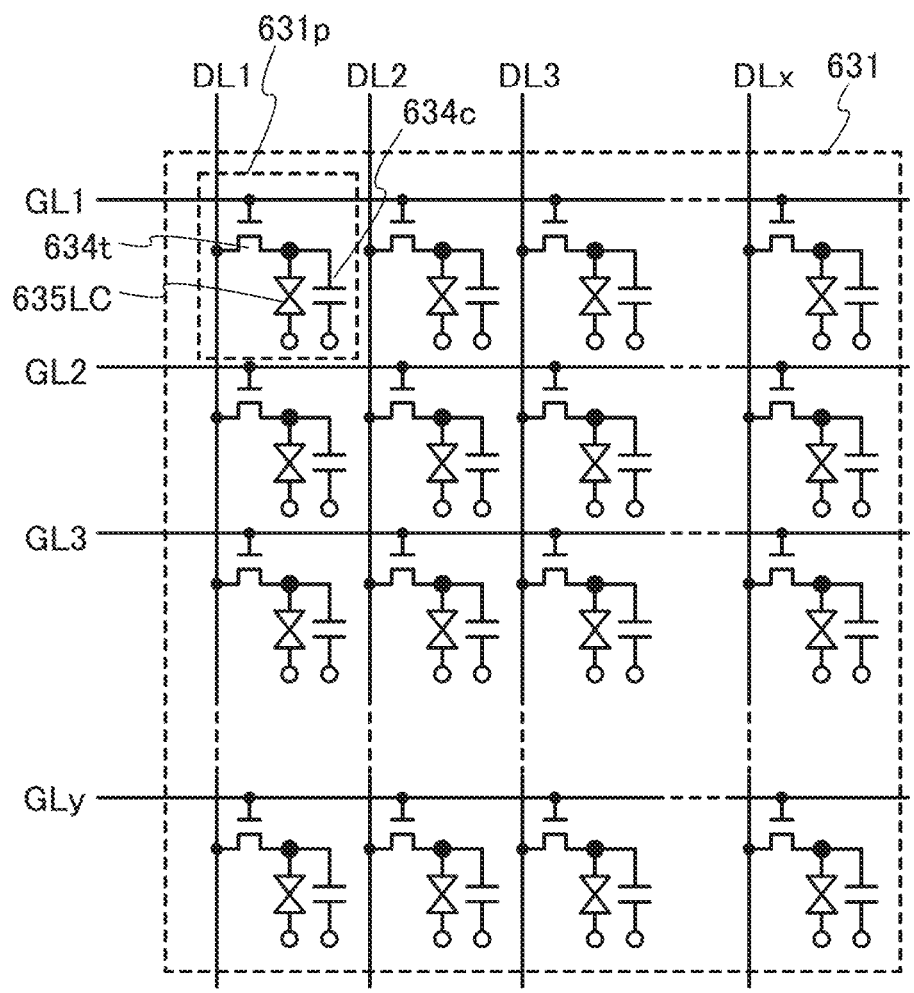
FIG. 9 A circuit diagram illustrating a liquid crystal display device having a display function of one embodiment of the present invention.

FIG. 9 is a circuit diagram illustrating a liquid crystal display device having a display function in one embodiment of the present invention.

FIG. 10 illustrate source line inversion driving and dot line inversion driving of a liquid crystal display device having a display function in one embodiment of the present invention.

Figure 11:
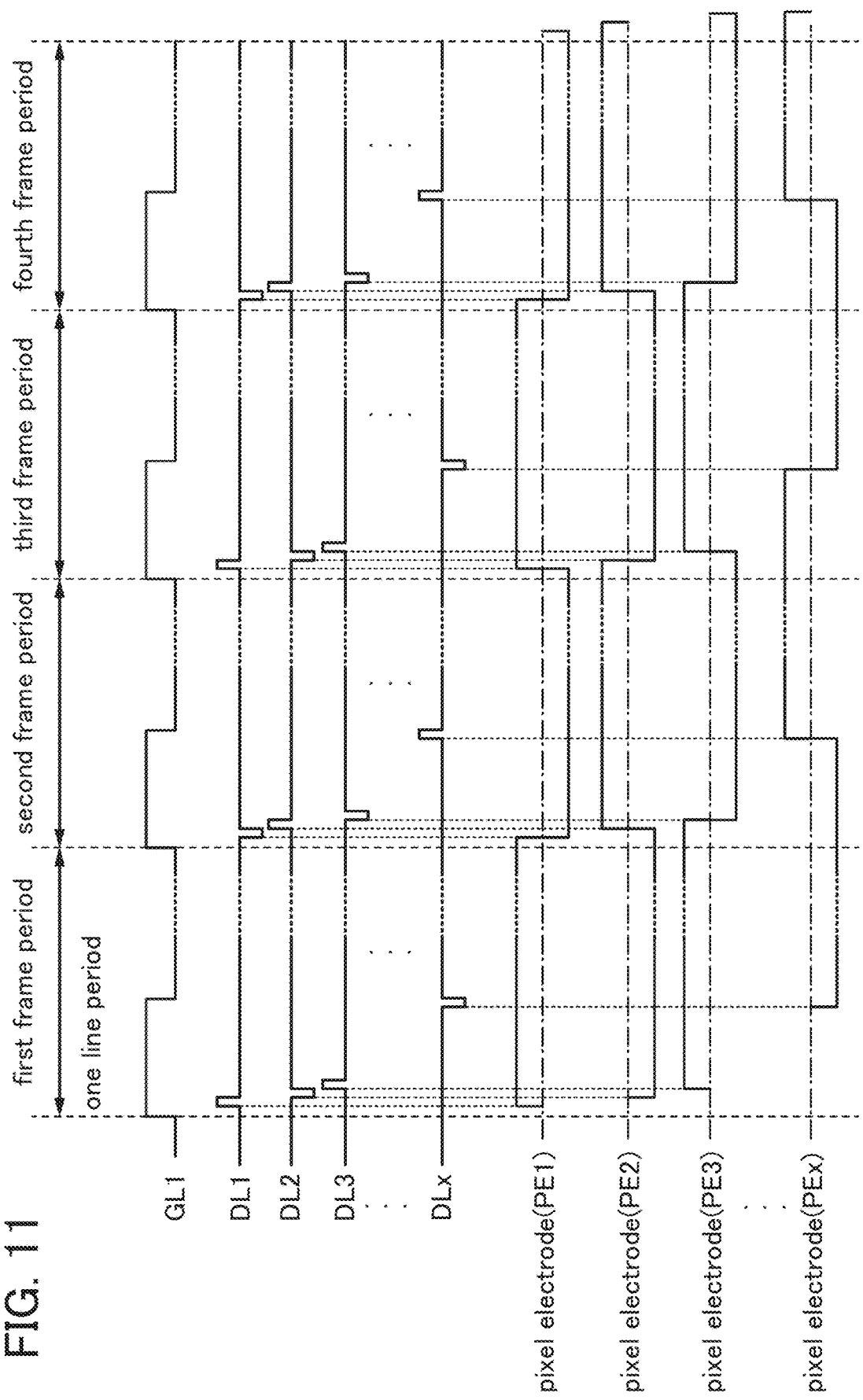
FIG. 11 A timing chart illustrating source line inversion driving and dot inversion driving of a liquid crystal display device having a display function of one embodiment of the present invention.

FIG. 11 is a timing chart illustrating source line inversion driving and dot line inversion driving of a liquid crystal display device having a display function in one embodiment of the present invention.

<1. Overdriving>

The response time of liquid crystal from application of voltage to saturation of the change in transmittance is generally about ten milliseconds. Thus, the slow response of the liquid crystal tends to be perceived as a blur of a moving image.

As a countermeasure, in one embodiment of the present invention, overdriving may be employed in which the voltage applied to the display element 635 including the liquid crystal element is temporarily increased so that the alignment of liquid crystal changes quickly. By overdriving, the response speed of the liquid crystal can be increased, a blur of a moving image can be prevented, and the quality of the moving image can be improved.

Further, if the transmittance of the display element 635 including the liquid crystal element keeps changing without reaching a constant value after the transistor 634t is turned off, the relative permittivity of the liquid crystal also changes; accordingly, the voltage held in the display element 635 including the liquid crystal element easily changes.

For example, in the case where no capacitor is connected in parallel to the display element 635 including the liquid crystal element or in the case where the capacitor 634c connected in parallel to the display element 635 including the liquid crystal element has small capacitance, the change in the voltage held in the display element 635 including the liquid crystal element tends to occur markedly. However, by the overdriving, the response time can be shortened and therefore the change in the transmittance of the display element 635 including the liquid crystal element after the transistor 634t is turned off can be made small. Accordingly, even in the case where the capacitor 634c connected in parallel to the display element 635 including the liquid crystal element has small capacitance, the change in the voltage held in the display element 635 including the liquid crystal element after turning off the transistor 634t can be prevented.

<2. Source Line Inversion Driving and Dot Inversion Driving>

In the pixel 631p to which the signal line DLi of the pixel circuit illustrated in FIG. 10 is connected, the pixel electrode 635_1 is positioned between the signal line DLi and a signal line DLi+1 that is adjacent to the signal line DLi. If the transistor 634t is off, it is ideal that the pixel electrode 635_1 and the signal line DLi are electrically separated from each other. Further, ideally, the pixel electrode 635_1 and the signal line DLi+1 are electrically separated from each other. However, there actually exist a parasitic capacitance 634c(i) between the pixel electrode 635_1 and the signal line DLi, and a parasitic capacitance 634c(i+1) between the pixel electrode 635_1 and the signal line DLi+1 (see FIG. 10C). Note that FIG. 10C illustrates a pixel electrode 635_1 serving as a first electrode or a second electrode of the liquid crystal element 635LC, instead of the liquid crystal element 635LC illustrated in FIG. 9.

For example, when a structure is employed in which the first electrode and the second electrode of the liquid crystal element 635LC overlap with each other and the overlap between the two electrodes is practically utilized as a capacitor, there are cases where the capacitor 634c formed using a capacitor line is not connected to the liquid crystal element 635LC, or where the capacitor 634c connected to the liquid crystal element 635LC has a small capacitance. In such cases, the potential of the pixel electrode 635_1 serving as the first electrode or the second electrode of the liquid crystal element is easily affected by the parasitic capacitance 634c(i) and the parasitic capacitor 634c(i+1).

This tends to cause a phenomenon in which even when the transistor 634t is off in the period during which the potential of an image signal is held, the potential of the pixel electrode 635_1 fluctuates in conjunction with a change in the potential of the signal line DLi or the signal line DLi+1.

The phenomenon in which in the period during which the potential of an image signal is held, the potential of a pixel electrode fluctuates in conjunction with a change in the potential of a signal line is referred to as crosstalk. Crosstalk causes degradation of display contrast. For example, in the case of using normally-white liquid crystal for the liquid crystal element 635LC, images are whitish.

In one embodiment of the present invention, in view of the above situation, a driving method may be employed in which image signals having opposite polarities are input to the signal line DLi and the signal line DLi+1 arranged with the pixel electrode 635_1 provided therebetween, in one given frame period.

Note that the "image signals having opposite polarities" means, on the assumption that the potential of a common electrode of the liquid crystal element is a reference potential, an image signal having a potential higher than the reference potential and an image signal having a potential lower than the reference potential.

Two methods (source line inversion and dot inversion) can be given as examples of a method for sequentially writing image signals having alternating opposite polarities into a plurality of pixels which are selected.

In either method, in a first frame period, an image signal having a positive (+) polarity is input to the signal line DLi and an image signal having a negative (−) polarity is input to the signal line DLi+1. Next, in a second frame period, an image signal having a negative (−) polarity is input to the signal line DLi and an image signal having a positive (+) polarity is input to the signal line DLi+1. Then, in a third frame period, an image signal having a positive (+) polarity is input to the signal line DLi and an image signal having a negative (−) polarity is input to the signal line DLi+1 (see FIG. 10C).

When such a driving method is employed, the potentials of a pair of signal lines change in opposite polarity directions, whereby the fluctuation of the potential of a pixel electrode can be canceled out. Therefore, crosstalk can be reduced.

<2-1. Source Line Inversion Driving>

Source line inversion is a method in which image signals having opposite polarities are input in one given frame period so that the polarity of an image signal input to a plurality of pixels connected to one signal line and the polarity of an image signal input to a plurality of pixels connected to another signal line that is adjacent to the above signal line are opposite to each other.

Figures 1, 10A:
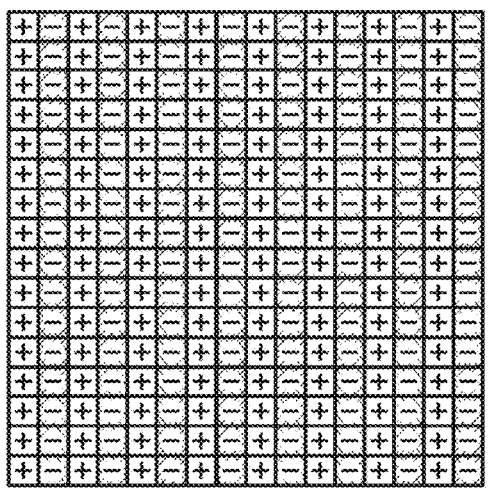
Figures 2, 10A:
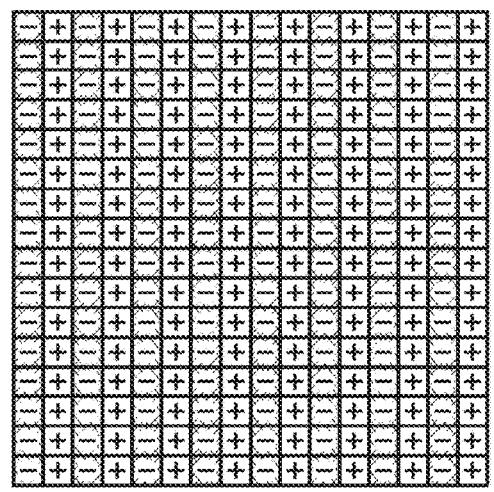

FIGS. 10A1 and 10A2 schematically show polarities of image signals supplied to pixels in the case of source line inversion driving. In FIGS. 10A1 and 10A2, the sign "+" indicates a pixel to which an image signal having a positive polarity is supplied in one given frame period, and the sign "−" indicates a pixel to which an image signal having a negative polarity is supplied in the given frame period. The frame illustrated in FIG. 10A2 is a frame following the frame illustrated in FIG. 10A1.

<2-2. Dot Inversion Driving>

Dot inversion is a method in which image signals having opposite polarities are input in one given frame period so that the polarity of an image signal input to a plurality of pixels connected to one signal line and the polarity of an image signal input to a plurality of pixels connected to another signal line adjacent to the above signal line are opposite to each other and, in addition, so that in the plurality of pixels connected to the one signal line, the polarity of an image signal input to a pixel and the polarity of an image signal input to a pixel adjacent to the pixel are opposite to each other.

Figures 1, 10B:
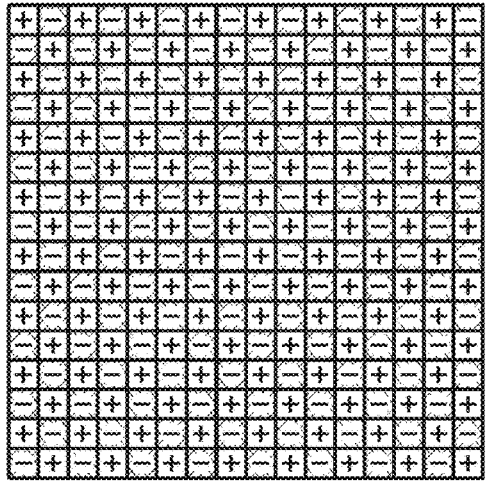
Figures 2, 10B:
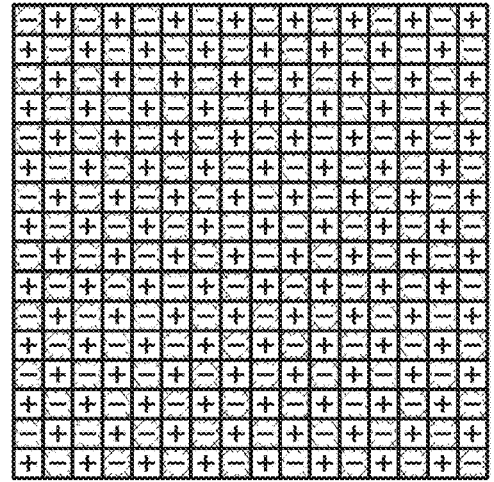
Figure 10C:
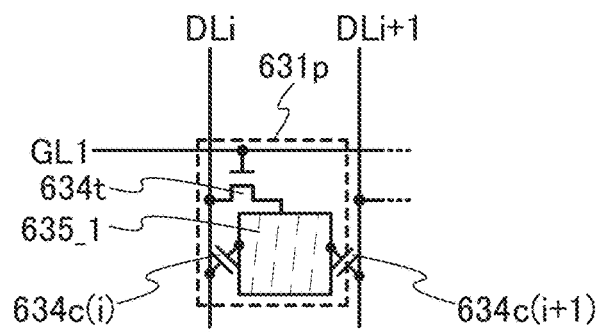
FIG. 10 A diagram illustrating source line inversion driving and dot inversion driving of a liquid crystal display device having a display function of one embodiment of the present invention.

FIGS. 10B1 and 10B2 schematically show polarities of image signals supplied to pixels in the case of dot inversion driving. In FIGS. 10B1 and 10B2, the sign "+" indicates a pixel to which an image signal having a positive polarity is supplied in one given frame period, and the sign "−" indicates a pixel to which an image signal having a negative polarity is supplied in the given frame period. The frame illustrated in FIG. 10B2 is a frame following the frame illustrated in FIG. 10B1.

<2-3. Timing Chart>

FIG. 11 is a timing chart in the case of operating the pixel portion 631 illustrated in FIG. 9 by source line inversion driving. Specifically, FIG. 11 shows changes over time of the potential of a signal supplied to the scan line GL1, the potentials of image signals supplied to the signal lines DL1 to DLx, and the potentials of the pixel electrodes included in pixels connected to the scan line GL1.

First, the scan line GL1 is selected by inputting a signal with a pulse to the scan line GL1. In each of the plurality of pixels 631p connected to the selected scan line GL1, the transistor 634t is turned on. When a potential of an image signal is supplied to the signal lines DL1 to DLx in the state where the transistor 634t is on, the potential of the image signal is supplied to the pixel electrode of the liquid crystal element 635LC via the on-state transistor 634t.

In the timing chart of FIG. 11, an example is shown in which, in a period during which the scan line GL1 is selected in the first frame period, image signals having a positive polarity are sequentially input to the odd-numbered signal lines DL1, DL3, . . . and image signals having a negative polarity are sequentially input to the even-numbered signal lines DL2, DL4, . . . , DLx. Therefore, image signals having a positive polarity are supplied to the pixel electrodes (PE1), (PE3), . . . in the pixels 631p which are connected to the odd-numbered signal lines DL1, DL3, . . . . Further, image signals having a negative polarity are supplied to the pixel electrodes (PE2), (PE4), . . . , (PEx) in the pixels 631p connected to the even-numbered signal lines DL2, DL4, . . . , DLx.

In the liquid crystal element 635LC, the alignment of liquid crystal molecules is changed in accordance with the level of the voltage applied between the pixel electrode and the common electrode, whereby transmittance is changed. Accordingly, the transmittance of the liquid crystal element 635LC can be controlled by the potential of the image signal; thus, gradation can be displayed.

When input of image signals to the signal lines DL1 to DLx is completed, the selection of the scan line GL1 is terminated. When the selection of the scan line is terminated, the transistors 634t are turned off in the pixels 631p connected to the scan line. Then, voltage applied between the pixel electrode and the common electrode is held in the liquid crystal element 635LC, whereby display of gradation is maintained. Further, the scan lines GL2 to GLy are sequentially selected, and operations similar to that in the period during which the scan line GL1 is selected are performed in the pixels connected to the above respective scan lines.

Next, the scan line GL1 is selected again in the second frame period. In a period during which the scan line GL1 is selected in the second frame period, image signals having a negative polarity are sequentially input to the odd-numbered signal lines DL1, DL3, . . . and image signals having a positive polarity are sequentially input to the even-numbered signal lines DL2, DL4, . . . , DLx, unlike the period during which the scan line GL1 is selected in the first frame period. Therefore, image signals having a negative polarity are supplied to the pixel electrodes (PE1), (PE3), . . . in the pixels 631p which are connected to the odd-numbered signal lines DL1, DL3, . . . . Further, image signals having a positive polarity are supplied to the pixel electrodes (PE2), (PE4), . . . , (PEx) in the pixels 631p connected to the even-numbered signal lines DL2, DL4, . . . , DLx.

Also in the second frame period, when input of image signals to the signal lines DL1 to DLx is completed, the selection of the scan line GL1 is terminated. Further, the scan lines GL2 to GLy are sequentially selected, and operations similar to that in the period during which the scan line GL1 is selected are performed in the pixels connected to the above respective scan lines.

An operation similar to the above is repeated in the third frame period and the fourth frame period.

Although an example in which image signals are sequentially input to the signal lines DL1 to DLx is shown in the timing chart of FIG. 11, one embodiment of the present invention is not limited to this structure. Image signals may be input to the signal lines DL1 to DLx all at once, or image signals may be sequentially input per plurality of signal lines.

In this embodiment, the scan line is selected by progressive scan; however, interlace scan may also be employed for selecting a scan line.

By inversion driving in which the polarity of the potential of an image signal is inverted using the reference potential of a common electrode as a reference, degradation of liquid crystal called burn-in can be prevented.

However, in the inversion driving, the change in the potential supplied to the signal line is increased at the time of changing the polarity of the image signal; thus, a potential difference between a source electrode and a drain electrode of the transistor 634t which functions as a switching element is increased. Accordingly, degradation of characteristics, such as a shift of threshold voltage, is easily caused in the transistor 634t.

Furthermore, in order to maintain the voltage held in the liquid crystal element 635LC, the off-state current of the transistor 634t needs to be low even when the potential difference between the source electrode and the drain electrode is large.

Note that this embodiment can be combined with any of the other embodiments in this specification as appropriate.

(Embodiment 5)

In this embodiment, a method for generating an image that can be displayed on the liquid crystal display device of one embodiment of the present invention is described using FIG. 12. In particular, an eye-friendly image switching method is described. The eye-friendly image switching method includes an image switching method by which eyestrain of users is reduced and an image switching method by which the eyestrain is not caused.

High-speed image switching causes eyestrain of users in some cases. For example, moving image display for which images are switched at an extremely high speed and the case of switching between different still images correspond to the high-speed image switching.

When images are switched for displaying different images, it is preferable that the images be switched gradually (silently) and naturally, not instantaneously.

For example, when a first image is changed to a second image that is different from the first image, it is preferable to interpose a fade-out image of the first image and/or a fade-in image of the second image between the first image and the second image. Alternatively, an image obtained by overlapping the first image and the second image may be interposed so that the second image fades in at the same time when the first image fades out (this technique is also referred to as crossfading). Further alternatively, a moving image (also referred to as morphing) for displaying the process in which the first image gradually changes into the second image may be interposed.

Specifically, a first still image is displayed at a low refresh rate, followed by an image for image switching is displayed at a high refresh rate, and then a second still image is displayed at a low refresh rate.

<Fade-in, Fade-out>

An example of a method for switching images A and B which are different images is described below.

Figure 12A:
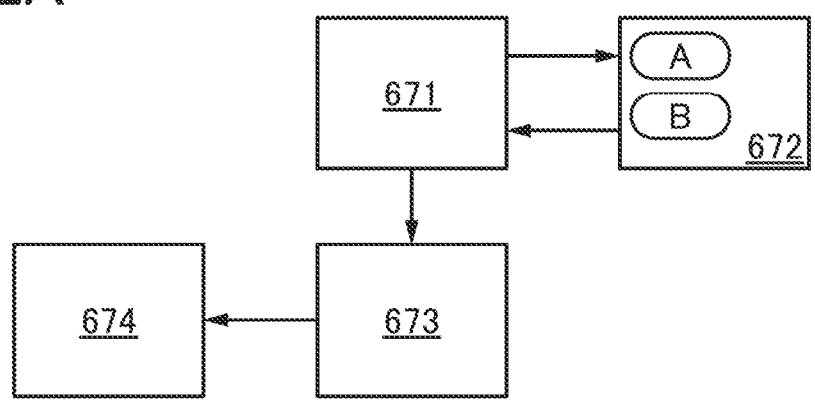
FIG. 12 A diagram showing a structure of a display device of one embodiment of the present invention.

FIG. 12A is a block diagram of a structure of a display device capable of switching images. The display device illustrated in FIG. 12A includes an arithmetic unit 671, a memory unit 672, a graphic unit 673, and a display means 674.

In the first step, the arithmetic unit 671 makes the memory unit 672 store data for the image A and data for the image B from an external memory device or the like.

In the second step, the arithmetic unit 671 sequentially generates new image data on the basis of the data for the image A and the data for the image B, in accordance with a division number set in advance.

In the third step, the arithmetic unit 671 outputs the generated image data to the graphic unit 673. The graphic unit 673 makes the display means 674 display the image data.

Figure 12B:
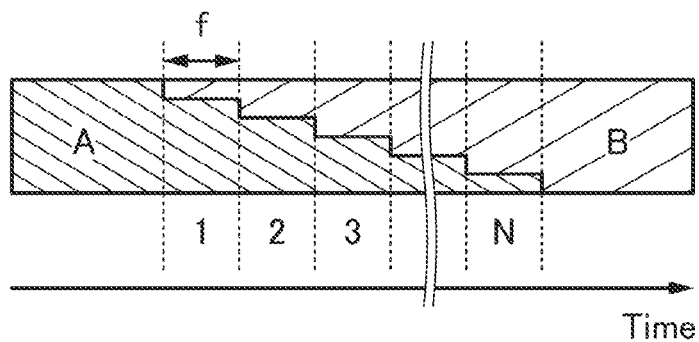

FIG. 12B is a schematic view for explaining image data generated for gradual image switching from the image A to the image B.

FIG. 12B shows the case where N (N is a natural number) sets of image data are generated for switching from the image A to the image B, and each set of image data is displayed for a frame period of f (f is a natural number). Therefore, the period needed for the switching from the image A to the image B is f×N frames.

Here, it is preferable that the above parameters such as N and f can be set freely by users.

The arithmetic unit 671 obtains these parameters in advance, and generates image data in accordance with the parameters.

The i-th generated image data (i is an integer of 1 or larger and N or smaller) is generated by weighting image data of the image A and image data of the image B and summing up the weighted data. For example, when the luminance (gray level) of a certain pixel where the image A is displayed is represented by a and the luminance (gray level) of the pixel where the image B is displayed is represented by b, the luminance (gray level) c of the pixel where the i-th generated image data is displayed is expressed by Formula 2.

[Formula 4]

$$c = \frac{(N-i)a + ib}{N} \quad (4)$$

The image A is changed to the image B using image data generated in the above manner; therefore, discontinuous images can be switched gradually (silently) and naturally.

The case when all pixels satisfy a=0 in Formula 4 corresponds to fade-in when a black image is gradually changed to the image B. The case when all pixels satisfy b=0 corresponds to fade-out when the image A is gradually changed to the black image.

Although the method for switching images by temporarily overlapping two images is described above, a method by which images are not overlapped may be employed.

In the case where two images are not overlapped with each other, a black image may be interposed between the image A and the image B. In this case, the above image switching method can be performed at transition from the image A to the black image and/or transition from the black image to the image B. Moreover, an image interposed between the image A and the image B is not necessarily limited to a black image; a single color image like a white image may be used, or a multicolored image may be used as long as it differs from the image A and the image B.

Interposition of another image, particularly a single color image like a black image, between the image A and the image B enables users to watch images without feeling uncomfortable even when the images are switched; that is, images can be switched without causing stress of users.

Note that this embodiment can be combined with any of the other embodiments in this specification as appropriate.

(Embodiment 6)

In this embodiment, structural examples of transistors which can be used in pixels of a liquid crystal display device are described with reference to drawings.

<Structural Example of Transistor>

Figure 13A:
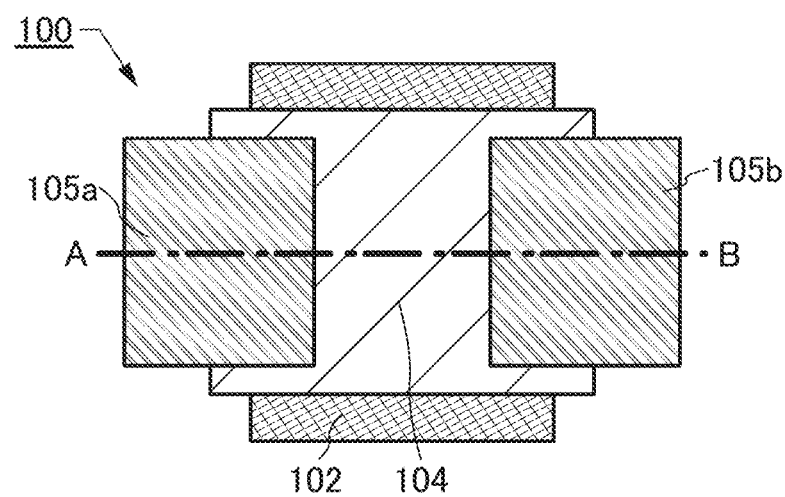
FIG. 13 A diagram showing a structure example of a transistor of one embodiment of the present invention.
Figure 13B:
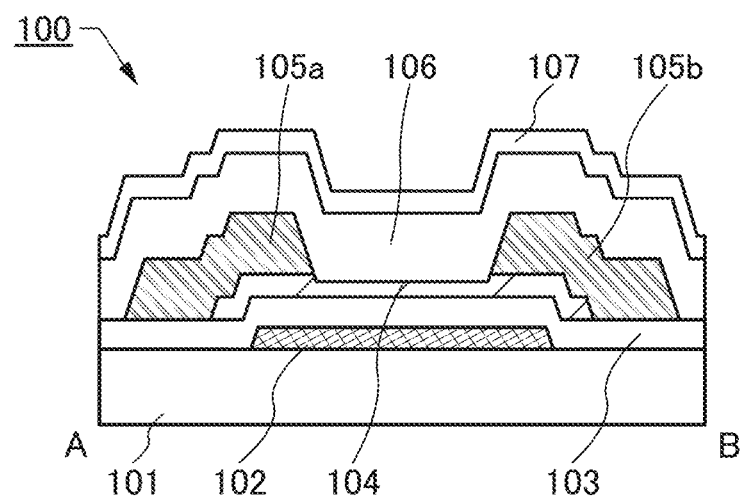

FIG. 13A is a schematic top view of a transistor 100 described below as an example. FIG. 13B is a schematic cross-sectional view of the transistor 100 taken along the section line A-B in FIG. 13A. The transistor 100 illustrated as an example in FIGS. 13A and 13B is a bottom-gate transistor.

The transistor 100 includes a gate electrode 102 over a substrate 101, an insulating layer 103 over the substrate 101 and the gate electrode 102, an oxide semiconductor layer 104 over the insulating layer 103, which overlaps with the gate electrode 102, and a pair of electrodes 105*a* and 105*b* in contact with the top surface of the oxide semiconductor layer 104. Further, an insulating layer 106 is provided to cover the insulating layer 103, the oxide semiconductor layer 104, and the pair of electrodes 105*a* and 105*b*, and an insulating layer 107 is provided over the insulating layer 106.

<<Substrate>>

There is no particular limitation on the property of a material and the like of the substrate 101 as long as the material has heat resistance enough to withstand at least heat treatment which will be performed later. For example, a glass substrate, a ceramic substrate, a quartz substrate, a sapphire substrate, or an yttria-stabilized zirconia (YSZ) substrate may be used as the substrate 101. Alternatively, a single crystal semiconductor substrate or a polycrystalline semiconductor substrate made of silicon or silicon carbide, a compound semiconductor substrate made of silicon germanium, an SOI substrate, or the like can be used as the substrate 101. Still alternatively, any of these substrates provided with a semiconductor element may be used as the substrate 101.

Still alternatively, a flexible substrate such as a plastic substrate may be used as the substrate 101, and the transistor 100 may be provided directly on the flexible substrate. Further alternatively, a separation layer may be provided between the substrate 101 and the transistor 100. The separation layer can be used when part or the whole of the transistor is formed over the separation layer and separated from the substrate 101 and transferred to another substrate. Thus, the transistor 100 can be transferred to a substrate having low heat resistance or a flexible substrate.

Therefore, in this specification and the like, a transistor can be formed using any of a variety of substrates or any of a variety of bases, for example. The type of a substrate is not limited to a certain type. Examples of the substrate include a semiconductor substrate (e.g., a single crystal substrate or a silicon substrate), an SOI substrate, a glass substrate, a quartz substrate, a plastic substrate, a sapphire glass substrate, a metal substrate, a stainless steel substrate, a substrate including stainless steel foil, a tungsten substrate, a substrate including tungsten foil, a flexible substrate, an attachment film, paper including a fibrous material, a base film, and the like. As an example of a glass substrate, a barium borosilicate glass substrate, an aluminoborosilicate glass substrate, a soda lime glass substrate, or the like can be given. As an example of a glass substrate, a barium borosilicate glass substrate, an aluminoborosilicate glass substrate, a soda lime glass substrate, or the like can be given. Examples of the flexible substrate, the attachment film, the base film, and the like are substrates of plastics typified by polyethylene terephthalate (PET), polyethylene naphthalate (PEN), polyether sulfone (PES), and polytetrafluoroethylene (PTFE). Another example is a synthetic resin such as acrylic. Alternatively, polypropylene, polyester, polyvinyl fluoride, polyvinyl chloride, or the like can be used. Alternatively, polyamide, polyimide, aramid, epoxy, an inorganic vapor deposition film, paper, or the like can be used. Specifically, the use of semiconductor substrates, single crystal substrates, SOI substrates, or the like enables the manufacture of small-sized transistors with a small variation in characteristics, size, shape, or the like and with high current capability. A circuit using such transistors achieves lower power consumption of the circuit or higher integration of the circuit.

Alternatively, a flexible substrate may be used as the substrate, and the transistor may be provided directly on the flexible substrate. Further alternatively, a separation layer may be provided between the substrate and the transistor. The separation layer can be used when part or the whole of a semiconductor device formed over the separation layer is separated from the substrate and transferred onto another substrate. In such a case, the transistor can be transferred to a substrate having low heat resistance or a flexible substrate as well. For the above separation layer, a stack including inorganic films, which are a tungsten film and a silicon oxide film, or an organic resin film of polyimide or the like formed over a substrate can be used, for example.

In other words, a transistor may be formed using one substrate, and then transferred to another substrate. Examples of a substrate to which a transistor is transferred include, in addition to the above substrate over which the transistor can be formed, a paper substrate, a cellophane substrate, an aramid film substrate, a polyimide film substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), and the like), a leather substrate, and a rubber substrate. When such a substrate is used, a transistor with excellent properties or a transistor with low power consumption can be formed, a device with high durability, high heat resistance can be provided, or reduction in weight or thickness can be achieved.

<<Gate Electrode>>

The gate electrode 102 can be formed using a metal selected from aluminum, chromium, copper, tantalum, titanium, molybdenum, and tungsten; an alloy containing any of these metals as a component; an alloy containing any of these metals in combination; or the like. Further, one or more metals selected from manganese and zirconium may be used. Furthermore, the gate electrode 102 may have a single-layer structure or a stacked-layer structure of two or more layers. For example, a single-layer structure of an aluminum film containing silicon, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, and the like can be given. Alternatively, an alloy film or a nitride film which contains aluminum and one or more selected from titanium, tantalum, tungsten, molybdenum, chromium, neodymium, and scandium film may be used.

The gate electrode 102 can also be formed using a light-transmitting conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added. It is also possible to have a stacked-layer structure formed using the above light-transmitting conductive material and the above metal.

Further, an In—Ga—Zn-based oxynitride semiconductor film, an In—Sn-based oxynitride semiconductor film, an In—Ga-based oxynitride semiconductor film, an In—Zn-based oxynitride semiconductor film, a Sn-based oxynitride semiconductor film, an In-based oxynitride semiconductor film, a film of metal nitride (such as InN or ZnN), or the like may be provided between the gate electrode 102 and the insulating layer 103. These films each have a work function higher than or equal to 5 eV, preferably higher than or equal to 5.5 eV. Thus, the threshold voltage of the transistor can be shifted in the positive direction, and what is called a normally-off switching element can be achieved. For example, in the case of using an In—Ga—Zn-based oxynitride semiconductor film, an In—Ga—Zn-based oxynitride semiconductor film having a higher nitrogen concentration than at least the oxide semiconductor layer 104, specifically, an In—Ga—Zn-based oxynitride semiconductor film having a nitrogen concentration of 7 at. % or higher is used.

<<Insulating Layer>>

The insulating layer 103 functions as a gate insulating film. The insulating layer 103 in contact with the bottom surface of the oxide semiconductor layer 104 is preferably an oxide insulating film.

The insulating layer 103 may be formed to have a single-layer structure or a stacked-layer structure using, for example, one or more of silicon oxide, silicon oxynitride, silicon nitride oxide, silicon nitride, aluminum oxide, hafnium oxide, gallium oxide, Ga—Zn-based metal oxide, and the like.

The insulating layer 103 may be formed using a high-k material such as hafnium silicate (HfSiO$_x$), hafnium silicate to which nitrogen is added (HfSi$_x$O$_y$N$_z$), hafnium aluminate to which nitrogen is added (HfAl$_x$O$_y$N$_z$), hafnium oxide, or yttrium oxide, so that gate leakage current of the transistor can be reduced.

<<Pair of Electrodes>>

The pair of electrodes 105a and 105b function as a source electrode and a drain electrode of the transistor.

The pair of electrodes 105a and 105b can be formed to have a single-layer structure or a stacked-layer structure using, as a conductive material, any of metals such as aluminum, titanium, chromium, nickel, copper, yttrium, zirconium, molybdenum, silver, tantalum, and tungsten, or an alloy containing any of these metals as its main component. For example, a single-layer structure of an aluminum film containing silicon, a two-layer structure in which a titanium film is stacked over an aluminum film, a two-layer structure in which a titanium film is stacked over a tungsten film, a two-layer structure in which a copper film is stacked over a copper-magnesium-aluminum alloy film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. Note that a transparent conductive material containing indium oxide, tin oxide, or zinc oxide may be used.

<<Insulating Layer>>

The insulating layer 106 is preferably formed using an oxide insulating film containing oxygen at a higher proportion than oxygen in the stoichiometric composition. Part of oxygen is released by heating from the oxide insulating film containing oxygen at a higher proportion than oxygen in the stoichiometric composition. The oxide insulating film containing oxygen at a higher proportion than oxygen in the stoichiometric composition is an oxide insulating film in which the amount of released oxygen converted into oxygen atoms is greater than or equal to $1.0 \times 10^{18}$ atoms/cm$^3$, preferably greater than or equal to $3.0 \times 10^{20}$ atoms/cm$^3$ in thermal desorption spectroscopy (TDS) analysis. Note that the temperature of the film surface in the TDS analysis is preferably higher than or equal to 100° C. and lower than or equal to 700° C., or higher than or equal to 100° C. and lower than or equal to 500° C.

As the insulating layer 106, a silicon oxide film, a silicon oxynitride film, or the like can be formed.

Note that the insulating layer 106 also functions as a film which relieves damage to the oxide semiconductor layer 104 at the time of forming the insulating layer 107 later.

Alternatively, an oxide film transmitting oxygen may be provided between the insulating layer 106 and the oxide semiconductor layer 104.

As the oxide film transmitting oxygen, a silicon oxide film, a silicon oxynitride film, or the like can be formed. Note that in this specification, a "silicon oxynitride film" refers to a film that contains oxygen at a higher proportion than nitrogen, and a "silicon nitride oxide film" refers to a film that contains nitrogen at a higher proportion than oxygen.

The insulating layer 107 can be formed using an insulating film having a blocking effect against oxygen, hydrogen, water, and the like. It is possible to prevent outward diffusion of oxygen from the oxide semiconductor layer 104 and entry of hydrogen, water, or the like into the oxide semiconductor layer 104 from the outside by providing the insulating layer 107 over the insulating layer 106. As for the insulating film having a blocking effect against oxygen, hydrogen, water, and the like, a silicon nitride film, a silicon nitride oxide film, an aluminum oxide film, an aluminum oxynitride film, a gallium oxide film, a gallium oxynitride film, an yttrium oxide film, an yttrium oxynitride film, a hafnium oxide film, and a hafnium oxynitride film can be given as examples.

<Example of Manufacturing Method of Transistor>

Next, an example of a manufacturing method of the transistor 100 illustrated in FIG. 13 is described.

Figure 14A:
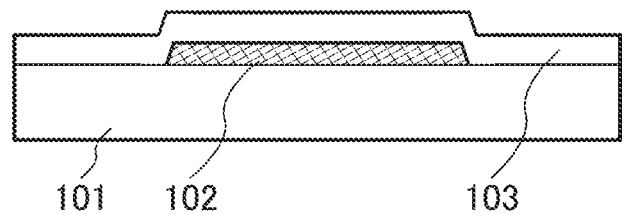
FIG. 14 A diagram showing an example of a method for manufacturing a transistor of one embodiment of the present invention.

First, as illustrated in FIG. 14A, the gate electrode 102 is formed over the substrate 101, and the insulating layer 103 is formed over the gate electrode 102.

Here, a glass substrate is used as the substrate 101.

<<Formation of Gate Electrode>>

A formation method of the gate electrode 102 is described below. First, a conductive film is formed by a sputtering method, a CVD method, an evaporation method, or the like and then a resist mask is formed over the conductive film using a first photomask by a photolithography process. Then, part of the conductive film is etched using the resist mask to form the gate electrode 102. After that, the resist mask is removed.

Note that instead of the above formation method, the gate electrode 102 may be formed by an electrolytic plating method, a printing method, an ink jet method, or the like.

<<Formation of Gate Insulating Layer>>

The insulating layer 103 is formed by a sputtering method, a PECVD method, an evaporation method, or the like.

In the case where the insulating layer 103 is formed using a silicon oxide film, a silicon oxynitride film, or a silicon nitride oxide film, a deposition gas containing silicon and an oxidizing gas are preferably used as a source gas. Typical examples of the deposition gas containing silicon include silane, disilane, trisilane, and silane fluoride. As the oxidizing gas, oxygen, ozone, dinitrogen monoxide, and nitrogen dioxide can be given as examples.

In the case of forming a silicon nitride film as the insulating layer 103, it is preferable to use a two-step formation method. First, a first silicon nitride film with a small number of defects is formed by a plasma CVD method in which a mixed gas of silane, nitrogen, and ammonia is used as a source gas. Then, a second silicon nitride film in which the hydrogen concentration is low and hydrogen can be blocked is formed by switching the source gas to a mixed gas of silane and nitrogen. With such a formation method, a silicon nitride film with a small number of defects and a blocking property against hydrogen can be formed as the insulating layer 103.

Moreover, in the case of forming a gallium oxide film as the insulating layer 103, a metal organic chemical vapor deposition (MOCVD) method can be employed.

<<Formation of Oxide Semiconductor Layer>>

Figure 14B:
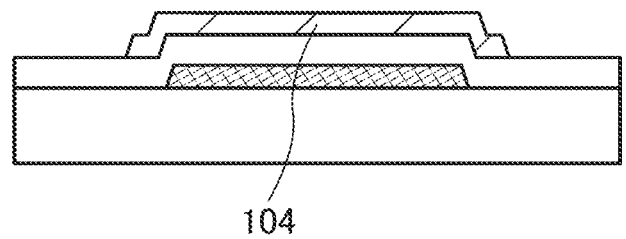

Next, as illustrated in FIG. 14B, the oxide semiconductor layer 104 is formed over the insulating layer 103.

A formation method of the oxide semiconductor layer 104 is described below. First, an oxide semiconductor film is formed. Then, a resist mask is formed over the oxide semiconductor film using a second photomask by a photolithography process. Then, part of the oxide semiconductor film is etched using the resist mask to form the oxide semiconductor layer 104. After that, the resist mask is removed.

After that, heat treatment may be performed. In such a case, the heat treatment is preferably performed under an atmosphere containing oxygen. The temperature of the heat treatment may be, for example, higher than or equal to 150° C. and lower than or equal to 600° C., preferably higher than or equal to 200° C. and lower than or equal to 500° C.

<<Formation of Pair of Electrodes>>

Figure 14C:
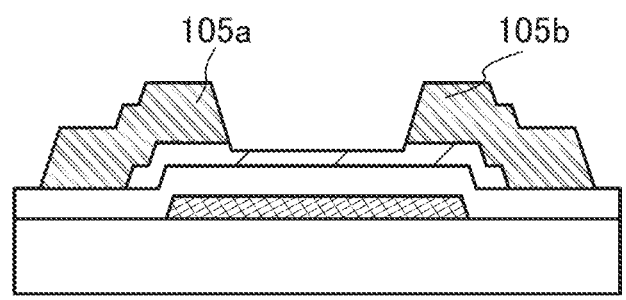

Next, as illustrated in FIG. 14C, the pair of electrodes 105a and 105b is formed.

A formation method of the pair of electrodes 105a and 105b is described below. First, a conductive film is formed by a sputtering method, a PECVD method, an evaporation method, or the like. Then, a resist mask is formed over the conductive film using a third photomask by a photolithography process. Then, part of the conductive film is etched using the resist mask to form the pair of electrodes 105a and 105b. After that, the resist mask is removed.

Note that as illustrated in FIG. 14B, an upper part of the oxide semiconductor layer 104 is in some cases partly etched and thinned by the etching of the conductive film. For this reason, the oxide semiconductor layer 104 is preferably formed thick.

<<Formation of Insulating Layer>>

Figure 14D:
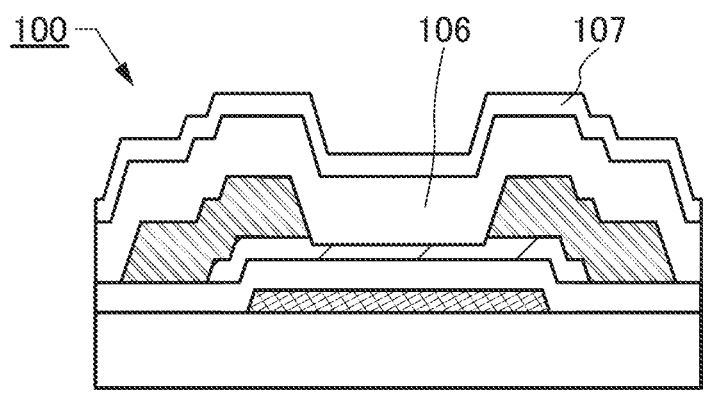

Next, as illustrated in FIG. 14D, the insulating layer 106 is formed over the oxide semiconductor layer 104 and the pair of electrodes 105a and 105b, and the insulating layer 107 is successively formed over the insulating layer 106.

In the case where the insulating layer 106 is formed using a silicon oxide film or a silicon oxynitride film, a deposition gas containing silicon and an oxidizing gas are preferably used as a source gas. Typical examples of the deposition gas containing silicon include silane, disilane, trisilane, and silane fluoride. As the oxidizing gas, oxygen, ozone, dinitrogen monoxide, and nitrogen dioxide can be given as examples.

For example, a silicon oxide film or a silicon oxynitride film is formed under the conditions as follows: the substrate placed in a treatment chamber of a plasma CVD apparatus, which is vacuum-evacuated, is held at a temperature higher than or equal to 180° C. and lower than or equal to 260° C., preferably higher than or equal to 200° C. and lower than or equal to 240° C., the pressure is greater than or equal to 100 Pa and less than or equal to 250 Pa, preferably greater than or equal to 100 Pa and less than or equal to 200 Pa with introduction of a source gas into the treatment chamber, and high-frequency power higher than or equal to 0.17 W/cm$^2$ and lower than or equal to 0.5 W/cm$^2$, preferably higher than or equal to 0.25 W/cm$^2$ and lower than or equal to 0.35 W/cm$^2$ is supplied to an electrode provided in the treatment chamber.

As the film formation conditions, the high-frequency power having the above power density is supplied to the treatment chamber having the above pressure, whereby the decomposition efficiency of the source gas in plasma is increased, oxygen radicals are increased, and oxidation of the source gas is promoted; therefore, oxygen is contained in the oxide insulating film at a higher proportion than oxygen in the stoichiometric composition. However, in the case where the substrate temperature is within the above temperature range, the bond between silicon and oxygen is weak, and accordingly, part of oxygen is released by heating. Thus, it is possible to form an oxide insulating film which contains oxygen at a higher proportion than oxygen in the stoichiometric composition and from which part of oxygen is released by heating.

Further, in the case of providing an oxide insulating film between the oxide semiconductor layer 104 and the insulating layer 106, the oxide insulating film serves as a protective film for the oxide semiconductor layer 104 in the steps of forming the insulating layer 106. Thus, the insulating layer 106 can be formed using the high-frequency power having a high power density while damage to the oxide semiconductor layer 104 is reduced.

For example, a silicon oxide film or a silicon oxynitride film is formed as the oxide insulating film under the conditions as follows: the substrate placed in a treatment chamber of a PECVD apparatus, which is vacuum-evacuated, is held at a temperature higher than or equal to 180° C. and lower than or equal to 400° C., preferably higher than or equal to 200° C. and lower than or equal to 370° C., the pressure is greater than or equal to 20 Pa and less than or equal to 250 Pa, preferably greater than or equal to 100 Pa and less than or equal to 250 Pa with introduction of a source gas into the treatment chamber, and high-frequency power is supplied to an electrode provided in the treatment chamber. Further, when the pressure in the treatment chamber is greater than or equal to 100 Pa and less than or equal to 250 Pa, damage to the oxide semiconductor layer 104 can be reduced.

A deposition gas containing silicon and an oxidizing gas are preferably used as a source gas of the oxide insulating film. Typical examples of the deposition gas containing silicon include silane, disilane, trisilane, and silane fluoride. As the oxidizing gas, oxygen, ozone, dinitrogen monoxide, and nitrogen dioxide can be given as examples.

The insulating layer 107 can be formed by a sputtering method, a PECVD method, or the like.

In the case where the insulating layer 107 is formed using a silicon nitride film or a silicon nitride oxide film, a deposition gas containing silicon, an oxidizing gas, and a gas containing nitrogen are preferably used as a source gas. Typical examples of the deposition gas containing silicon include silane, disilane, trisilane, and silane fluoride. As the oxidizing gas, oxygen, ozone, dinitrogen monoxide, and nitrogen dioxide can be given as examples. As the gas containing nitrogen, nitrogen and ammonia can be given as examples.

Through the above process, the transistor 100 can be formed.

<Modification Example of Transistor>

A structural example of a transistor, which is partly different from the transistor 100, is described below.

<<Modification Example 1>>

Figure 15A:
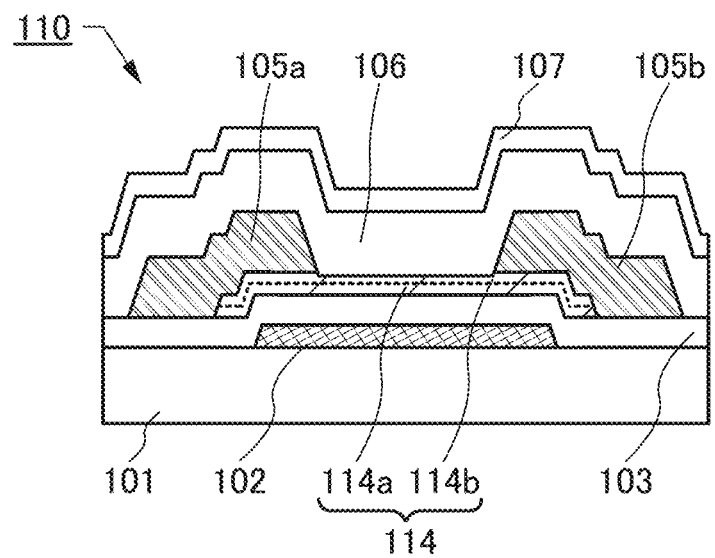
FIG. 15 A diagram showing a structure example of a transistor of one embodiment of the present invention.

FIG. 15A is a schematic cross-sectional view of a transistor 110 described as an example below. The transistor 110 is different from the transistor 100 in the structure of an oxide semiconductor layer.

In an oxide semiconductor layer 114 included in the transistor 110, an oxide semiconductor layer 114a and an oxide semiconductor layer 114b are stacked.

Since a boundary between the oxide semiconductor layer 114a and the oxide semiconductor layer 114b is unclear in some cases, the boundary is shown by a dashed line in FIG. 15A and the like.

Typical examples of a material that can be used for the oxide semiconductor layer 114a are an In—Ga oxide, an In—Zn oxide, and an In-M-Zn oxide (M is Al, Ti, Ga, Y, Zr, La, Ce, Nd, or Hf). When an In-M-Zn oxide is used for the oxide semiconductor layer 114a, the atomic ratio of In and M, not taking Zn and O into consideration, is preferably as follows: the atomic percentage of In is less than 50 at. % and the atomic percentage of M is greater than or equal to 50 at. %; further preferably, the atomic percentage of In is less than 25 at. % and the atomic percentage of M is greater than or equal to 75 at. %. Further, a material having an energy gap of 2 eV or more, preferably 2.5 eV or more, further preferably 3 eV or more is used for the oxide semiconductor layer 114a, for example.

The oxide semiconductor layer 114b contains In or Ga; the oxide semiconductor layer 114b contains, for example, a material typified by an In—Ga oxide, an In—Zn oxide, or an In-M-Zn oxide (M is Al, Ti, Ga, Y, Zr, La, Ce, Nd, or Hf). In addition, the energy of the conduction band minimum of the oxide semiconductor layer 114b is closer to the vacuum level than that of the oxide semiconductor layer 114a is. The difference between the energy of the conduction band minimum of the oxide semiconductor layer 114b and the energy of the conduction band minimum of the oxide semiconductor layer 114a is preferably 0.05 eV or more, 0.07 eV or more, 0.1 eV or more, or 0.15 eV or more and 2 eV or less, 1 eV or less, 0.5 eV or less, or 0.4 eV or less.

When an In-M-Zn oxide is used for the oxide semiconductor layer 114b, for example, the atomic ratio of In and M, not taking Zn and O into consideration, is preferably as follows: the atomic percentage of In is greater than or equal to 25 at. % and the atomic percentage of M is less than 75 at. %; further preferably, the atomic percentage of In is greater than or equal to 34 at. % and the atomic percentage of M is less than 66 at. %.

For the oxide semiconductor layer 114a, an In—Ga—Zn oxide containing In, Ga, and Zn at an atomic ratio of 1:1:1, 1:1:1.2, or 3:1:2 can be used, for example. Further, for the oxide semiconductor layer 114b, an In—Ga—Zn oxide containing In, Ga, and Zn at an atomic ratio of 1:3:2, 1:6:4, or 1:9:6 can be used. Note that the atomic ratio of each of the oxide semiconductor layers 114a and 114b varies within a range of ±20% of the above atomic ratio as an error.

When an oxide containing a large amount of Ga that serves as a stabilizer is used for the oxide semiconductor layer 114b provided over the oxide semiconductor layer 114a, oxygen can be prevented from being released from the oxide semiconductor layers 114a and 114b.

Note that, without limitation to those described above, a material with an appropriate composition may be used depending on required semiconductor characteristics and electrical characteristics (e.g., field-effect mobility and threshold voltage) of a transistor. Further, in order to obtain required semiconductor characteristics of a transistor, it is preferable that the carrier density, the impurity concentration, the defect density, the atomic ratio of a metal element to oxygen, the interatomic distance, the density, and the like of the oxide semiconductor layers 114a and 114b be set to be appropriate.

Although a structure in which two oxide semiconductor layers are stacked is described above as an example of the oxide semiconductor layer 114, a structure in which three or more oxide semiconductor layers are stacked can also be employed.

<<Modification Example 2>>

Figure 15B:
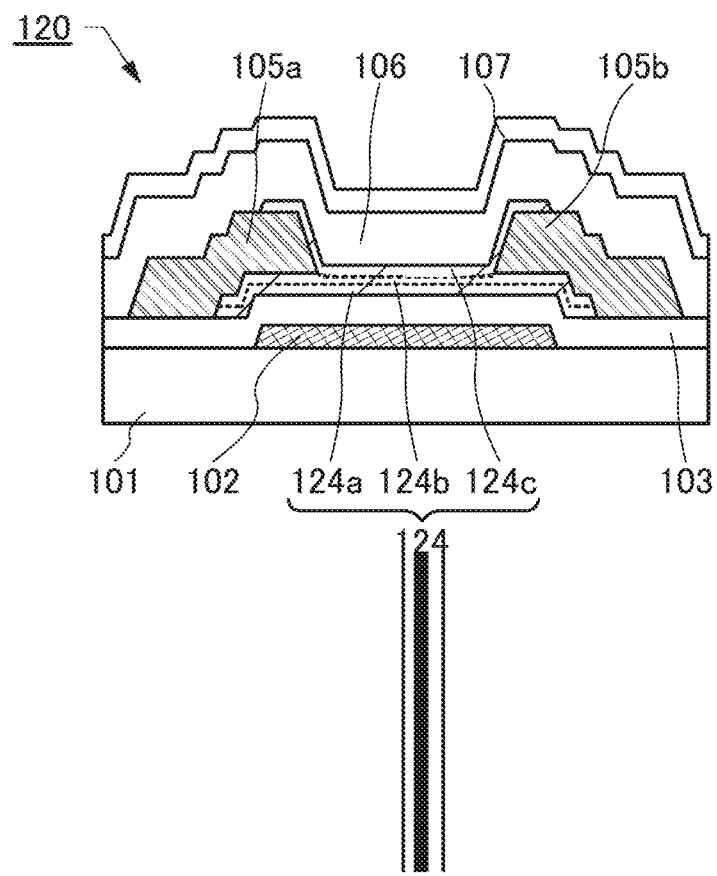

FIG. 15B is a schematic cross-sectional view of a transistor 120 described as an example below. The transistor 120 is different from the transistor 100 and the transistor 110 in the structure of an oxide semiconductor layer.

In an oxide semiconductor layer 124 included in the transistor 120, an oxide semiconductor layer 124a, an oxide semiconductor layer 124b, and an oxide semiconductor layer 124c are stacked in this order.

The oxide semiconductor layers 124a and 124b are stacked over the insulating layer 103. The oxide semiconductor layer 124c is provided in contact with the top surface of the oxide semiconductor layer 124b and the top surfaces and side surfaces of the pair of electrodes 105a and 105b.

The oxide semiconductor layer 124b can have a structure which is similar to that of the oxide semiconductor layer 114a described as an example in Modification example 1, for example. Further, the oxide semiconductor layers 124a and 124c can each have a structure which is similar to that of the oxide semiconductor layer 114b described as an example in Modification example 1, for example.

When an oxide containing a large amount of Ga that serves as a stabilizer is used for the oxide semiconductor layer 124a, which is provided under the oxide semiconductor layer 124b, and the oxide semiconductor layer 124c, which is provided over the oxide semiconductor layer 124b, for example, oxygen can be prevented from being released from the oxide semiconductor layer 124a, the oxide semiconductor layer 124b, and the oxide semiconductor layer 124c.

In the case where a channel is mainly formed in the oxide semiconductor layer 124b, for example, an oxide containing a large amount of In can be used for the oxide semiconductor layer 124b and the pair of electrodes 105a and 105b is provided in contact with the oxide semiconductor layer 124b; thus, the on-state current of the transistor 120 can be increased.

<Another Structural Example of Transistor>

A structural example of a top-gate transistor to which the oxide semiconductor film of one embodiment of the present invention can be applied is described below.

Note that descriptions of components having structures or functions similar to those of the above, which are denoted by the same reference numerals, are omitted below.

<<Structural Example>>

Figure 16A:
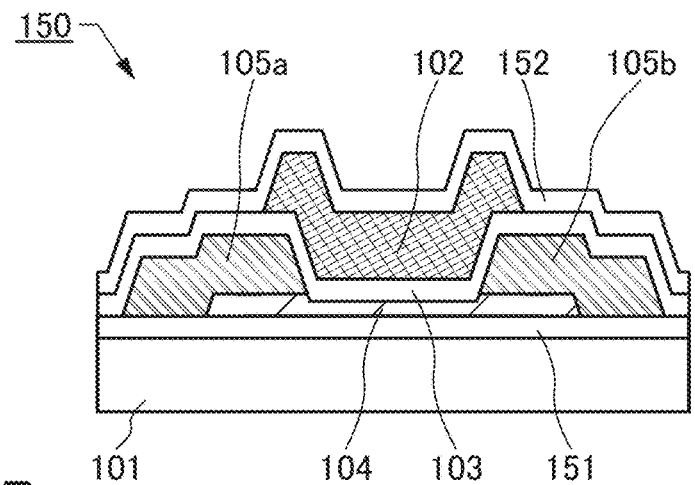
FIG. 16 A diagram showing a structure example of a transistor of one embodiment of the present invention.

FIG. 16A is a schematic cross-sectional view of a top-gate transistor 150 which is described below as an example.

The transistor 150 includes the oxide semiconductor layer 104 over the substrate 101 on which an insulating layer 151 is provided, the pair of electrodes 105a and 105b in contact with the top surface of the oxide semiconductor layer 104, the insulating layer 103 over the oxide semiconductor layer 104 and the pair of electrodes 105a and 105b, and the gate electrode 102 provided over the insulating layer 103 so as to overlap with the oxide semiconductor layer 104. Further, an insulating layer 152 is provided to cover the insulating layer 103 and the gate electrode 102.

The insulating layer 151 has a function of suppressing diffusion of impurities from the substrate 101 into the oxide semiconductor layer 104. For example, a structure similar to that of the insulating layer 107 can be employed. Note that the insulating layer 151 is not necessarily provided.

The insulating layer 152 can be formed using an insulating film having a blocking effect against oxygen, hydrogen, water, and the like in a manner similar to that of the insulating layer 107. Note that the insulating layer 107 is not necessarily provided.

<<Modification Example 1>>

A structural example of a transistor, which is partly different from the transistor 150, is described below.

Figure 16B:
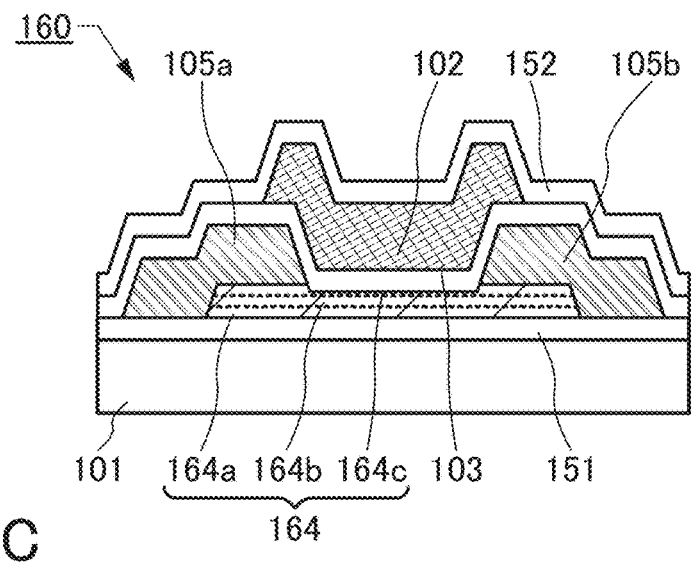

FIG. 16B is a schematic cross-sectional view of a transistor 160 described as an example below. The structure of an oxide semiconductor layer in the transistor 160 is different from that in the transistor 150.

In an oxide semiconductor layer 164 included in the transistor 160, an oxide semiconductor layer 164a, an oxide semiconductor layer 164b, and an oxide semiconductor layer 164c are stacked in this order.

The above-described oxide semiconductor film can be applied to one or more of the oxide semiconductor layer 164a, the oxide semiconductor layer 164b, and the oxide semiconductor layer 164c.

The oxide semiconductor layer 164b can have a structure which is similar to that of the oxide semiconductor layer 114a described as an example in Modification example 1, for example. Further, the oxide semiconductor layers 164a and 164c can each have a structure which is similar to that of the oxide semiconductor layer 114b described as an example in Modification example 1, for example.

An oxide containing a large amount of Ga that serves as a stabilizer is used for the oxide semiconductor layer 164a, which is provided under the oxide semiconductor layer 164b, and the oxide semiconductor layer 164c, which is provided over the oxide semiconductor layer 164b; thus, oxygen can be prevented from being released from the oxide semiconductor layer 164a, the oxide semiconductor layer 164b, and the oxide semiconductor layer 164c.

<<Modification Example 2>>

A structural example of a transistor, which is partly different from the transistor 150, is described below.

Figure 16C:
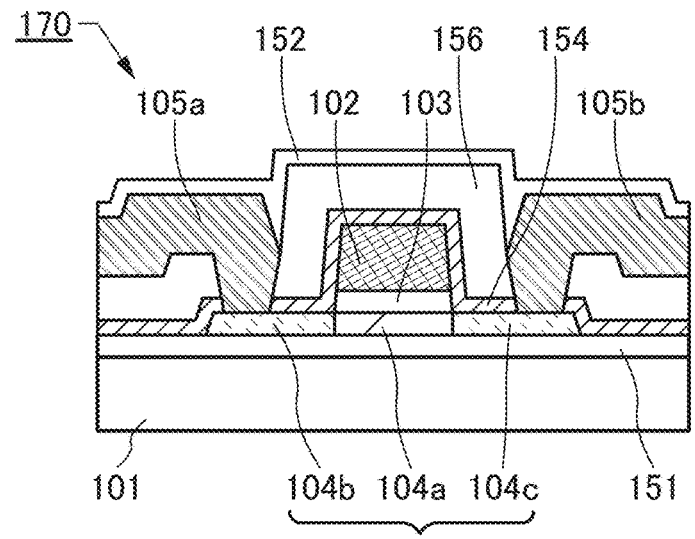

FIG. 16C is a schematic cross-sectional view of a transistor 170 described below as an example. The transistor 170 is different from the transistor 150 in the shapes of the pair of electrodes 105a and 105b in contact with the oxide semiconductor layer 104, the shape of the gate electrode 102, and the like.

The transistor 170 includes the oxide semiconductor layer 104 provided over the substrate 101 provided with the insulating layer 151, the insulating layer 103 over the oxide semiconductor layer 104, the gate electrode 102 over the insulating layer 103, an insulating layer 154 over the insulating layer 151 and the oxide semiconductor layer 104, an insulating layer 156 over the insulating layer 154, the pair of electrodes 105a and 105b electrically connected to the oxide semiconductor layer 104 through openings provided in the insulating layers 154 and 156, and the insulating layer 152 over the insulating layer 156 and the pair of electrodes 105a and 105b.

The insulating layer 154 is formed with, for example, an insulating film including hydrogen. An example of the insulating film including hydrogen is a silicon nitride film. Hydrogen included in the insulating layer 154 becomes a carrier in the oxide semiconductor layer 104 when bonded to an oxygen vacancy in the oxide semiconductor layer 104. Thus, in the structure illustrated in FIG. 16C, regions of the oxide semiconductor layer 104 in contact with the insulating layer 154 are expressed as an n-type region 104b and an n-type region 104c. Note that a region sandwiched between the n-type region 104b and the n-type region 104c is a channel region 104a.

By forming the n-type regions 104b and 104c in the oxide semiconductor layer 104, the contact resistance with the pair of electrodes 105a and 105b can be reduced. Note that the n-type regions 104b and 104c can be formed in a self-aligned manner during the formation of the gate electrode 102, using the insulating layer 154 that covers the gate electrode 102. The transistor 170 illustrated in FIG. 16C is what is called a self-aligned top gate transistor. In the self-aligned top gate transistor, the gate electrode 102 and the pair of electrodes 105a and 105b which function as a source electrode and a drain electrode do not overlap, which can reduce the parasitic capacitance generated between the electrodes.

The insulating layer 156 included in the transistor 170 can be formed with, for example, a silicon oxynitride film.

Note that this embodiment can be combined with any of the other embodiments in this specification as appropriate.

(Embodiment 7)

In this embodiment, a structure of an oxide semiconductor film that can be used in a display device of one embodiment of the present invention is described below in detail.

An oxide semiconductor has a wide energy gap of 3.0 eV or more. A transistor including an oxide semiconductor film obtained by processing of the oxide semiconductor in an appropriate condition and a sufficient reduction in carrier density of the oxide semiconductor can have much lower leakage current between a source and a drain in an off state (off-state current) than a conventional transistor including silicon.

In the case where an oxide semiconductor film is used for a transistor, the thickness of the oxide semiconductor film is preferably greater than or equal to 2 nm and less than or equal to 40 nm.

An oxide semiconductor containing at least indium (In) or zinc (Zn) is preferably used. In particular, In and Zn are preferably contained. In addition, as a stabilizer for reducing variation in electrical characteristics of a transistor using the oxide semiconductor, one or more elements selected from gallium (Ga), tin (Sn), hafnium (Hf), zirconium (Zr), titanium (Ti), scandium (Sc), yttrium (Y), and a lanthanoid (such as cerium (Ce), neodymium (Nd), or gadolinium (Gd)) is preferably contained.

As the oxide semiconductor, for example, an indium oxide, a tin oxide, a zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—Zr—Zn-based oxide, an In—Ti—Zn-based oxide, an In—Sc—Zn-based oxide, an In—Y—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide can be used.

Here, an "In—Ga—Zn-based oxide" means an oxide containing In, Ga, and Zn as main components and there is no limitation on the ratio of In:Ga:Zn. Further, a metal element in addition to In, Ga, and Zn may be contained.

Alternatively, a material represented by $InMO_3(ZnO)_m$ (m>0, where m is not an integer) may be used as the oxide semiconductor. Note that M represents one or more metal elements selected from Ga, Fe, Mn, and Co, or the above-described element as a stabilizer. Alternatively, a material represented by $In_2SnO_5(ZnO)_n$ (n>0, where n is an integer) may be used as the oxide semiconductor.

For example, an In—Ga—Zn-based oxide with an atomic ratio of In:Ga:Zn=1:1:1, In:Ga:Zn=1:3:2, In:Ga:Zn=3:1:2, or In:Ga:Zn=2:1:3, or an oxide with an atomic ratio close to the above atomic ratios can be used.

When the oxide semiconductor film contains a large amount of hydrogen, the hydrogen and an oxide semiconductor are bonded to each other, so that part of the hydrogen serves as a donor and causes generation of an electron which is a carrier. As a result, the threshold voltage of the transistor shifts in the negative direction. Therefore, after formation of the oxide semiconductor film, it is preferable that dehydration treatment (dehydrogenation treatment) be performed to remove hydrogen or moisture from the oxide semiconductor film so that the oxide semiconductor film is highly purified to contain impurities as little as possible.

Note that oxygen in the oxide semiconductor film is also reduced by the dehydration treatment (dehydrogenation treatment) in some cases. Therefore, it is preferable that oxygen be added to the oxide semiconductor film to fill oxygen vacancies increased by the dehydration treatment (dehydrogenation treatment). In this specification and the like, supplying oxygen to an oxide semiconductor film may be expressed as oxygen adding treatment, or treatment for making the oxygen content of an oxide semiconductor film be in excess of that of the stoichiometric composition may be expressed as treatment for making an oxygen-excess state.

In this manner, hydrogen or moisture is removed from the oxide semiconductor film by the dehydration treatment (dehydrogenation treatment) and oxygen vacancies therein are filled by the oxygen adding treatment, whereby the oxide semiconductor film can be turned into an i-type (intrinsic) oxide semiconductor film or a substantially i-type (intrinsic) oxide semiconductor film which is extremely close to an i-type oxide semiconductor film. Note that "substantially intrinsic" means that the oxide semiconductor film contains extremely few (close to zero) carriers derived from a donor at higher than or equal to $1\times10^{-9}/cm^3$ and lower than $8\times10^{11}/cm^3$, preferably lower than $1\times10^{11}/cm^3$, more preferably lower than $1\times10^{10}/cm^3$.

Thus, the transistor including an i-type or substantially i-type oxide semiconductor film can have extremely favorable off-state current characteristics. For example, the drain current at the time when the transistor including an oxide semiconductor film is in an off state can be less than or equal to $1\times10^{-18}$ A, preferably less than or equal to $1\times10^{-21}$ A, further preferably less than or equal to $1\times10^{-24}$ A at room temperature (about 25° C.); or less than or equal to $1\times10^{-15}$ A, preferably less than or equal to $1\times10^{-18}$ A, further preferably less than or equal to $1\times10^{-21}$ A at 85° C. An off state of a transistor refers to a state where gate voltage is sufficiently lower than the threshold voltage in an n-channel transistor. Specifically, the transistor is in an off state when the gate voltage is lower than the threshold voltage by 1 V or more, 2 V or more, or 3 V or more.

Next, a structure that can be included in an oxide semiconductor film is described.

An oxide semiconductor is classified into a single crystal oxide semiconductor and a non-single-crystal oxide semiconductor.

Examples of a non-single-crystal oxide semiconductor include a CAAC-OS (c-axis aligned crystalline oxide semiconductor), a polycrystalline oxide semiconductor, a microcrystalline oxide semiconductor, and an amorphous oxide semiconductor. In addition, examples of a crystalline oxide semiconductor include a single crystal oxide semiconductor, a CAAC-OS, a polycrystalline oxide semiconductor, and a microcrystalline oxide semiconductor.

From another perspective, an oxide semiconductor is classified into an amorphous oxide semiconductor and a crystalline oxide semiconductor. Examples of a crystalline oxide semiconductor include a single crystal oxide semiconductor, a CAAC-OS, a polycrystalline oxide semiconductor, and a microcrystalline oxide semiconductor.

<CAAC-OS>

First, a CAAC-OS is described. Note that a CAAC-OS can be referred to as an oxide semiconductor including CANC (c-axis aligned nanocrystals).

A CAAC-OS is one of oxide semiconductors having a plurality of c-axis aligned crystal parts (also referred to as pellets).

In a combined analysis image (also referred to as a high-resolution TEM image) of a bright-field image and a diffraction pattern of a CAAC-OS, which is obtained using a transmission electron microscope (TEM), a plurality of pellets can be observed. However, in the high-resolution TEM image, a boundary between pellets, that is, a grain boundary is not clearly observed. Thus, in the CAAC-OS, a reduction in electron mobility due to the grain boundary is less likely to occur.

Figure 17A:
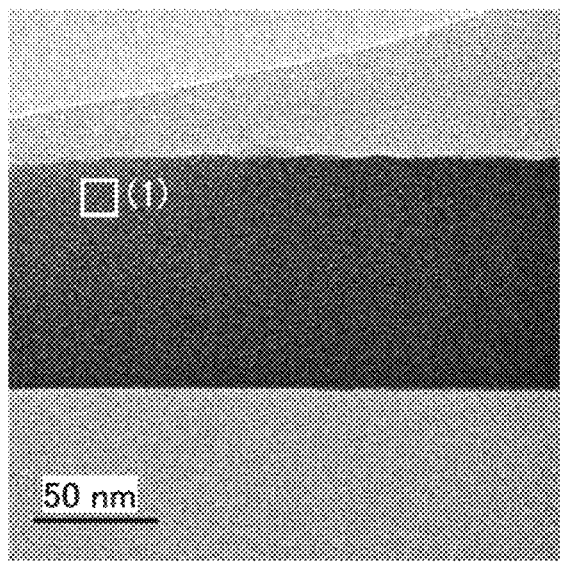
FIG. 17 A Cs-corrected high-resolution TEM image of a cross section of a CAAC-OS and a cross-sectional schematic view of a CAAC-OS.

FIG. 17A shows an example of a high-resolution TEM image of a cross section of the CAAC-OS which is obtained from a direction substantially parallel to the sample surface. Here, the TEM image is obtained with a spherical aberration corrector function. The high-resolution TEM image obtained with a spherical aberration corrector function is particularly referred to as a Cs-corrected high-resolution TEM image in the following description. Note that the Cs-corrected high-resolution TEM image can be obtained with, for example, an atomic resolution analytical electron microscope JEM-ARM200F manufactured by JEOL Ltd.

A CAAC-OS observed with TEM is described below. FIG. 17A shows a high-resolution TEM image of a cross section of the CAAC-OS which is observed from a direction substantially parallel to the sample surface. The high-resolution TEM image is obtained with a spherical aberration corrector function. The high-resolution TEM image obtained with a spherical aberration corrector function is particularly referred to as a Cs-corrected high-resolution TEM image. The Cs-corrected high-resolution TEM image can be obtained with, for example, an atomic resolution analytical electron microscope JEM-ARM200F manufactured by JEOL Ltd.

Figure 17B:
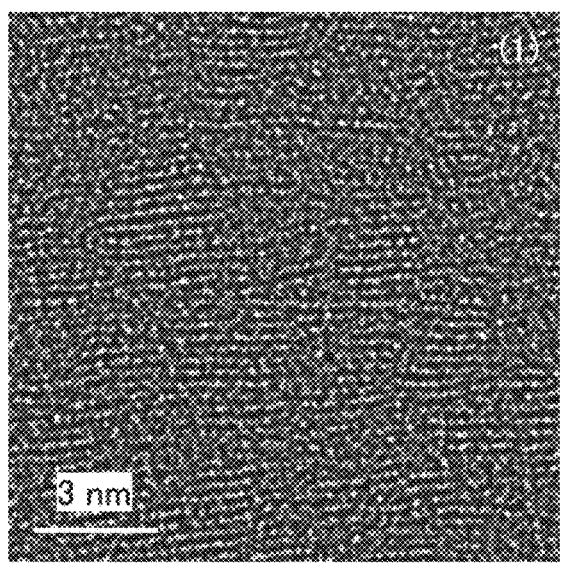

FIG. 17B is an enlarged Cs-corrected high-resolution TEM image of a region (1) in FIG. 17A. FIG. 17B shows that metal atoms are arranged in a layered manner in a pellet. Each metal atom layer has a configuration reflecting unevenness of a surface over which the CAAC-OS is formed (hereinafter, the surface is referred to as a formation surface) or a top surface of the CAAC-OS, and is arranged parallel to the formation surface or the top surface of the CAAC-OS.

Figure 17C:
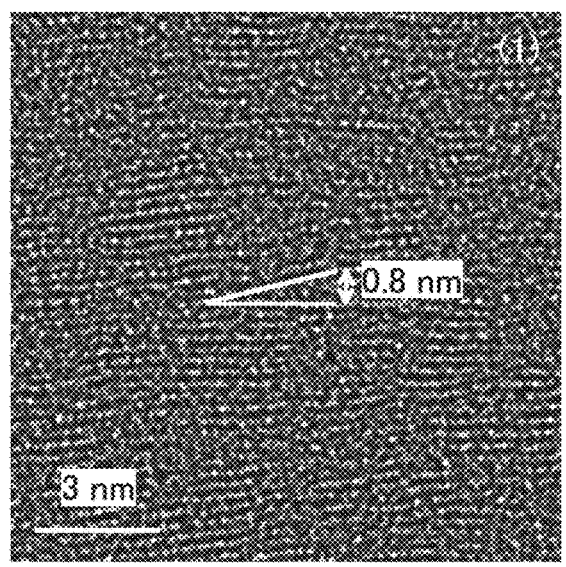

As shown in FIG. 17B, the CAAC-OS has a characteristic atomic arrangement. The characteristic atomic arrangement is denoted by an auxiliary line in FIG. 17C. FIGS. 17B and 17C prove that the size of a pellet is approximately 1 nm to 3 nm, and the size of a space caused by tilt of the pellets is approximately 0.8 nm. Therefore, the pellet can also be referred to as a nanocrystal (nc).

Figure 17D:
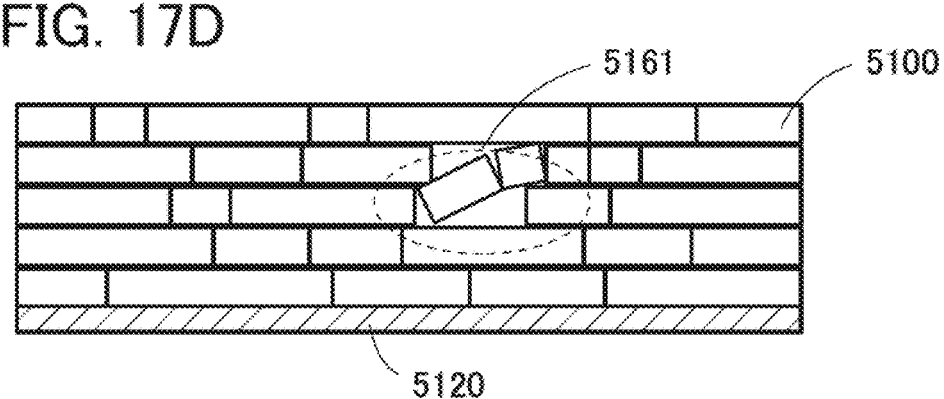

Here, according to the Cs-corrected high-resolution TEM images, the schematic arrangement of pellets 5100 of a CAAC-OS over a substrate 5120 is illustrated by such a structure in which bricks or blocks are stacked (see FIG. 17D). The part in which the pellets are tilted as observed in FIG. 17C corresponds to a region 5161 shown in FIG. 17D.

FIG. 18A shows a Cs-corrected high-resolution TEM image of a plane of the CAAC-OS observed from a direction substantially perpendicular to the sample surface. FIGS. 18B, 18C, and 18D are enlarged Cs-corrected high-resolution TEM images of regions (1), (2), and (3) in FIG. 18A, respectively. FIGS. 18B, 18C, and 18D indicate that metal atoms are arranged in a triangular, quadrangular, or hexagonal configuration in a pellet. However, there is no regularity of arrangement of metal atoms between different pellets.

Figure 19A:
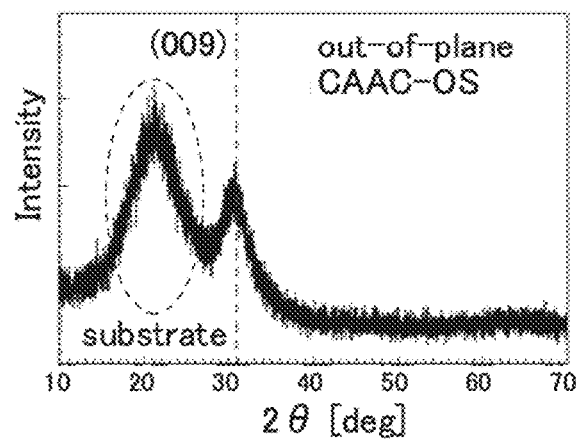
FIG. 19 A diagram showing a structure analysis of a CAAC-OS and a single crystal oxide semiconductor by XRD.

Next, a CAAC-OS analyzed by X-ray diffraction (XRD) is described. For example, when the structure of a CAAC-OS including an InGaZnO$_4$ crystal is analyzed by an out-of-plane method, a peak appears at a diffraction angle (2θ) of around 31° as shown in FIG. 19A. This peak is derived from the (009) plane of the InGaZnO$_4$ crystal, which indicates that crystals in the CAAC-OS have c-axis alignment, and that the c-axes are aligned in a direction substantially perpendicular to the formation surface or the top surface of the CAAC-OS.

Note that in structural analysis of the CAAC-OS by an out-of-plane method, another peak may appear when 2θ is around 36°, in addition to the peak at 2θ of around 31°. The peak at 2θ of around 36° indicates that a crystal having no c-axis alignment is included in part of the CAAC-OS. It is preferable that in the CAAC-OS analyzed by an out-of-plane method, a peak appear when 2θ is around 31° and that a peak not appear when 2θ is around 36°.

Figure 19B:
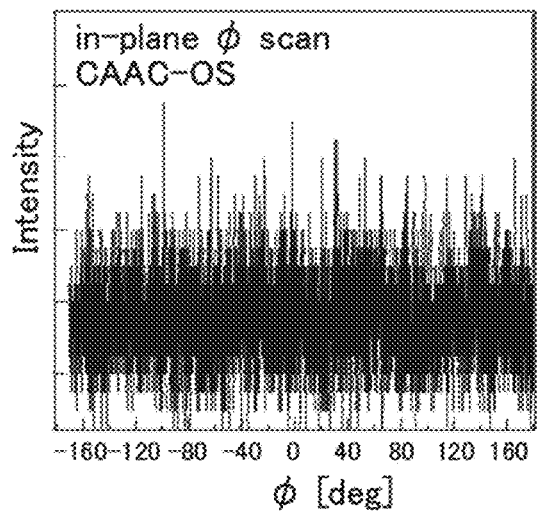
Figure 19C:
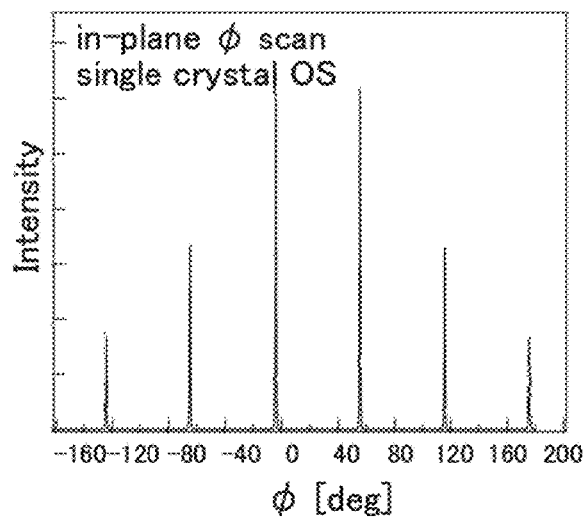

On the other hand, in structural analysis of the CAAC-OS by an in-plane method in which an X-ray is incident on a sample in a direction substantially perpendicular to the c-axis, a peak appears when 2θ is around 56°. This peak is attributed to the (110) plane of the InGaZnO$_4$ crystal. In the case of the CAAC-OS, when analysis (φ scan) is performed with 2θ fixed at around 56° and with the sample rotated using a normal vector of the sample surface as an axis (φ axis), as shown in FIG. 19B, a peak is not clearly observed. In contrast, in the case of a single crystal oxide semiconductor of InGaZnO$_4$, when φ scan is performed with 2θ fixed at around 56°, as shown in FIG. 19C, six peaks which are derived from crystal planes equivalent to the (110) plane are observed. Accordingly, the structural analysis using XRD shows that the directions of a-axes and b-axes are irregularly oriented in the CAAC-OS.

Figure 39A:
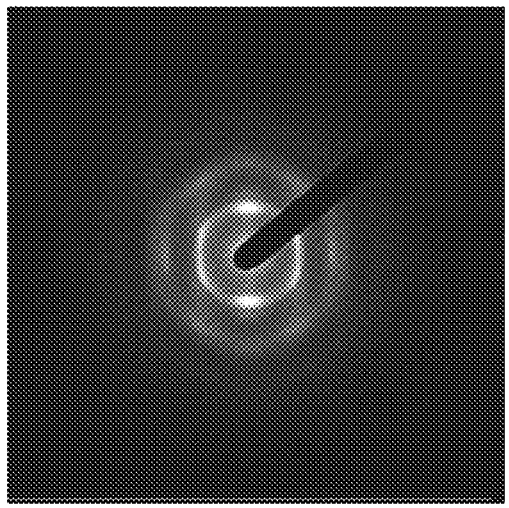
FIG. 39 A diagram illustrating electron diffraction patterns of a CAAC-OS.
Figure 39B:
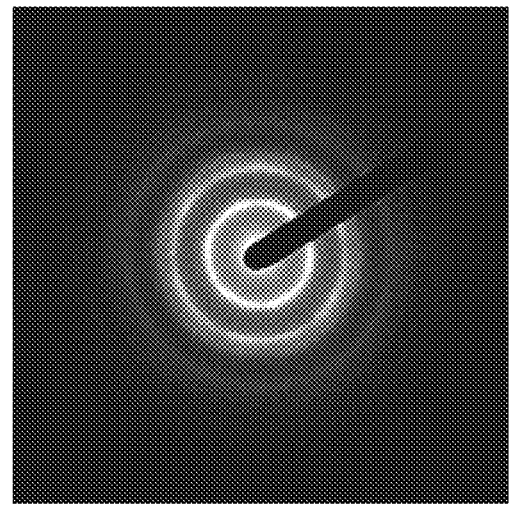

Next, a CAAC-OS analyzed by electron diffraction is described. For example, when an electron beam with a probe diameter of 300 nm is incident on a CAAC-OS including an InGaZnO$_4$ crystal in a direction parallel to the sample surface, a diffraction pattern (also referred to as a selected-area transmission electron diffraction pattern) shown in FIG. 39A can be obtained. In this diffraction pattern, spots derived from the (009) plane of an InGaZnO$_4$ crystal are included. Thus, the electron diffraction also indicates that pellets included in the CAAC-OS have c-axis alignment and that the c-axes are aligned in a direction substantially perpendicular to the formation surface or the top surface of the CAAC-OS. Meanwhile, FIG. 39B shows a diffraction pattern obtained in such a manner that an electron beam with a probe diameter of 300 nm is incident on the same sample in a direction perpendicular to the sample surface. As shown in FIG. 39B, a ring-like diffraction pattern is observed. Thus, the electron diffraction also indicates that the a-axes and b-axes of the pellets included in the CAAC-OS do not have regular alignment. The first ring in FIG. 39B is considered to be derived from the (010) plane, the (100) plane, and the like of the InGaZnO$_4$ crystal. The second ring in FIG. 39B is considered to be derived from the (110) plane and the like.

Moreover, the CAAC-OS is an oxide semiconductor having a low density of defect states. Defects in the oxide semiconductor are, for example, a defect due to impurity and oxygen vacancies. Therefore, the CAAC-OS can be regarded as an oxide semiconductor with a low impurity concentration, or an oxide semiconductor having a small number of oxygen vacancies.

The impurity contained in the oxide semiconductor might serve as a carrier trap or serve as a carrier generation source. Furthermore, oxygen vacancies in the oxide semiconductor serve as carrier traps or serve as carrier generation sources when hydrogen is captured therein.

Note that the impurity means an element other than the main components of the oxide semiconductor, such as hydrogen, carbon, silicon, or a transition metal element. For example, an element (specifically, silicon or the like) having higher strength of bonding to oxygen than a metal element included in an oxide semiconductor extracts oxygen from the oxide semiconductor, which results in disorder of the atomic arrangement and reduced crystallinity of the oxide semiconductor. A heavy metal such as iron or nickel, argon, carbon dioxide, or the like has a large atomic radius (or molecular radius), and thus disturbs the atomic arrangement of the oxide semiconductor and decreases crystallinity.

An oxide semiconductor having a low density of defect states (a small number of oxygen vacancies) can have a low carrier density. Such an oxide semiconductor is referred to as a highly purified intrinsic or substantially highly purified intrinsic oxide semiconductor. A CAAC-OS has a low impurity concentration and a low density of defect states. That is, a CAAC-OS is likely to be highly purified intrinsic or substantially highly purified intrinsic oxide semiconductor. Thus, a transistor including a CAAC-OS rarely has negative threshold voltage (is rarely normally on). The highly purified intrinsic or substantially highly purified intrinsic oxide semiconductor has few carrier traps. An electric charge trapped by the carrier traps in the oxide semiconductor takes a long time to be released. The trapped electric charge may behave like a fixed electric charge. Thus, the transistor which includes the oxide semiconductor having a high impurity concentration and a high density of defect states might have unstable electrical characteristics. However, a transistor including a CAAC-OS has small variation in electrical characteristics and high reliability.

Since the CAAC-OS has a low density of defect states, carriers are less likely to be trapped in defect states with light irradiation. Therefore, in a transistor using the CAAC-OS, change in electrical characteristics due to irradiation with visible light or ultraviolet light is small.

<Microcrystalline Oxide Semiconductor>

Next, a microcrystalline oxide semiconductor is described.

A microcrystalline oxide semiconductor has a region in which a crystal part is observed and a region in which a crystal part is not clearly observed in a high-resolution TEM image. In most cases, the size of a crystal part included in the microcrystalline oxide semiconductor is greater than or equal to 1 nm and less than or equal to 100 nm, or greater than or equal to 1 nm and less than or equal to 10 nm. An oxide semiconductor including a nanocrystal (nc) that is a microcrystal with a size greater than or equal to 1 nm and less than or equal to 10 nm, or a size greater than or equal to 1 nm and less than or equal to 3 nm is specifically referred to as a nanocrystalline oxide semiconductor (nc-OS). In a high-resolution TEM image of the nc-OS, for example, a grain boundary is not clearly observed in some cases. Note that there is a possibility that the origin of the nanocrystal is the same as that of a pellet in a CAAC-OS. Therefore, a crystal part of the nc-OS may be referred to as a pellet in the following description.

In the nc-OS, a microscopic region (for example, a region with a size greater than or equal to 1 nm and less than or equal to 10 nm, in particular, a region with a size greater than or equal to 1 nm and less than or equal to 3 nm) has a periodic atomic arrangement. There is no regularity of crystal orientation between different pellets in the nc-OS. Thus, the orientation of the whole film is not ordered. Accordingly, the nc-OS cannot be distinguished from an amorphous oxide semiconductor, depending on an analysis method. For example, when the nc-OS is subjected to structural analysis by an out-of-plane method with an XRD apparatus using an X-ray having a diameter larger than the size of a pellet, a peak which shows a crystal plane does not appear. Furthermore, a diffraction pattern like a halo pattern is observed when the nc-OS is subjected to electron diffraction using an electron beam with a probe diameter (e.g., 50 nm or larger) that is larger than the size of a pellet (the electron diffraction is also referred to as selected-area electron diffraction). Meanwhile, spots appear in a nanobeam electron diffraction pattern of the nc-OS when an electron beam having a probe diameter close to or smaller than the size of a pellet is applied. Moreover, in a nanobeam electron diffraction pattern of the nc-OS, regions with high luminance in a circular (ring) pattern are shown in some cases. Also in a nanobeam electron diffraction pattern of the nc-OS, a plurality of spots is shown in a ring-like region in some cases.

Since there is no regularity of crystal orientation between the pellets (nanocrystals) as mentioned above, the nc-OS can also be referred to as an oxide semiconductor including random aligned nanocrystals (RANC) or an oxide semiconductor including non-aligned nanocrystals (NANC).

The nc-OS is an oxide semiconductor that has high regularity as compared with an amorphous oxide semiconductor. Therefore, the nc-OS is likely to have a lower density of defect states than an amorphous oxide semiconductor. Note that there is no regularity of crystal orientation between different pellets in the nc-OS. Therefore, the nc-OS has a higher density of defect states than the CAAC-OS.

<Amorphous Oxide Semiconductor>

Next, an amorphous oxide semiconductor is described.

The amorphous oxide semiconductor is an oxide semiconductor having disordered atomic arrangement and no crystal part and exemplified by an oxide semiconductor which exists in an amorphous state as quartz.

In a high-resolution TEM image of the amorphous oxide semiconductor, crystal parts cannot be found.

When the amorphous oxide semiconductor is subjected to structural analysis by an out-of-plane method with an XRD apparatus, a peak which shows a crystal plane does not appear. A halo pattern is observed when the amorphous oxide semiconductor is subjected to electron diffraction. Furthermore, a spot is not observed and only a halo pattern appears when the amorphous oxide semiconductor is subjected to nanobeam electron diffraction.

There are various understandings of an amorphous structure. For example, a structure whose atomic arrangement does not have ordering at all is called a completely amorphous structure. Meanwhile, a structure which has ordering within the nearest neighbor atomic distance or the second-nearest neighbor atomic distance but does not have long-range ordering is also called an amorphous structure. Therefore, the strictest definition does not permit an oxide semiconductor to be called an amorphous oxide semiconductor as long as even a negligible degree of ordering is present in an atomic arrangement. At least an oxide semiconductor having long-term ordering cannot be called an amorphous oxide semiconductor. Accordingly, because of the presence of crystal part, for example, a CAAC-OS and an nc-OS cannot be called an amorphous oxide semiconductor or a completely amorphous oxide semiconductor.

<Amorphous-like Oxide Semiconductor>

Note that an oxide semiconductor may have a structure having physical properties between the nc-OS and the amorphous oxide semiconductor. The oxide semiconductor having such a structure is specifically referred to as an amorphous-like oxide semiconductor (a-like OS).

In a high-resolution TEM image of the a-like OS, a void may be observed. Furthermore, in the high-resolution TEM image, there are a region where a crystal part is clearly observed and a region where a crystal part is not observed.

The a-like OS has an unstable structure because it contains a void. To verify that an a-like OS has an unstable structure as compared with a CAAC-OS and an nc-OS, a change in structure caused by electron irradiation is described below.

An a-like OS (referred to as Sample A), an nc-OS (referred to as Sample B), and a CAAC-OS (referred to as Sample C) are prepared as samples subjected to electron irradiation. Each of the samples is an In—Ga—Zn oxide.

First, a high-resolution cross-sectional TEM image of each sample is obtained. The high-resolution cross-sectional TEM images show that all the samples have crystal parts.

Note that a crystal part is determined as follows. It is known that a unit cell of an $InGaZnO_4$ crystal has a structure in which nine layers including three In—O layers and six Ga—Zn—O layers are stacked in the c-axis direction. The distance between the adjacent layers is equivalent to the lattice spacing on the (009) plane (also referred to as d value). The value is calculated to be 0.29 nm from crystal structural analysis. Accordingly, a portion where the lattice spacing between lattice fringes is greater than or equal to 0.28 nm and less than or equal to 0.30 nm is regarded as a crystal part of $InGaZnO_4$. Each of lattice fringes corresponds to the a-b plane of the $InGaZnO_4$ crystal.

Figure 40:
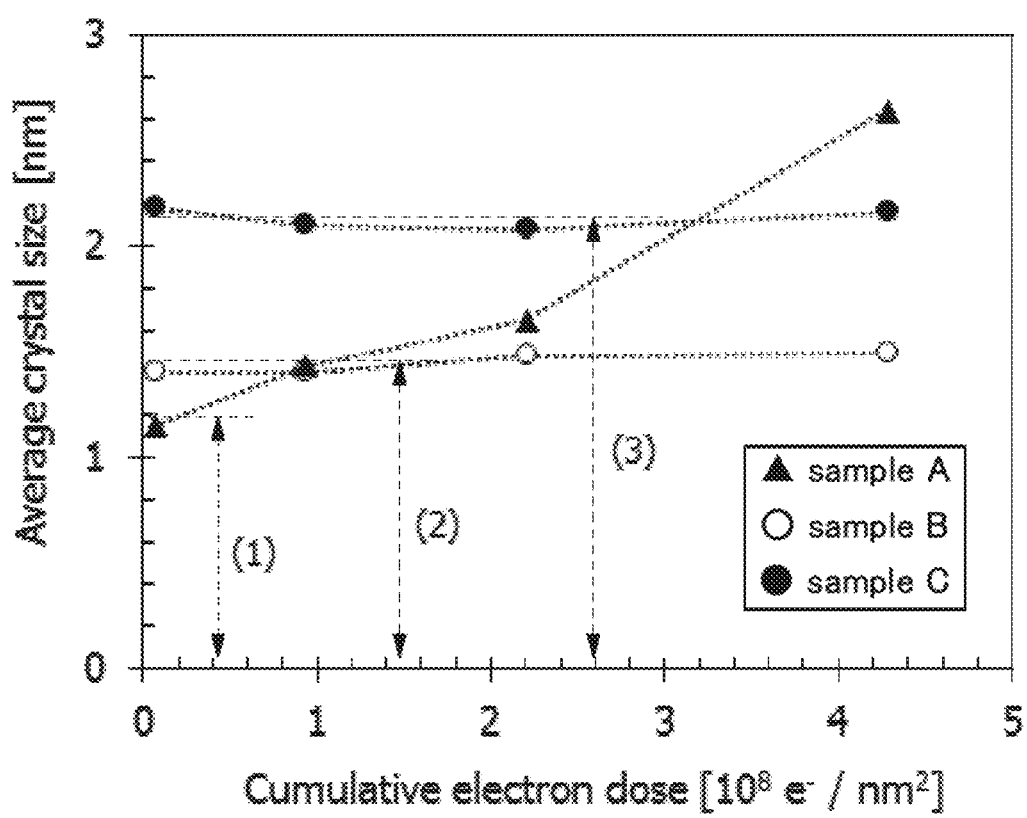
FIG. 40 A diagram showing a change in crystal part of an In—Ga—Zn oxide induced by electron irradiation.

FIG. 40 shows change in the average size of crystal parts (at 22 points to 45 points) in each sample. Note that the crystal part size corresponds to the length of a lattice fringe. FIG. 40 indicates that the crystal part size in the a-like OS increases with an increase in the cumulative electron dose. Specifically, as shown by (1) in FIG. 40, a crystal part of approximately 1.2 nm at the start of TEM observation grows to a size of approximately 2.6 nm at a cumulative electron dose of $4.2 \times 10^8$ $e^-/nm^2$. In contrast, the crystal part size in the nc-OS and the CAAC-OS shows little change from the start of electron irradiation to a cumulative electron dose of $4.2 \times 10^8$ $e^-/nm^2$. Specifically, as shown by (2) and (3) in FIG. 40, the average crystal sizes in an nc-OS and a CAAC-OS are approximately 1.4 nm and approximately 2.1 nm, respectively, regardless of the cumulative electron dose.

In this manner, growth of the crystal part in the a-like OS is induced by electron irradiation. In contrast, in the nc-OS and the CAAC-OS, growth of the crystal part is hardly induced by electron irradiation. Therefore, the a-like OS has an unstable structure as compared with the nc-OS and the CAAC-OS.

The a-like OS has a lower density than the nc-OS and the CAAC-OS because it contains a void. Specifically, the density of the a-like OS is higher than or equal to 78.6% and lower than 92.3% of the density of the single crystal oxide semiconductor having the same composition. The density of each of the nc-OS and the CAAC-OS is higher than or equal to 92.3% and lower than 100% of the density of the single crystal oxide semiconductor having the same composition. Note that it is difficult to deposit an oxide semiconductor having a density of lower than 78% of the density of the single crystal oxide semiconductor.

For example, in the case of an oxide semiconductor having an atomic ratio of In:Ga:Zn=1:1:1, the density of single crystal $InGaZnO_4$ with a rhombohedral crystal structure is 6.357 $g/cm^3$. Accordingly, in the case of the oxide semiconductor having an atomic ratio of In:Ga:Zn=1:1:1, the density of the a-like OS is higher than or equal to 5.0 $g/cm^3$ and lower than 5.9 $g/cm^3$. For example, in the case of the oxide semiconductor having an atomic ratio of In:Ga:Zn=1:1:1, the density of each of the nc-OS and the CAAC-OS is higher than or equal to 5.9 $g/cm^3$ and lower than 6.3 $g/cm^3$.

Note that there is a possibility that an oxide semiconductor having a desired composition cannot exist in a single crystal structure. In that case, single crystal oxide semiconductors with different compositions are combined at an adequate ratio, which makes it possible to calculate density equivalent to that of a single crystal oxide semiconductor with the desired composition. The density of a single crystal oxide semiconductor having the desired composition can be calculated using a weighted average according to the combination ratio of the single crystal oxide semiconductors with different compositions. Note that it is preferable to use as few kinds of single crystal oxide semiconductors as possible to calculate the density.

As described above, oxide semiconductors have various structures and various properties. Note that an oxide semiconductor may be a stacked layer including two or more films of an amorphous oxide semiconductor, an a-like OS, a microcrystalline oxide semiconductor, and a CAAC-OS, for example.

The semiconductor device of one embodiment of the present invention can be formed using an oxide semiconductor film having any of the above structures.

The structure and method described in this embodiment can be implemented by being combined as appropriate with any of the other structures and methods described in the other embodiments.

(Embodiment 8)

In this embodiment, an example of a display module is described below with reference to FIG. 20 and FIG. 21.

Figure 20:
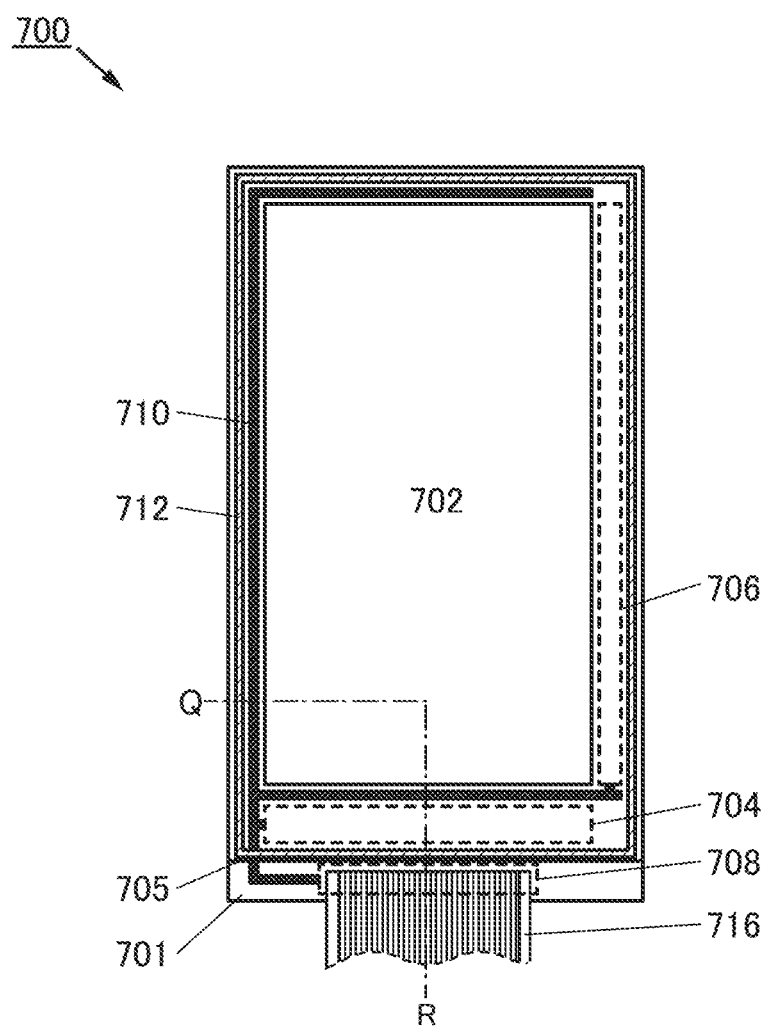
FIG. 20 A top view illustrating one embodiment of a display device.

FIG. 20 is a top view of an example of a display module. A display module 700 illustrated in FIG. 20 includes a pixel portion 702 provided over a first substrate 701; a source driver circuit portion 704 and a gate driver circuit portion 706 provided over the first substrate 701; a sealant 712 provided to surround the pixel portion 702, the source driver circuit portion 704, and the gate driver circuit portion 706; and a second substrate 705 provided to face the first substrate 701. The first substrate 701 and the second substrate 705 are sealed with the sealant 712. That is, the pixel portion 702, the source driver circuit portion 704, and the gate driver circuit portion 706 are sealed with the first substrate 701, the sealant 712, and the second substrate 705. Although not illustrated in FIG. 20, a display element is provided between the first substrate 701 and the second substrate 705.

In the display module 700, a flexible printed circuit (FPC) terminal portion 708 electrically connected to the pixel portion 702, the source driver circuit portion 704, the gate driver circuit portion 706 is provided in a region different from the region which is surrounded by the sealant 712 and positioned over the first substrate 701. Furthermore, an FPC 716 is connected to the FPC terminal portion 708, and a variety of signals and the like are supplied to the pixel portion 702, the source driver circuit portion 704, and the gate driver circuit portion 706 through the FPC 716. Furthermore, a signal line 710 is connected to the pixel portion 702, the source driver circuit portion 704, the gate driver circuit portion 706, and the FPC terminal portion 708. The variety of signals and the like are applied to the pixel portion 702, the source driver circuit portion 704, the gate driver circuit portion 706, and the FPC terminal portion 708 via the signal line 710 from the FPC 716.

A plurality of gate driver circuit portions 706 may be provided in the display module 700. An example of the display module 700 in which the source driver circuit portion 704 and the gate driver circuit portion 706 are formed over the first substrate 701 where the pixel portion 702 is also formed is described; however, the structure is not limited thereto. For example, only the gate driver circuit portion 706 may be formed over the first substrate 701 or only the source driver circuit portion 704 may be formed over the first substrate 701. In this case, a substrate where a source driver circuit, a gate driver circuit, or the like is formed (e.g., a driver-circuit substrate formed using a single-crystal semiconductor film or a polycrystalline semiconductor film) may be mounted on the first substrate 701. Note that there is no particular limitation on the method of connecting a separately prepared driver circuit substrate, and a chip on glass (COG) method, a wire bonding method, or the like can be used.

The pixel portion 702, the source driver circuit portion 704, and the gate driver circuit portion 706 included in the display module 700 include a plurality of transistors. As the plurality of transistors, any of the transistors that are described in the above embodiments can be used.

The display module 700 can include a liquid crystal element. Examples of display devices including the liquid crystal element include a liquid crystal display (e.g., a transmissive liquid crystal display, a transflective liquid crystal display, a reflective liquid crystal display, a direct-view liquid crystal display, or a projection liquid crystal display). In the case of a transflective liquid crystal display or a reflective liquid crystal display, some of or all of pixel electrodes function as reflective electrodes. For example, some or all of pixel electrodes are formed to include aluminum, silver, or the like. In such a case, a memory circuit such as an SRAM can be provided under the reflective electrodes, leading to lower power consumption.

As a display method in the display module 700, a progressive method, an interlace method, or the like can be employed. Furthermore, color elements controlled in a pixel at the time of color display are not limited to three colors: R, G, and B (R, G, and B correspond to red, green, and blue, respectively). For example, four pixels of the R pixel, the G pixel, the B pixel, and a W (white) pixel may be included. Alternatively, a color element may be composed of two colors among R, G, and B as in PenTile layout. The two colors may differ among color elements. Alternatively, one or more colors of yellow, cyan, magenta, and the like may be added to RGB. Furthermore, the size of a display region may be different depending on respective dots of the color components. Embodiments of the disclosed invention are not limited to a display device for color display; the disclosed invention can also be applied to a display device for monochrome display.

A coloring layer (also referred to as a color filter) may be used in order to obtain a full-color display device in which white light (W) for a backlight (e.g., an organic EL element, an inorganic EL element, an LED, or a fluorescent lamp) is used. As the coloring layer, red (R), green (G), blue (B), yellow (Y), or the like may be combined as appropriate, for example. With the use of the coloring layer, higher color reproducibility can be obtained than in the case without the coloring layer. In this case, by providing a region with the coloring layer and a region without the coloring layer, white light in the region without the coloring layer may be directly utilized for display. By partly providing the region without the coloring layer, a decrease in luminance due to the coloring layer can be suppressed, and 20% to 30% of power consumption can be reduced in some cases when an image is displayed brightly. Note that in the case where full-color display is performed using a self-luminous element such as an organic EL element or an inorganic EL element, elements may emit light of their respective colors R, G, B, Y, and W. By using a self-luminous element, power consumption can be further reduced as compared to the case of using the coloring layer in some cases. Note that in this embodiment, a structure in which a backlight and the like are not provided, that is, a so-called reflective liquid crystal display module is described below.

Figure 21:
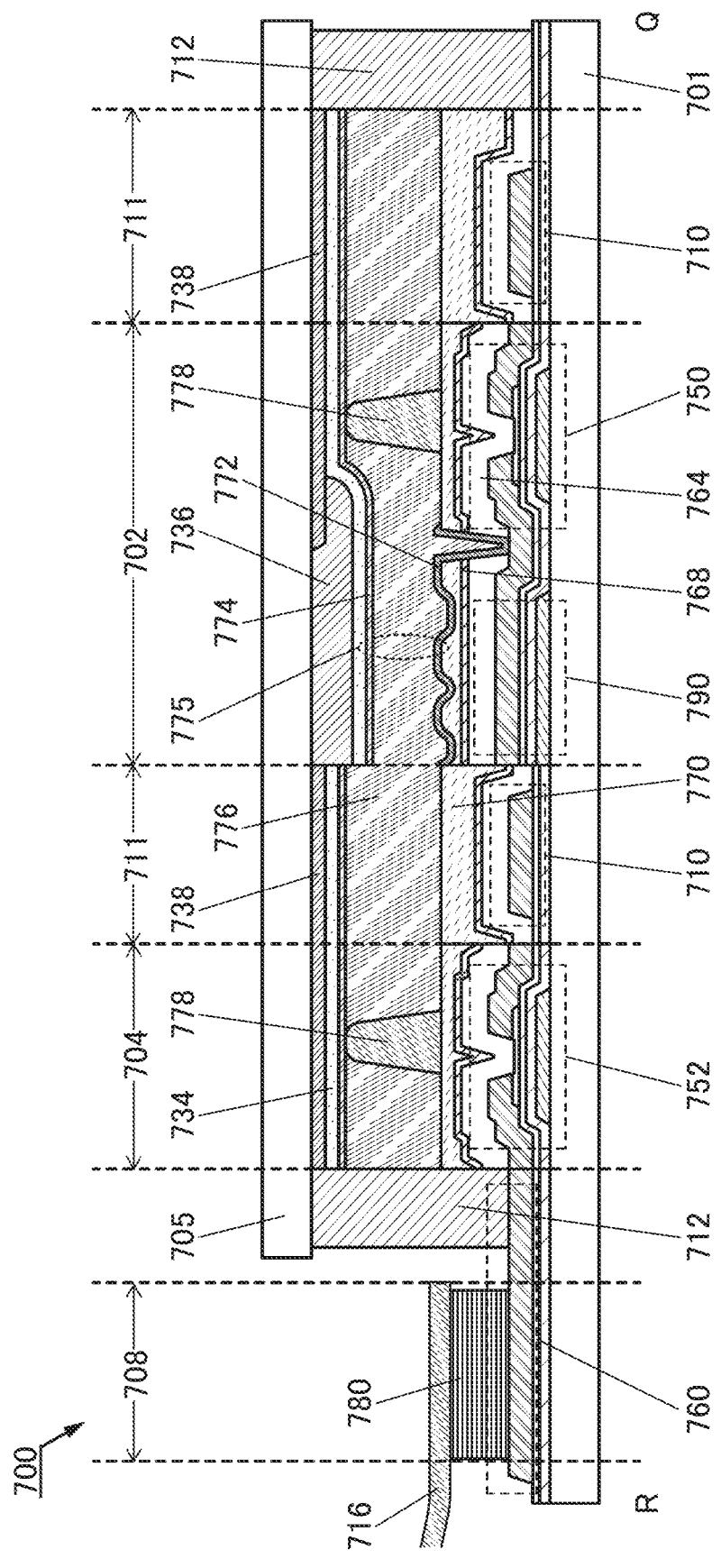
FIG. 21 A cross-sectional view illustrating one embodiment of a display device.

FIG. 21 is a cross-sectional view taken along dashed-dotted line Q-R in FIG. 20. The display module illustrated in FIG. 21 is described in detail below.

<Display Module>

The display module 700 illustrated in FIG. 21 includes a lead wiring portion 711, the pixel portion 702, the source driver circuit portion 704, and the FPC terminal portion 708. Note that the lead wiring portion 711 includes the signal line 710. The pixel portion 702 includes a transistor 750 and a capacitor 790. The source driver circuit portion 704 includes a transistor 752.

Any of the transistors described above can be used as the transistors 750 and 752.

The transistors used in this embodiment each include an oxide semiconductor film which is highly purified and in which formation of oxygen vacancies is suppressed. In the transistor, the current in an off state (off-state current) can be made small. Accordingly, an electrical signal such as an image signal can be held for a longer period, and a writing interval can be set longer in an on state. Accordingly, frequency of refresh operation can be reduced, which leads to an effect of suppressing power consumption.

In addition, the transistor used in this embodiment can have relatively high field-effect mobility and thus is capable of high speed operation. For example, with such a transistor which can operate at high speed used for a liquid crystal display device, a switching transistor in a pixel portion and a driver transistor in a driver circuit portion can be formed over one substrate. That is, a semiconductor device formed using a silicon wafer or the like is not additionally needed as a driver circuit, by which the number of components of the semiconductor device can be reduced. In addition, the transistor which can operate at high speed can be used also in the pixel portion, whereby a high-quality image can be provided.

The capacitor 790 includes a dielectric between a pair of electrodes. Specifically, a conductive film which is formed using the same step as a conductive film functioning as a gate electrode of the transistor 750 is used as one electrode of the capacitor 790, and a conductive film functioning as a source electrode or a drain electrode of the transistor 750 is used as the other electrode of the capacitor 790. Furthermore, an insulating film functioning as a gate insulating film of the transistor 750 is used as the dielectric between the pair of electrodes.

In FIG. 21, insulating films 764, 766, and 768 and a planarization insulating film 770 are formed over the transistor 750, the transistor 752, and the capacitor 790.

As the insulating film 764, a silicon oxide film, a silicon oxynitride film, or the like may be formed by a PECVD device, for example. As the insulating film 768, a silicon nitride film or the like may be formed by a PECVD device, for example. The planarization insulating film 770 can be formed using a heat-resistant organic material, such as a polyimide resin, an acrylic resin, a polyimide amide resin, a benzocyclobutene resin, a polyamide resin, or an epoxy resin. Note that the planarization insulating film 770 may be formed by stacking a plurality of insulating films formed from these materials. Alternatively, a structure without the planarization insulating film 770 may be employed.

The signal line 710 is formed in the same process as conductive films functioning as a source electrode and a drain electrode of the transistor 750 or 752. Note that the signal line 710 may be formed using a conductive film which is formed in a different process as a source electrode and a drain electrode of the transistor 750 or 752, e.g., a conductive film functioning as a gate electrode may be used. In the case where the signal line 710 is formed using a material including a copper element, signal delay or the like due to wiring resistance is reduced, which enables display on a large screen.

The FPC terminal portion 708 includes a connection electrode 760, an anisotropic conductive film 780, and the FPC 716. Note that the connection electrode 760 is formed in the same process as conductive films functioning as a source electrode and a drain electrode of the transistor 750 or 752. The connection electrode 760 is electrically connected to a terminal included in the FPC 716 through the anisotropic conductive film 780.

For example, a glass substrate can be used as the first substrate 701 and the second substrate 705. A flexible substrate may be used as the first substrate 701 and the second substrate 705. Examples of the flexible substrate include a plastic substrate.

A structure body 778 is provided between the first substrate 701 and the second substrate 705. The structure body 778 is a columnar spacer obtained by selective etching of an insulating film and provided to control the distance (cell gap) between the first substrate 701 and the second substrate 705. Note that a spherical spacer may be used as the structure body 778. Although the structure in which the structure body 778 is provided on the first substrate 701 side is described as an example in this embodiment, one embodiment of the present invention is not limited thereto. For example, a structure in which the structure body 778 is provided on the second substrate 705 side, or a structure in which both of the first substrate 701 and the second substrate 705 are provided with the structure body 778 may be employed.

Furthermore, a light-blocking film 738 functioning as a black matrix, a coloring film 736 functioning as a color filter, and an insulating film 734 in contact with the light-blocking film 738 and the coloring film 736 are provided on the second substrate 705 side.

<Structural Example of Liquid Crystal Element as Display Element>

The display module 700 illustrated in FIG. 21 includes a liquid crystal element 775. The liquid crystal element 775 includes a conductive film 772, a conductive film 774, and a liquid crystal layer 776. The liquid crystal layer 776 is formed using a liquid crystal material having a dipole moment of greater than or equal to 0 and less than or equal to 3. The conductive film 774 is provided on the second substrate 705 side and functions as a counter electrode. The display module 700 in FIG. 21 is capable of displaying an image in such a manner that transmission or non-transmission of light is controlled by change in the alignment state of the liquid crystal layer 776 depending on a voltage applied to the conductive film 772 and the conductive film 774.

The conductive film 772 is connected to the conductive films functioning as a source electrode and a drain electrode included in the transistor 750. The conductive film 772 is formed over the planarization insulating film 770 to function as a pixel electrode, i.e., one electrode of the display element. The conductive film 772 has a function of a reflective electrode. The display module 700 in FIG. 21 is what is called a reflective color liquid crystal display device in which external light is reflected by the conductive film 772 to display an image through the coloring film 736.

A conductive film that transmits visible light or a conductive film that reflects visible light can be used for the conductive film 772. For example, a material including one kind selected from indium (In), zinc (Zn), and tin (Sn) is preferably used for the conductive film that transmits visible light. For example, a material including aluminum or silver may be used for the conductive film that reflects visible light. In this embodiment, the conductive film that reflects visible light is used for the conductive film 772.

In the case where a conductive film which reflects visible light is used as the conductive film 772, the conductive film may have a stacked-layer structure. For example, a 100-nm-thick aluminum film is formed as the bottom layer, and a 30-nm-thick silver alloy film (e.g., an alloy film including silver, palladium, and copper) is formed as the top layer. Such a structure makes it possible to obtain the following effects.

(1) Adhesion between the base film and the conductive film 772 can be improved.

(2) The aluminum film and the silver alloy film can be collectively etched depending on a chemical solution.

(3) The conductive film 772 can have a favorable cross-sectional shape (e.g., a tapered shape).

The reason for (3) is as follows: the etching rate of the aluminum film with the chemical solution is lower than that of the silver alloy film, or etching of the aluminum film that is the bottom layer is developed faster than that of the silver alloy film because when the aluminum film that is the bottom layer is exposed after the etching of the silver alloy film that is the top layer, electrons are extracted from metal that is less noble than the silver alloy film, i.e., aluminum that is metal having a high ionization tendency, and thus etching of the silver alloy film is suppressed.

Note that projections and depressions are provided in part of the planarization insulating film 770 of the pixel portion 702 in the display module 700 in FIG. 21. The projections and depressions can be formed in such a manner that the planarization insulating film 770 is formed using an organic resin film or the like, and projections and depressions are formed on the surface of the organic resin film. The conductive film 772 functioning as a reflective electrode is formed along the projections and depressions. Therefore, when external light is incident on the conductive film 772, the light is reflected diffusely at the surface of the conductive film 772, whereby visibility can be improved. As illustrated in FIG. 21, a reflective color liquid crystal display device can display an image without a backlight, which enables a reduction in power consumption.

Note that in the case where the projections and depressions are not formed and the reflective electrode is flat, a scattering film or the like (not shown) may be provided outside the display module. This can diffusely reflect light.

Figure 22:
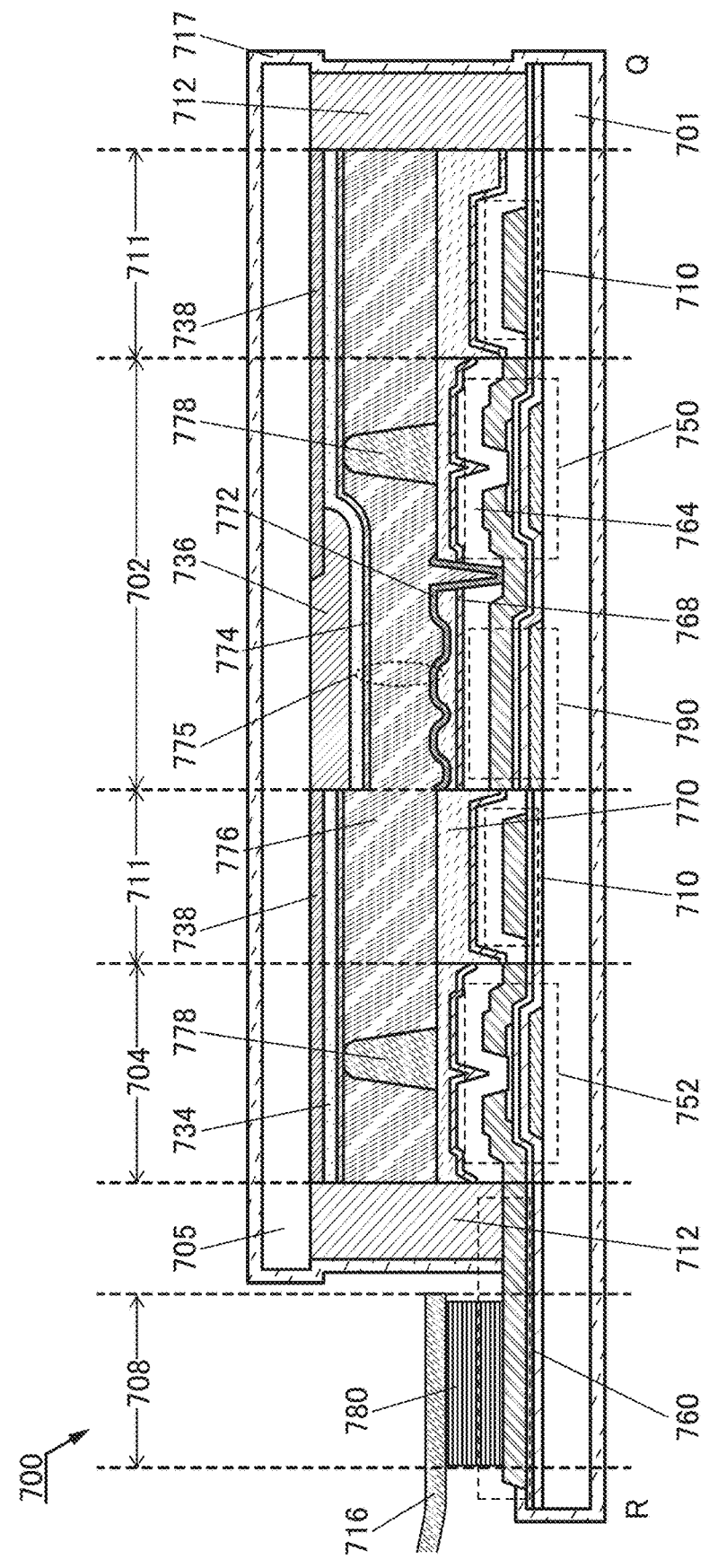
FIG. 22 A cross-sectional view illustrating one embodiment of a display device.

As illustrated in FIG. 22, a protective film 717 may be formed on the outer surface of the display module 700. The protective film 717 is preferably deposited by an atomic layer deposition method (hereinafter referred to as an ALD method), for example.

An ALD method enables a film to be deposited extremely uniformly on a deposition surface. By using an ALD method, for example, aluminum oxide, hafnium oxide, zirconium oxide, titanium oxide, zinc oxide, indium oxide, tin oxide, indium tin oxide (ITO), tantalum oxide, silicon oxide, manganese oxide, nickel oxide, erbium oxide, cobalt oxide, tellurium oxide, barium titanate, titanium nitride, tantalum nitride, tantalum nitride, aluminum nitride, tungsten nitride, cobalt nitride, silicon nitride, manganese nitride, hafnium nitride, and the like can be deposited as the protection film.

Furthermore, the protective film is not limited to an insulating film, and a conductive film may also be deposited. For example, ruthenium, platinum, nickel, cobalt, manganese, or copper can be deposited.

Furthermore, a portion for electrical connection, such as the FPC terminal portion 708, is preferably masked so that the film is not deposited on the portion. For the masking, an organic film, an inorganic film, a metal, or the like can be used. For example, an oxide insulating film containing silicon oxide, silicon oxynitride, gallium oxide, gallium oxynitride, yttrium oxide, yttrium oxynitride, hafnium oxide, hafnium oxynitride, or the like, a nitride insulating film containing silicon nitride, aluminum nitride, or the like, or an organic material such as a photoresist, a polyimide resin, an acrylic resin, a polyimide amide resin, a benzocyclobutene resin, a polyamide resin, or an epoxy resin can be used. A mask formed using a film containing any of these materials can be removed after the deposition of the protective film.

Furthermore, a region on which the protective film is deposited can be masked with a metal mask by an ALD method. The metal mask can be formed using a metal element selected from iron, chromium, nickel, cobalt, cobalt, tungsten, molybdenum, aluminum, copper, tantalum, and titanium, an alloy including any of the metal elements, an alloy including any of the metal elements in combination, or the like. The metal mask can be positioned close to or in contact with the display panel.

A film formed by an ALD method can be extremely uniform and dense. When the protective film 717 is formed on the side surface portion of the display panel by an ALD method, entry of an external component such as moisture can be inhibited. As a result, a change in transistor characteristics can be suppressed and a peripheral circuit can operate stably. Moreover, the frame size can be reduced, the pixel region can be enlarged, and the resolution of the display device can be increased.

Note that the display module 700 illustrated in FIG. 21 or FIG. 22 is a reflective color liquid crystal display module given as an example, but a display type is not limited thereto. For example, a transmissive color liquid crystal display module in which the conductive film 772 is a conductive film that transmits visible light may be used. In the case of a transmissive color liquid crystal display module, projections and depressions are not necessarily provided on the planarization insulating film 770.

Although not illustrated in FIG. 21 or FIG. 22, an alignment film may be provided on a side of the conductive film 772 in contact with the liquid crystal layer 776 and on a side of the conductive film 774 in contact with the liquid crystal layer 776. Although not illustrated in FIG. 21 or FIG. 22, an optical member (an optical substrate) and the like such as a polarizing member, a retardation member, or an anti-reflection member may be provided as appropriate. For example, circular polarization may be employed by using a polarizing substrate and a retardation substrate. In the case of the transmissive display module or the semi-transmissive display module, a backlight, a sidelight, or the like may be used as a light source.

As the liquid crystal element, a thermotropic liquid crystal, a low-molecular liquid crystal, a high-molecular liquid crystal, a polymer dispersed liquid crystal, a ferroelectric liquid crystal, an anti-ferroelectric liquid crystal, or the like can be used. Such a liquid crystal material exhibits a cholesteric phase, a smectic phase, a cubic phase, a chiral nematic phase, an isotropic phase, or the like depending on conditions.

Alternatively, in the case of employing a horizontal electric field mode, a liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which several weight percent or more of a chiral material is mixed is used for the liquid crystal layer in order to improve the temperature range. The liquid crystal composition which includes liquid crystal exhibiting a blue phase and a chiral material has a short response time, and has optical isotropy, which makes the alignment process unneeded. Furthermore, the liquid crystal material that exhibits a blue phase has a small viewing angle dependence. An alignment film does not need to be provided and rubbing treatment is thus not necessary; accordingly, electrostatic discharge damage caused by the rubbing treatment can be prevented and defects and damage of the liquid crystal display device in the manufacturing process can be reduced.

In the case where a liquid crystal element is used as the display element, a twisted nematic (TN) mode, an electrically controlled birefringence (ECB) mode, an in-plane-switching (IPS) mode, a fringe field switching (FFS) mode, an axially symmetric aligned micro-cell (ASM) mode, an optical compensated birefringence (OCB) mode, a ferroelectric liquid crystal (FLC) mode, an antiferroelectric liquid crystal (AFLC) mode, or the like can be used.

Furthermore, a normally black liquid crystal display device such as a transmissive liquid crystal display device utilizing a vertical alignment (VA) mode may also be used. There are some examples of a vertical alignment mode; for example, a multi-domain vertical alignment (MVA) mode, a patterned vertical alignment (PVA) mode, an ASV mode, or the like can be employed.

The structure described in this embodiment can be used in appropriate combination with any of the structures described in the other embodiments.

(Embodiment 9)

In this embodiment, an input/output device (also referred to as a touch panel) obtained by providing a touch sensor (a contact sensor device) for the display module described in the above embodiment is described with reference to FIG. 23, FIG. 24, and FIG. 25. Hereinafter, the description of the same portions as the above embodiments is omitted in some cases.

FIG. 23 are projection drawings illustrating a structure of the input/output device.

FIG. 22A is a projection drawing of an input/output device 800, and FIG. 23B is a projection drawing illustrating a structure of a sensor unit 820U included in the input/output device 800.

Figure 24:
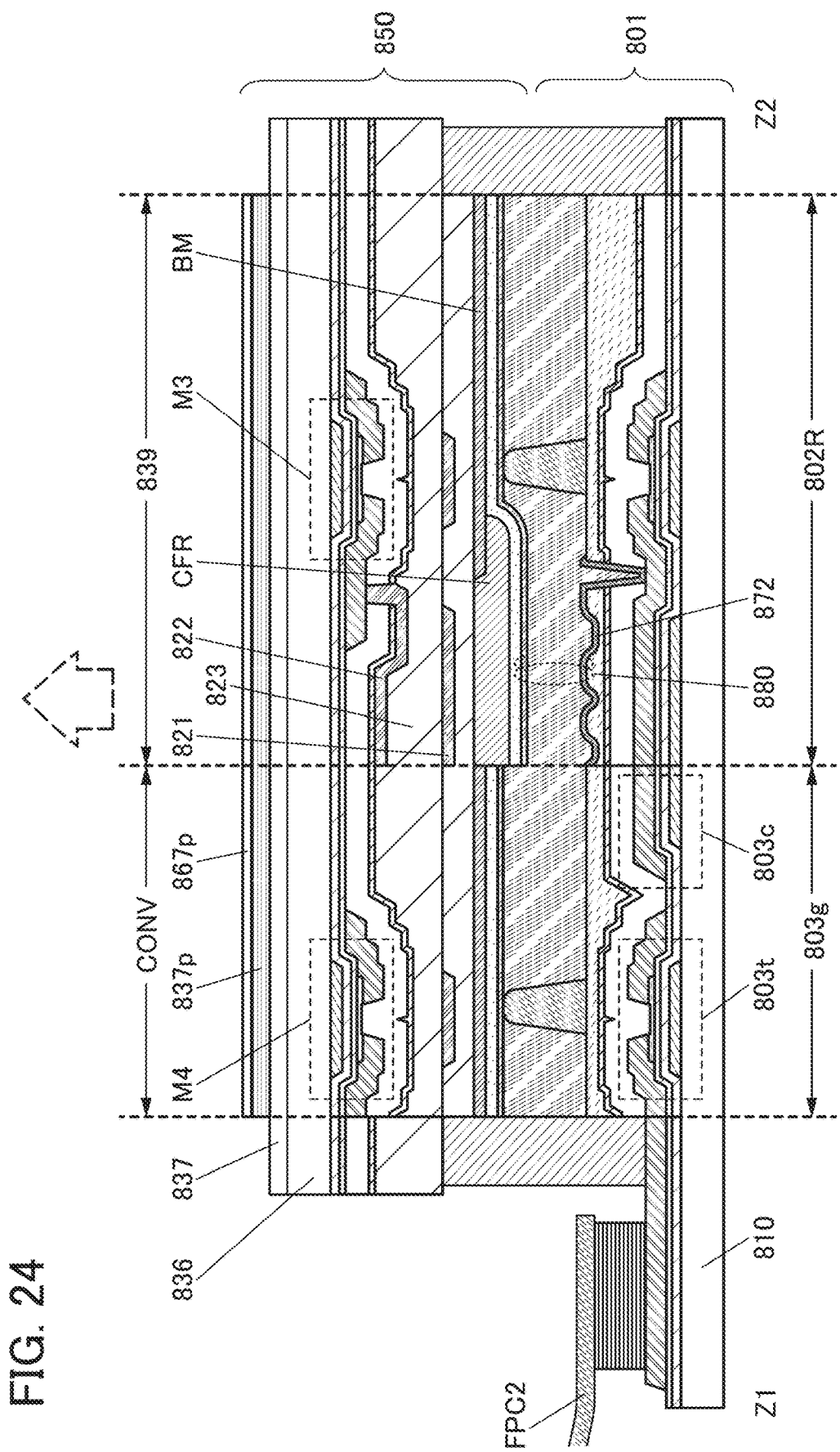
FIG. 24 A cross-sectional view illustrating a cross-sectional structure of an input/output device of one embodiment.

FIG. 24 is a cross-sectional view taken along line Z1-Z2 of the input/output device 800 in FIG. 23A.

<Structural Example 1 of Input/Output Device>

The input/output device 800 described in this embodiment includes an input device 850 and a display module 801. The input device 850 includes a plurality of sensor units 820U arranged in matrix and each provided with window portions 834 transmitting visible light, a scan line GL1 electrically connected to a plurality of sensor units 820U placed in the row direction (indicated by arrow Rx in the drawing), a signal line DL electrically connected to a plurality of sensor units 820U placed in the column direction (indicated by arrow Ry in the drawing), and a first base material 836 supporting the sensor unit 820U, the scan line GL1, and the signal line DL. The display module 801 includes a plurality of pixels 802 overlapping with the window portions 834 and arranged in matrix and a second base material 810 supporting the pixels 802 (see FIGS. 23A to 23C).

The sensor unit 820U includes a sensor element C overlapping with the window portion 834 and a sensor circuit 839 electrically connected to the sensor element C (see FIG. 23B).

The sensor element C includes an insulating layer 823 (not illustrated in FIG. 23B), and a first electrode 821 and a second electrode 823 between which the insulating layer 823 is sandwiched (see FIG. 23B).

A selection signal is supplied to the sensor circuit 839, and the sensor circuit 839 supplies a sensor signal DATA based on the change in capacitance of the sensor element C.

The scan line GL1 can supply the selection signal, the signal line DL can supply the sensor signal DATA, and the sensor circuit 839 is placed to overlap with gaps between the plurality of window portions 834.

In addition, the input/output device 800 described in this embodiment includes a coloring layer between the sensor unit 820U and the pixel 802 overlapping with the window portion 834 of the sensor unit 820U.

The input/output device 800 described in this embodiment includes the input device 850 including the plurality of sensor units 820U, each of which is provided with the window portions 834 transmitting visible light, and the display module 801 including the plurality of pixels 802 overlapping with the window portions 834. The coloring layer is included between the window portion 834 and the pixel 802.

With such a structure, the input/output device can supply a sensor signal based on the change in the capacitance and positional information of the sensor unit supplying the sensor signal and can display image data relating to the positional information of the sensor unit. As a result, a novel input/output device with high convenience or high reliability can be provided.

The input/output device 800 may include a flexible substrate FPC 1 to which a signal from the input device 850 is supplied and/or a flexible substrate FPC 2 supplying a signal including image data to the display module 801.

In addition, a protective base material 837 or a protective layer 837p that protects the input/output device 800 by preventing damage and/or an anti-reflective layer 867p that weakens the intensity of external light reflected by the input/output device 800 may be included.

Moreover, the input/output device 800 includes a scan line driver circuit 803g that supplies the selection signal to an operation line of the display module 801, a wiring 811 supplying a signal, and a terminal 819 electrically connected to the flexible substrate FPC 2.

Components of the input/output device 800 are described below. Note that these components cannot be clearly distinguished and one component also serves as another component or includes part of another component in some cases. For example, the input device 850 including the coloring layer overlapping with the plurality of window portions 834 also serves as a color filter.

<<Whole Structure of Input/Output Device>>

The input/output device 800 includes the input device 850 and the display module 801 (see FIG. 23A).

<<Input Device>>

The input device 850 includes the plurality of sensor units 820U and the first base material 836 supporting the sensor units 820U. For example, the plurality of sensor units 820U are arranged in matrix with 40 rows and 15 columns on the first base material 836.

<<Window Portion, Coloring Layer, and Light-blocking Layer>>

The window portion 834 transmits visible light.

A coloring layer transmitting light of a predetermined color is provided to overlap with the window portion 834. For example, a coloring layer CFB transmitting blue light, a coloring layer CFG, or a coloring layer CFR is included (see FIG. 23B).

Note that, in addition to the coloring layers transmitting blue light, green light, and/or red light, coloring layers transmitting light of various colors such as a coloring layer transmitting white light and a coloring layer transmitting yellow light can be included.

For a coloring layer, a metal material, a pigment, dye, or the like can be used.

A light-blocking layer BM is provided between the plurality of window portions 834. The light-blocking layer BM does not easily transmit light as compared to the window portion 834. The light-blocking layer BM is for blocking leakage of light generated in regions other than the window portion 834 and can change its shape depending on the state of leakage of light.

For the light-blocking layer BM, carbon black, a metal oxide, a composite oxide containing a solid solution of a plurality of metal oxides, or the like can be used.

The scan line GL1, the signal line DL, a wiring VPI, a wiring RES, a wiring VRES, and the sensor circuit 839 are provided to overlap with the light-blocking layer BM.

Note that a light-transmitting overcoat layer covering the coloring layer and the light-blocking layer BM can be provided.

<<Modification Example of Window Portion>>

Figure 33A:
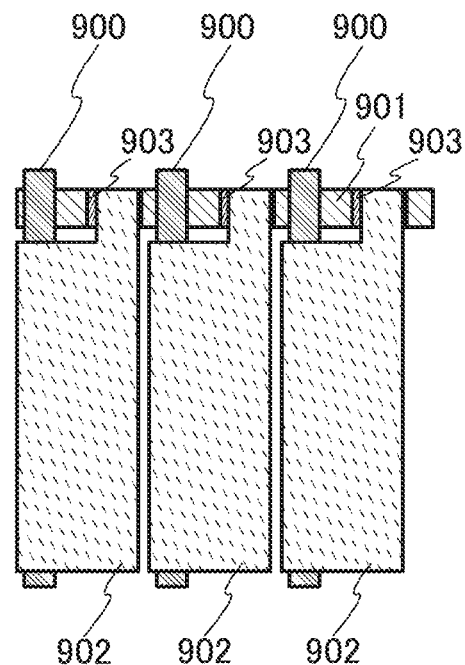
FIG. 33 A diagram illustrating pixel arrangement of a display device in Example.
Figure 33B:
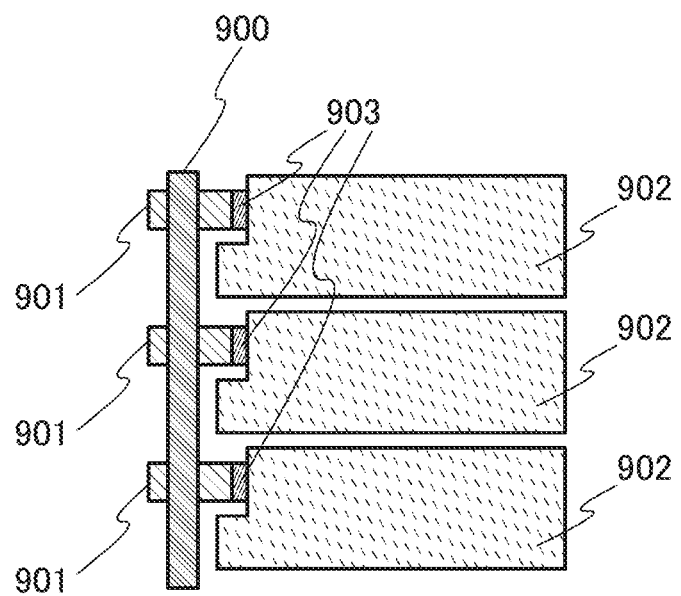

An example different from FIG. 23 in the orientation of the window portion 834 will be described. In the example of FIG. 23, the long side of the window portion 834 is provided in parallel with the Z1-Z2 direction (hereinafter referred to as "vertical stripe pixel arrangement"). Without limitation thereto, the short side of the window portion 834 may be provided in parallel with the Z1-Z2 direction (hereinafter referred to as "horizontal stripe pixel arrangement"). FIG. 33A and FIG. 33B respectively show an example of the longitudinal pixel arrangement and the lateral pixel arrangement. FIG. 33 shows a signal line 900, a scan line 901, a pixel 902, and a pixel transistor region 903.

The original purpose of providing the light-blocking layer BM is to block light which does not contribute to display operation but rather impairs the optical characteristics. However, it leads to reduce the area of an opening in the window portion 834 and can be a cause of reduction in light use efficiency or electric power efficiency. Particularly in the case of a reflective electrode, light source for display is only ambient light outside of the input/output device, and the reduction in opening area of the window portion 834 leads to a serious reduction in visibility.

In addition, in a driving method with refresh rate reduced, an inversion driving is needed to be performed for reducing flickers. This purpose is the reduction in flickers due to a flexo-electric effect which is attributed to polarization of liquid crystal molecules. In view of power consumption, a source line inversion driving is preferable. However, in the case of performing the driving in the vertical stripe pixel arrangement, a horizontal electric field occurs between adjacent pixels, so that leakage of light easily occurs due to disordered arrangement of liquid crystals of a liquid crystal element. As a result, the region needs to be light-blocked by the light-blocking layer BM.

In the display device, the formation of BM is necessarily for the light-blocking, which becomes a cause of reduction in aperture ratio. Furthermore, when the alignment accuracy of a substrate for sandwiching liquid crystals is considered, the BM needs to be formed in a wider region than the region where leakage of light actually occurs, which also becomes the cause of reduction.

However, in the case of a horizontal stripe pixel arrangement, a horizontal electric field is generated only in the short-side direction of a pixel even when the source line inversion driving is performed. In that case, leakage of light does not occur in the long-side direction, and thus there is no need to block light with the light-blocking layer BM. Accordingly, an opening region in the window portion is increased, and light use efficiency and electric power efficiency can be increased.

In the case where color display is performed in the horizontal stripe pixel arrangement, adjacent pixels in a direction parallel to the scan line have the same color phase, and color filters having different color phases by scan lines can be provided. If the influence of the adjacent pixel is exerted as a result of employing the inversion driving, the reduction in color purity can be suppressed when color filters having the same color phase are provided in a direction parallel to the scan line and color filters having different color phases by scan lines are provided.

Figure 51A:
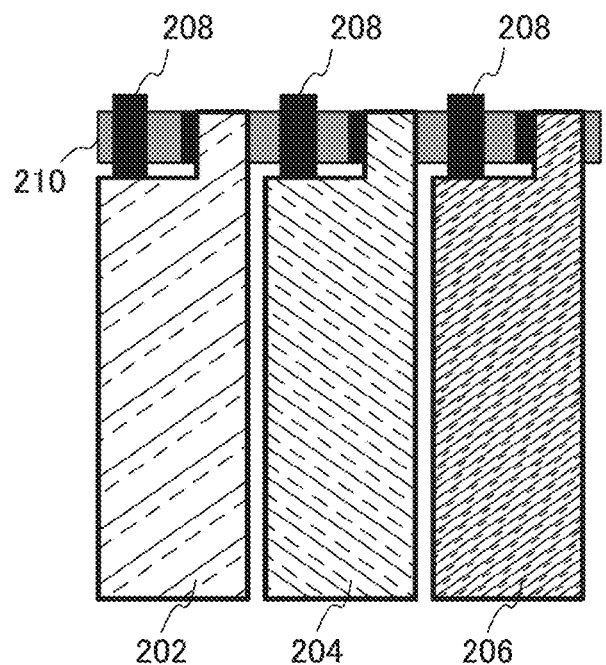
FIG. 51 A diagram showing pixel arrangement used in the liquid crystal simulation in Example.

For example, in the case where, as in the vertical stripe pixel arrangement (Vertical Stripe) in FIG. 51A, in the pixel 202 including a color filter having a first color phase, the pixel 204 including a color filter having a second color phase, and the pixel 206 including a color filter having a third color phase, the distance between the pixel 202 and the pixel 204 or between the pixel 204 and the pixel 206 is small and the source line inversion driving is performed, the influence of the adjacent pixel is large because the polarities (positive and negative) of voltage are inverted between the pixels. Thus, the independence of color phase of each pixel is decreased, so that the color purity of a displayed image might be reduced.

Figure 51B:
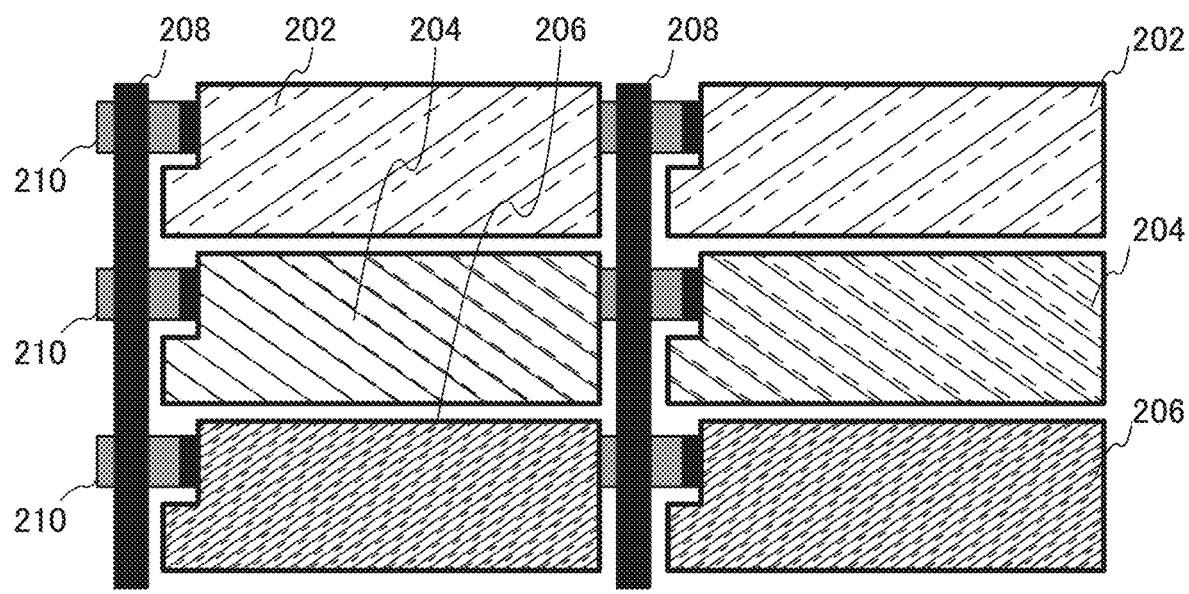

However, in the horizontal stripe pixel arrangement (Horizontal Stripe) in FIG. 51B, the adjacent pixels in the direction of the scan line 210 have the same color phase; thus, the independence of color phase can be maintained even if the influence of the adjacent pixel is exerted due to the inversion driving. The reduction in color purity of the adjacent pixel is suppressed and the influence on the displayed image can be reduced.

In addition, the signal line 208 is arranged in the direction parallel to the short sides of pixels, and the distance between a plurality of signal lines 208 is smaller than in the vertical stripe pixel arrangement. Owing to this, the influence of the adjacent pixel is less likely to be reflected in the display image. The area of the pixel electrode can be easily increased, and light use efficiency can be increased.

<<Sensor Element>>

The sensor element C includes the first electrode 821, the second electrode 822, and the insulating layer 823 between the first electrode 821 and the second electrode 822 (see FIG. 24).

The first electrode 821 is formed in, for example, an island shape so as to be apart from other regions. A layer that can be formed in the same process as that of the first electrode 821 is preferably placed close to the first electrode 821 so that the user of the input/output device 800 does not recognize the first electrode 821. Further preferably, the number of the window portions 834 placed in the gap between the first electrode 821 and the layer placed close to the first electrode 821 is reduced as much as possible. In particular, the window portion 834 is preferably not placed in the gap.

When an object whose dielectric constant is different from that of the air gets closer to the first electrode 821 or the second electrode 822 of the sensor element C that is put in the air, the capacitance of the sensor element C is changed. Specifically, when a finger or the like gets closer to the sensor element C, the capacitance of the sensor element C is changed. Thus, the sensor element C can be used in a proximity sensor.

The first electrode 821 and the second electrode 822 include a conductive material.

For example, an inorganic conductive material, an organic conductive material, a metal material, a conductive ceramic material, or the like can be used for the first electrode 821 and the second electrode 822.

Specifically, a metal element selected from aluminum, chromium, copper, tantalum, titanium, molybdenum, tungsten, nickel, silver, and manganese; an alloy including any of the above-described metal elements; an alloy including any of the above-described metal elements in combination; or the like can be used for the first electrode 821 and the second electrode 822.

Alternatively, a conductive oxide such as indium oxide, indium tin oxide, indium zinc oxide, zinc oxide, or zinc oxide to which gallium is added can be used for the first electrode 821 and the second electrode 822.

Alternatively, graphene or graphite can be used for the first electrode 821 and the second electrode 822. The film including graphene can be formed, for example, by reducing a film containing graphene oxide. As a reducing method, a method with application of heat, a method using a reducing agent, or the like can be employed.

Alternatively, a conductive polymer can be used for the first electrode 821 and the second electrode 822.

<<Sensor Circuit>>

The sensor circuit 839 includes transistors M1 to M3, for example. In addition, the sensor circuit 839 includes wirings supplying a power supply potential and a signal. For example, the signal line DL, the wiring VPI, a wiring CS, the scan line GL1, the wiring RES, the wiring VRES, and the signal line DL are included. Note that a specific structure of the sensing circuit 839 is described in detail in Embodiment 10.

Note that the sensor circuit 839 may be placed not to overlap with the window portion 834.

A conductive material can be used for the wirings (e.g., the signal line DL, the wiring VPI, the wiring CS, the scan line GL1, the wiring RES, the wiring VRES, and the signal line DL). For example, an inorganic conductive material, an organic conductive material, a metal material, a conductive ceramic material, or the like can be used for the wirings. Alternatively, a material which is the same as those of the first electrode 821 and the second electrode 822 may be used.

For the scan line GL1, the signal line DL, the wiring VPI, the wiring RES, and the wiring VRES, a metal material such as aluminum, gold, platinum, silver, nickel, titanium, tungsten, chromium, molybdenum, iron, cobalt, copper, or palladium, or an alloy material containing any of these metal materials can be used.

The sensor circuit 839 may be formed on the first base material 836. Alternatively, the sensor circuit 839 formed on another base material may be transferred to the first base material 836.

<<First Base Material and Second Base Material>>

Examples of the materials of the first base material 836 and the second base material 810 are glass substrates or flexible materials (e.g., a resin, a resin film, and a plastic film).

More specifically, non-alkali glass, soda-lime glass, potash glass, crystal glass, or the like can be used for the first base material 836 and the second base material 810. Alternatively, a resin film or resin plate of polyester, polyolefin, polyamide, polyimide, polycarbonate, an acrylic resin, or the like can be used for the first base material 836.

<<Protective Base Material, Protective Layer>>

For example, as the protective base material 837 and/or the protective layer 837*p*, a glass substrate, a resin film or resin plate of polyester, polyolefin, polyamide, polyimide, polycarbonate, an acrylic resin, or the like, a stack thereof, or the like can be used for the protective base material 837.

For example, a hard coat layer or a ceramic coat layer can be used as the protective layer 837*p*. Specifically, a layer containing a UV curable resin or aluminum oxide may be formed to overlap with the second electrode 822.

<<Display Module>>

The display module 801 includes the plurality of pixels 802 arranged in matrix (see FIG. 23C).

For example, the pixel 802 includes a sub-pixel 802B, a sub-pixel 802G, and a sub-pixel 802R, and each sub-pixel includes a display element and a pixel circuit for driving the display element.

In the pixel 802, the sub-pixel 802B is placed to overlap with the coloring layer CFB, the sub-pixel 802G is placed to overlap with the coloring layer CFG, and the sub-pixel 802R is placed to overlap with the coloring layer CFR.

<<Structure of Pixel>>

The coloring layer CFR overlaps with the liquid crystal element 880. Note that one electrode of the liquid crystal element 880 is a reflective electrode 872 (see FIG. 24). Thus, part of external light reflected by the reflective electrode 872 passes through the coloring layer CFR and is emitted in a direction indicated by an arrow in the drawing. The reflective electrode 872 can have a structure similar to that of the conductive film 772 serving as the reflective electrode in the above embodiment. In addition, the liquid crystal element 880 includes a liquid crystal layer whose dipole moment is greater than or equal to 0 and less than or equal to 3.

Moreover, the light-blocking layer BM is provided between the coloring layers (e.g., the coloring layer CFR and the coloring layer CFG).

The light-blocking layer BM may be provided between the plurality of coloring layers to surround them. In the case where leakage of light occurs in part, the shape may be changed to block light only in the part.

<<Configuration of Scan Line Driver Circuit>>

The scan line driver circuit 803*g* includes a transistor 803*t* and a capacitor 803*c* (see FIG. 24).

<<Converter>>

Various circuits that can convert the sensor signal DATA supplied from the sensor unit 820U and supply the converted signal to the flexible substrate FPC 1 can be used as a converter CONV (see FIG. 23A and FIG. 24).

For example, a transistor M4 can be used in the converter CONV.

<<Other Structure>>

The display module 801 includes the anti-reflective layer 867p positioned in a region overlapping with pixels. As the anti-reflective layer 867p, a circular polarizing plate can be used, for example.

As illustrated in FIG. 23A, the display module 801 includes the wirings 811 through which signals can be supplied. The wirings 811 are provided with the terminal 819. Note that the flexible substrate FPC 2 through which a signal such as an image signal or a synchronization signal is supplied is electrically connected to the terminal 819.

Note that a printed wiring board (PWB) may be attached to the flexible substrate FPC 2.

The display module 801 includes wirings such as scan lines, signal lines, and power supply lines. Any of various conductive films can be used as the wirings.

For the wirings included in the display module 801, for example, a metal element selected from aluminum, chromium, copper, tantalum, titanium, molybdenum, tungsten, nickel, yttrium, zirconium, silver, and manganese; an alloy including any of the above-described metal elements; or an alloy including any of the above-described metal elements in combination can be used. In particular, one or more elements selected from aluminum, chromium, copper, tantalum, titanium, molybdenum, and tungsten are preferably included. In particular, an alloy of copper and manganese is suitably used in microfabrication with the use of a wet etching method.

As specific structures of the wirings included in the display module 801, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, and the like can be given. Alternatively, a structure in which an alloy film or a nitride film which contains one or more elements selected from titanium, tantalum, tungsten, molybdenum, chromium, neodymium, and scandium is stacked over an aluminum film can be used. Alternatively, a light-transmitting conductive material including indium oxide, tin oxide, or zinc oxide may be used.

Figure 25:
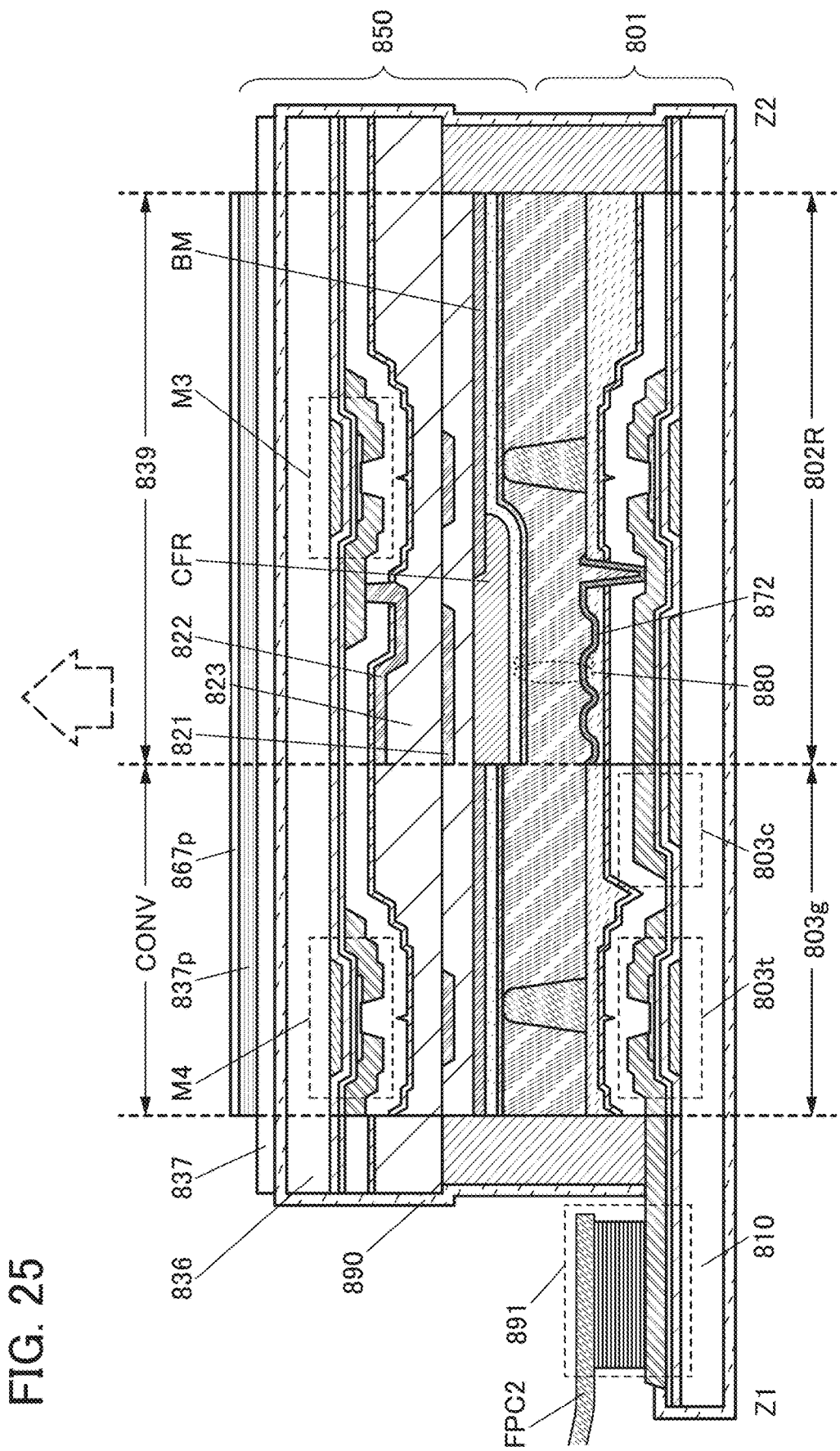
FIG. 25 A cross-sectional view illustrating a cross-sectional structure of an input/output device of one embodiment.

As illustrated in FIG. 25, a protective film 890 may be formed outside the display module 801. The protective film 890 is preferably formed by an ALD method, for example.

By an ALD method, a film can be deposited extremely uniformly on the deposition surface. By an ALD method, for example, aluminum oxide, hafnium oxide, zirconium oxide, titanium oxide, zinc oxide, indium oxide, tin oxide, indium tin oxide (ITO), tantalum oxide, silicon oxide, manganese oxide, nickel oxide, erbium oxide, cobalt oxide, tellurium oxide, barium titanate, titanium nitride, tantalum nitride, tantalum nitride, aluminum nitride, tungsten nitride, cobalt nitride, silicon nitride, manganese nitride, hafnium nitride, and the like can be deposited as the protection film. Furthermore, the protective film is not limited to an insulating film, and a conductive film may also be deposited. For example, ruthenium, platinum, nickel, cobalt, manganese, or copper can be deposited.

Furthermore, a portion for electrical connection, such as the FPC terminal portion 891, is preferably masked so that the film is not deposited on the portion. For the masking, an organic film, an inorganic film, a metal, or the like can be used. For example, an oxide insulating film containing silicon oxide, silicon oxynitride, gallium oxide, gallium oxynitride, yttrium oxide, yttrium oxynitride, hafnium oxide, hafnium oxynitride, or the like, a nitride insulating film containing silicon nitride, aluminum nitride, or the like, or an organic material such as a photoresist, a polyimide resin, an acrylic resin, a polyimide amide resin, a benzocyclobutene resin, a polyamide resin, or an epoxy resin can be used. A mask formed using a film containing any of these materials can be removed after the deposition of the protective film.

Furthermore, a region on which the protective film is deposited can be masked with a metal mask by an ALD method. The metal mask can be formed using a metal element selected from iron, chromium, nickel, cobalt, cobalt, tungsten, molybdenum, aluminum, copper, tantalum, and titanium, an alloy including any of the metal elements, an alloy including any of the metal elements in combination, or the like. The metal mask can be positioned close to or in contact with the display panel.

A film formed by an ALD method can be extremely uniform and dense. When the protective film 890 is formed on the side surface portion of the display panel by an ALD method, entry of an external component such as moisture can be inhibited. As a result, a change in transistor characteristics can be suppressed and a peripheral circuit can operate stably. Moreover, the frame size can be reduced, the pixel region can be enlarged, and the resolution of the display device can be increased.

Note that this embodiment can be combined with any of the other embodiments in this specification as appropriate.

(Embodiment 10)

In this embodiment, a configuration and a driving method of the sensor circuit 839 that can be used in the sensor unit 820U of the input/output device 800 described in the above embodiment is described with reference to FIG. 26.

Figure 26A:
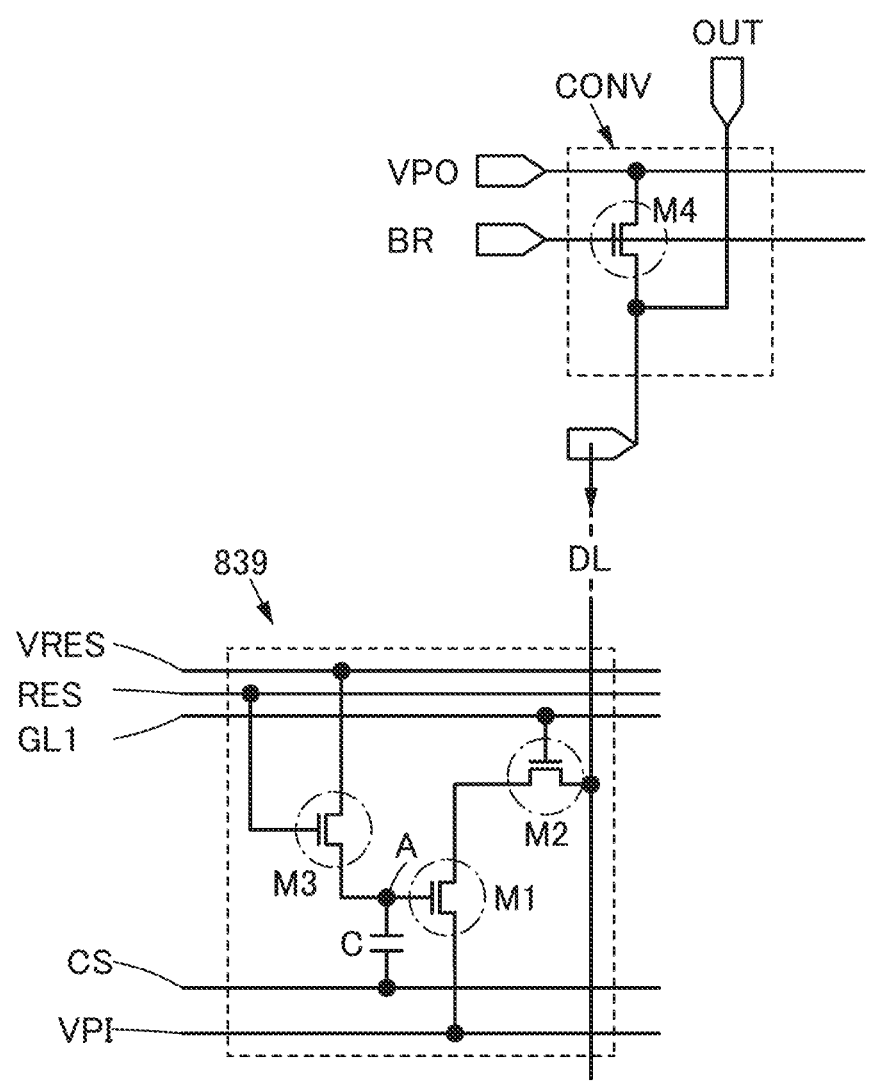
FIG. 26 A diagram showing configurations and driving methods of a sensor circuit 839 and a converter CONV of one embodiment.
Figures 1, 26B:
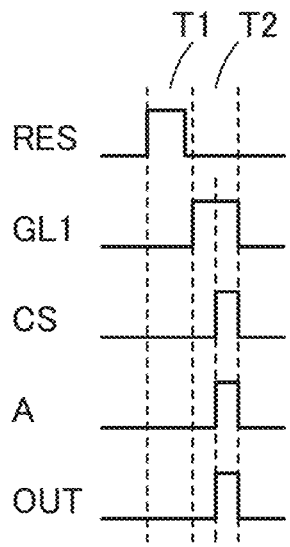
Figures 2, 26B:
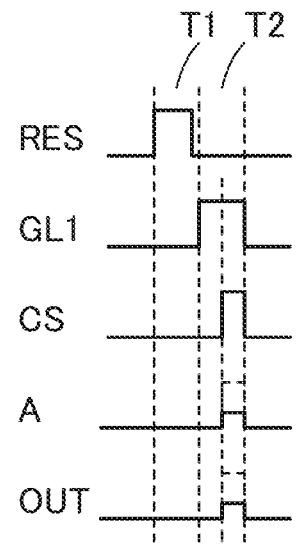

FIG. 26 illustrate a configuration and a driving method of the sensor circuit 839 and the converter CONV of one embodiment of the present invention.

FIG. 26A is a circuit diagram illustrating configurations of the sensor circuit 839 and the converter CONV of one embodiment of the present invention, and FIGS. 26B1 and 26B2 are timing charts illustrating driving methods.

The sensor circuit 839 includes the first transistor M1 whose gate is electrically connected to the first electrode 821 of the sensor element C and whose first electrode is electrically connected to the wiring VPI that can supply, for example, a ground potential (see FIG. 26A).

Furthermore, the second transistor M2 whose gate is electrically connected to the scan line GL1 that can supply a selection signal, whose first electrode is electrically connected to a second electrode of the first transistor M1, and whose second electrode is electrically connected to the signal line DL that can supply, for example, the sensor signal DATA may be included.

Furthermore, the third transistor M3 whose gate is electrically connected to the wiring RES that can supply a reset signal, whose first electrode is electrically connected to the first electrode 821 of the sensor element C, and whose second electrode is electrically connected to the wiring VRES that can supply, for example, a ground potential may be included.

The capacitance of the sensor element C is changed when an object gets closer to the first electrode 821 or the second electrode 822 or when a gap between the first electrode 821 and the second electrode 822 is changed, for example. Thus, the sensor circuit 839 can supply the sensor signal DATA based on the change in the capacitance of the sensor element C.

Furthermore, the sensor circuit 839 includes the wiring CS that can supply a control signal for controlling the potential of the second electrode 822 of the sensor element C.

Note that a node at which the first electrode 821 of the sensor element C, the gate of the first transistor M1, and the first electrode of the third transistor are electrically connected to each other is referred to as a node A.

The wiring VRES and the wiring VPI each can supply a ground potential, for example, and the wiring VPO and the wiring BR each can supply a high power supply potential, for example.

Furthermore, the wiring RES can supply a reset signal, the scan line GL1 can supply a selection signal, and the wiring CS can supply a control signal for controlling the potential of the second electrode 822 of the sensor element C.

Furthermore, the signal line DL can supply the sensor signal DATA, and a terminal OUT can supply a signal converted based on the sensor signal DATA.

Any of various circuits that can convert the sensor signal DATA and supply the converted signal to the terminal OUT can be used as the converter CONV. For example, a source follower circuit, a current mirror circuit, or the like may be formed by the electrical connection between the converter CONV and the sensor circuit 839.

Specifically, by using the converter CONV including the transistor M4, a source follower circuit can be formed (see FIG. 26A). Note that a transistor that can be formed in the same process as those of the first transistor M1 to the third transistor M3 may be used as the transistor M4.

The transistors M1 to M3 each include a semiconductor layer. For example, for the semiconductor layer, an element belonging to group 14, a compound semiconductor, or an oxide semiconductor can be used. Specifically, a semiconductor containing silicon, a semiconductor containing gallium arsenide, an oxide semiconductor containing indium, or the like can be used. Note that the above embodiments can be referred to for the transistor including an oxide semiconductor.

<Driving Method of Sensor Circuit>

A driving method of the sensor circuit 839 is described.
<<First Step>>

In a first step, a reset signal that turns on and then turns off the third transistor M3 is supplied, and the potential of the first electrode 821 of the sensor element C is set to a predetermined potential (see a period T1 in FIG. 26B1).

Specifically, the reset signal is supplied from the wiring RES. The third transistor M3 to which the reset signal is supplied sets the potential of the node A to a ground potential, for example (see FIG. 26A).
<<Second Step>>

In a second step, a selection signal that turns on the second transistor M2 is supplied to the gate of the second transistor M2, and the second electrode of the first transistor M1 is electrically connected to the signal line DL.

Specifically, the selection signal is supplied from the scan line GL1. Through the second transistor M2 to which the selection signal is supplied, the second electrode of the first transistor M1 is electrically connected to the signal line DL (see a period T2 in FIG. 26B1).
<<Third Step>>

In a third step, a control signal is supplied to the second electrode 822 of the sensor element C, and a potential changed based on the control signal and the capacitance of the sensor element C is supplied to the gate of the first transistor M1.

Specifically, a rectangular wave control signal is supplied from the wiring CS. By supplying the rectangular wave control signal to the second electrode 822 of the sensor element C, the potential of the node A is increased based on the capacitance of the sensor element C (see the latter half in the period T2 in FIG. 26B1).

For example, in the case where the sensor element is put in the air, when an object whose dielectric constant is higher than that of the air is placed closer to the second electrode 822 of the sensor element C, the capacitance of the sensor element C is apparently increased.

Thus, the change in the potential of the node A due to the rectangular wave control signal becomes smaller than that in the case where an object whose dielectric constant is higher than that of the air is placed is not placed closer (see a solid line in FIG. 26B2).
<<Fourth Step>>

In a fourth step, a signal obtained by the change in the potential of the gate of the first transistor M1 is supplied to the signal line DL.

For example, a change in current due to the change in the potential of the gate of the first transistor M1 is supplied to the signal line DL.

The converter CONV converts the change in the current flowing through the signal line DL into a change in voltage and outputs the voltage.
<<Fifth Step>>

In a fifth step, a selection signal for turning off the second transistor M2 is supplied to the gate of the second transistor M2.

Note that this embodiment can be combined with any of the other embodiments in this specification as appropriate.

(Embodiment 11)

In this embodiment, specific examples of electronic devices each of which is fabricated using the liquid crystal display device described in the above embodiment are described with reference to FIG. 27.

Examples of electronic devices to which the present invention can be applied include a television set (also referred to as a television or a television receiver), a monitor of a computer or the like, a camera such as a digital camera or a digital video camera, a digital photo frame, a mobile phone, a portable game machine, a portable information terminal, a music reproducing device, a game machine (e.g., a pachinko machine or a slot machine), and a game console. FIG. 27 illustrate specific examples of these electronic devices.

Figure 27A:
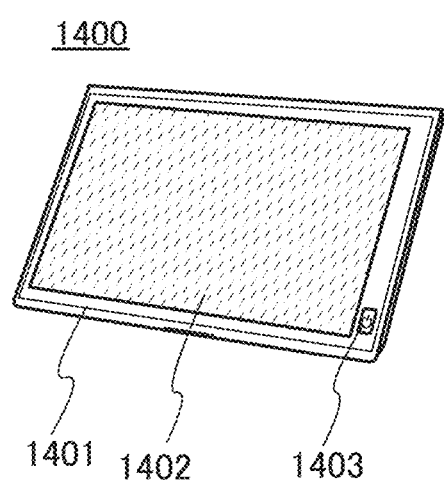
FIG. 27 A diagram showing an electronic device of one embodiment of the present invention.

FIG. 27A illustrates a portable information terminal 1400 including a display portion. The portable information terminal 1400 includes a display portion 1402 and an operation button 1403 which are incorporated in a housing 1401. The liquid crystal display device of one embodiment of the present invention can be used for the display portion 1402.

Figure 27B:
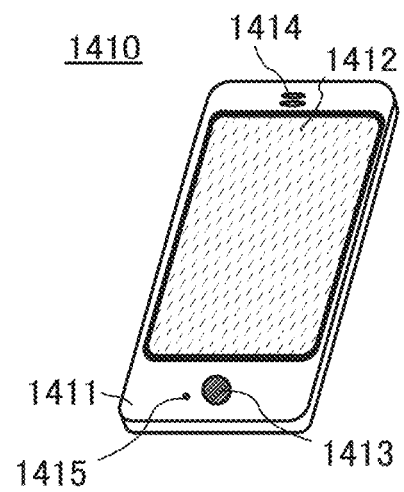

FIG. 27B illustrates a cellular phone 1410. The cellular phone 1410 includes a display portion 1412, an operation button 1413, a speaker 1414, and a microphone 1415 which are incorporated in a housing 1411. The liquid crystal display device of one embodiment of the present invention can be used for the display portion 1412.

Figure 27C:
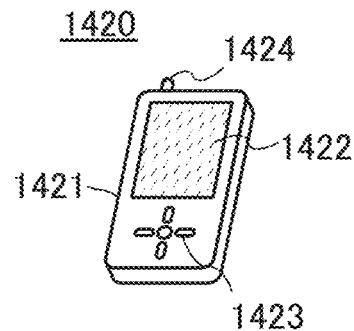
Figure 28A:
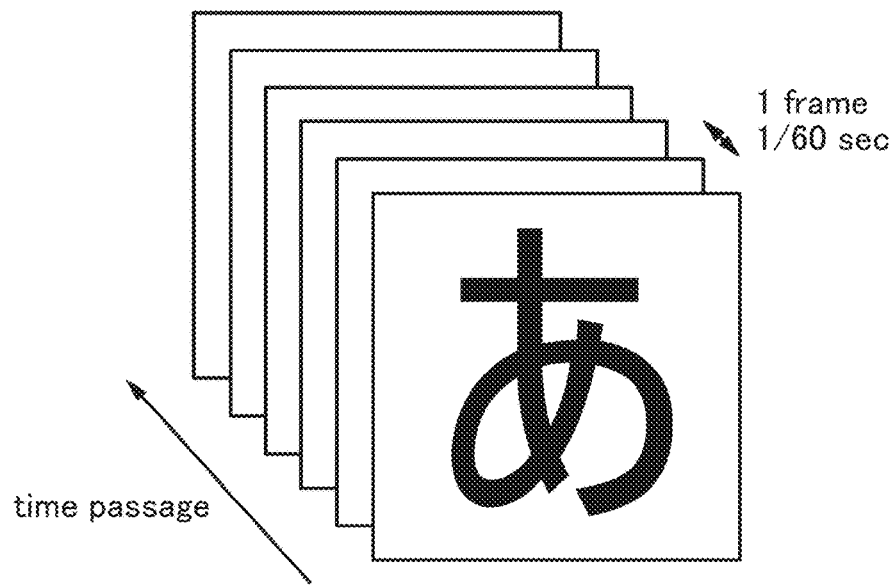
FIG. 28 A diagram illustrating display of one embodiment of the present invention.
Figure 28B:
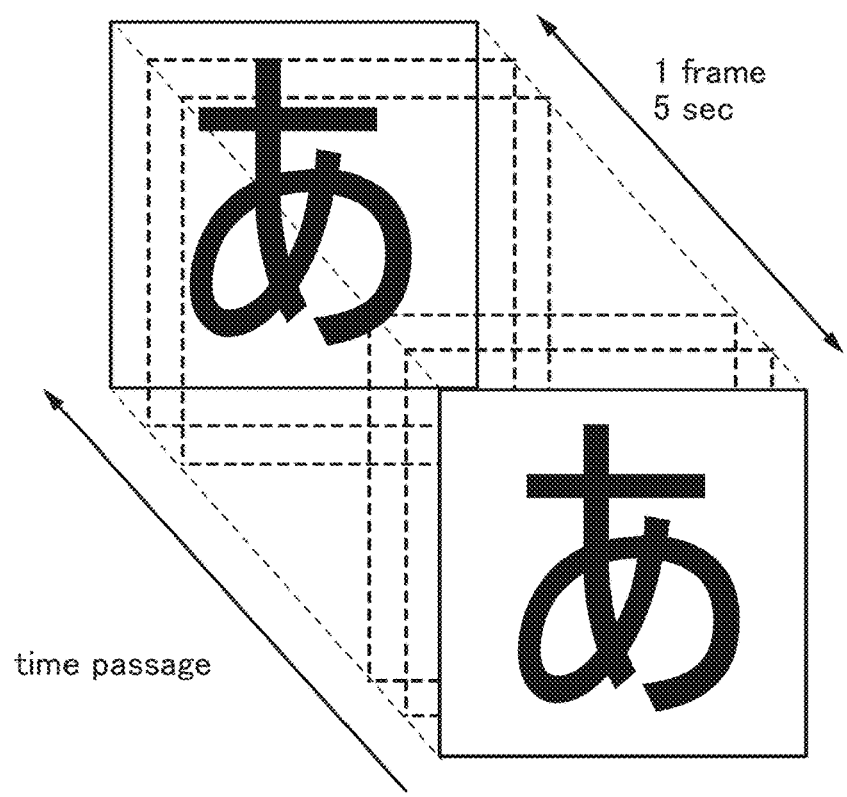

FIG. 27C illustrates a music reproducing device 1420. The music reproducing device 1420 includes a display portion 1422, an operation button 1423, and an antenna 1424 which are incorporated in a housing 1421. In addition, the antenna 1424 transmits and receives data via a wireless signal. The liquid crystal display device of one embodiment of the present invention can be used for the display portion 1422.

The display portions 1402, 1412, and 1422 each have a touch-input function. When a user touches a displayed button (not illustrated) which is displayed on the display portion 1402, 1412, or 1422 with his/her fingers or the like, the user can carry out operation on the screen and input of information.

When the liquid crystal display device described in the above embodiment is used for the display portions 1402, 1412, and 1422, the display quality of the display portions 1402, 1412, and 1422 can be improved.

This embodiment can be implemented in an appropriate combination with any of the structures described in the other embodiments.

(Embodiment 12)

In this embodiment, the significance of a reduction in refresh rate described in the above embodiments is explained.

The eyestrain is divided into two categories: nerve strain and muscle strain. The nerve strain is caused by prolonged looking at light emitted from a liquid crystal display device or blinking images. This is because the brightness stimulates and fatigues a retina, optic nerves, and a brain. The muscle strain is caused by overuse of a ciliary muscle which works for adjusting the focus.

FIG. 26A is a schematic diagram illustrating display of a conventional liquid crystal display device. As illustrated in FIG. 26A, for the display of the conventional liquid crystal display device, image rewriting is performed 60 times per second. A prolonged looking at such a screen might stimulate a retina, optic nerves, and a brain of a user and lead to eyestrain.

In one embodiment of the present invention, a transistor including an oxide semiconductor (e.g., a transistor including a CAAC-OS) is used in a pixel portion of a liquid crystal display device. Since the transistor has an extremely small off-state current, the luminance of the liquid crystal display device can be kept even when the frame frequency is decreased.

Thus, for example, the number of times of image writing can be reduced to 5 times per second as shown in FIG. 26B. The same image can be displayed for a long time as much as possible and flickering on a screen perceived by a user can be suppressed. Therefore, stimuli to a retina, optic nerves, and a brain of a user are reduced, so that the strain is reduced.

Figure 29A:
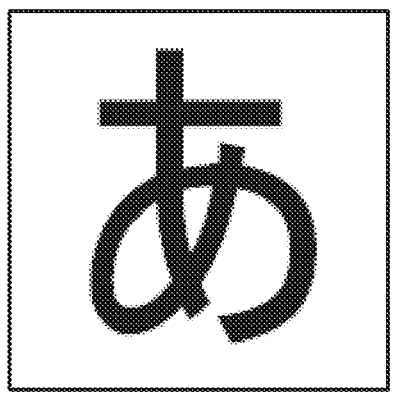
FIG. 29 A diagram illustrating display of one embodiment of the present invention.

In the case where the size of one pixel is large (e.g., the resolution is less than 150 ppi), a blurred character is displayed by a liquid crystal display device as shown in FIG. 29A. When users look at the blurred character displayed on the liquid crystal display device for a long time, their ciliary muscles keep working to adjust the focus in a state where adjusting the focus is difficult, which might lead to eyestrain.

Figure 29B:
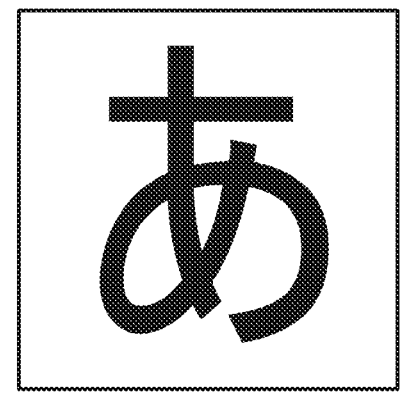

In contrast, in the liquid crystal display device of one embodiment of the present invention, the size of one pixel is small and thus high resolution display is performed as shown in FIG. 29B, so that precise and smooth display can be achieved. The precise and smooth display enables ciliary muscles to adjust the focus more easily, and reduces muscle strain of users.

Quantitative measurement of eyestrain has been studied. For example, the critical flicker (fusion) frequency (CFF) is known as an index of measuring nerve strain; and the accommodation time and the accommodation near point are known as indexes of measuring muscle strain.

Examples of other methods for measuring eyestrain include electroencephalography, thermography, measurement of the number of blinkings, measurement of tear volume, measurement of a pupil contractile response speed, and a questionnaire for surveying subjective symptoms.

One embodiment of the present invention can provide an eye-friendly liquid crystal display device.

This embodiment can be implemented in an appropriate combination with any of the structures described in the other embodiments.

EXAMPLE 1

In this example, a liquid crystal material which is one embodiment of the present invention was manufactured and evaluated.

In the synthesis of the liquid crystal material, an index value for electrical characteristics of the liquid crystal material was estimated by the following method: the allowable amount of change in a voltage applied to a liquid crystal layer for one frame was calculated. The voltage corresponds to the amount of change in luminance with which no flicker can be perceived at a lower refresh rate of a display device.

Figure 38A:
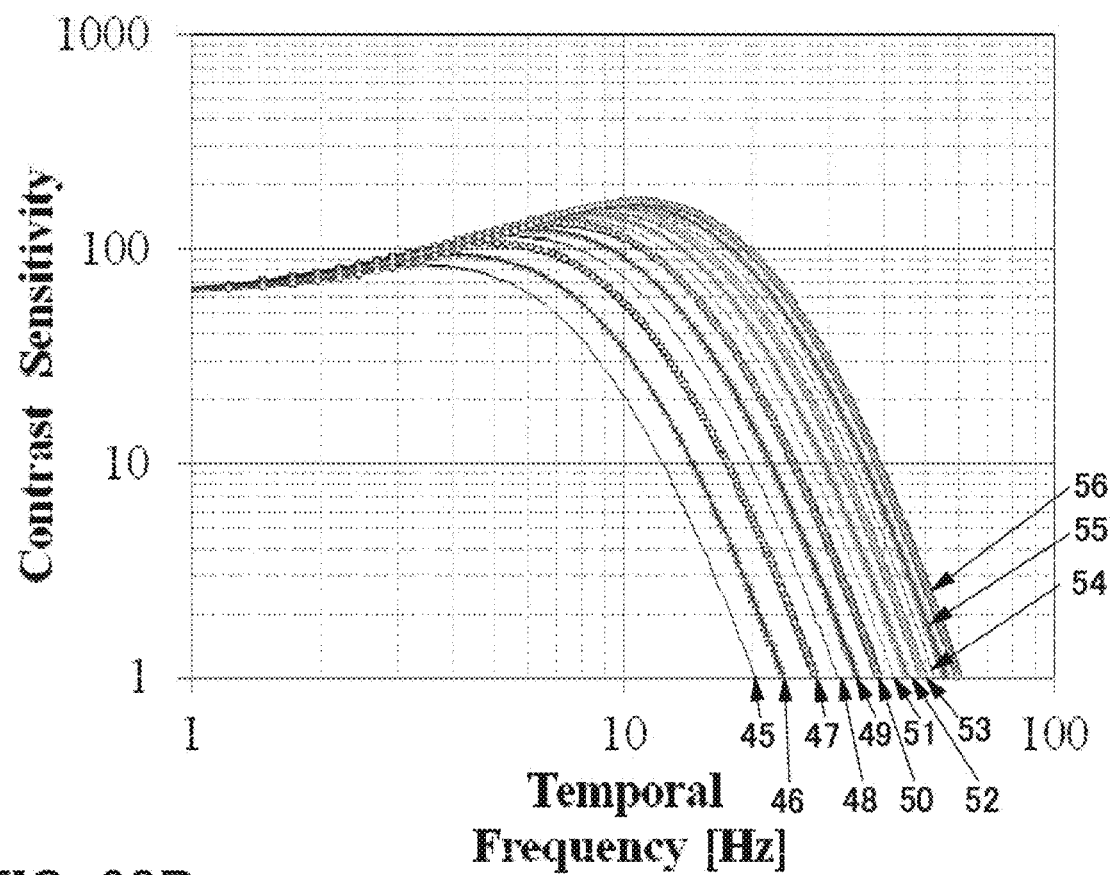
FIG. 38 A diagram illustrating relationship between contrast sensitivity and time frequency in Example.

The amount of change in luminance with which flickers are difficult to be perceived was calculated using Formula 2 shown in Embodiment 1. FIG. 38A shows the relationship between contrast sensitivity and temporal frequency when the luminance of an object having a size of 10 cm×10 cm was changed under observation from a distance of 30 cm. In FIG. 38A, a line 45 shows a case when the luminance of the observed object is 0.1 cd/m². A line 46 shows a case when the luminance of the observed object is 0.2 cd/m². A line 47 shows a case when the luminance of the observed object is 0.5 cd/m². A line 48 shows a case when the luminance of the observed object is 1 cd/m². A line 49 shows a case when the luminance of the observed object is 2 cd/m². A line 50 shows a case when the luminance of the observed object is 5 cd/m². A line 51 shows a case when the luminance of the observed object is 10 cd/m². A line 52 shows a case when the luminance of the observed object is 20 cd/m². A line 53 shows a case when the luminance of the observed object is 50 cd/m². A line 54 shows a case when the luminance of the observed object is 100 cd/m². A line 55 shows a case when the luminance of the observed object is 200 cd/m². A line 56 shows a case when the luminance of the observed object is 500 cd/m².

Formula 2, which represents the contrast sensitivity S(u, w), can be transformed to Formula 5. In other words, when the maximum luminance and the minimum luminance of the observed object are denoted as $L_{max}$ and $L_{min}$, respectively, the contrast sensitivity S(u,w) can be represented as Formula 5, which is an inverse of contrast.

[Formula 5]

$$S(u, w) = \frac{1}{CR} = \frac{L_{max} + L_{min}}{L_{max} - L_{min}} \quad (5)$$

The rightmost numerator of Formula 5 is the sum of $L_{max}$ and $L_{min}$ and thus is equal to twice an average $L_{ave}$ of $L_{max}$ and $L_{min}$. The rightmost denominator of Formula 5 is the difference between $L_{max}$ and $L_{min}$ and is represented as ΔL, so that Formula 5 can be transformed to Formula 6.

[Formula 6]

$$\frac{\Delta L}{L_{ave}} = \frac{2}{S(u, w)} \quad (6)$$

In the case of regarding them as spatial amounts, they are treated as the amount of in-plane luminance distribution of an observation object. In the case of regarding them as temporal amounts, they are treated as the amount of luminance distribution of an observation object per given period of time.

Figure 38B:
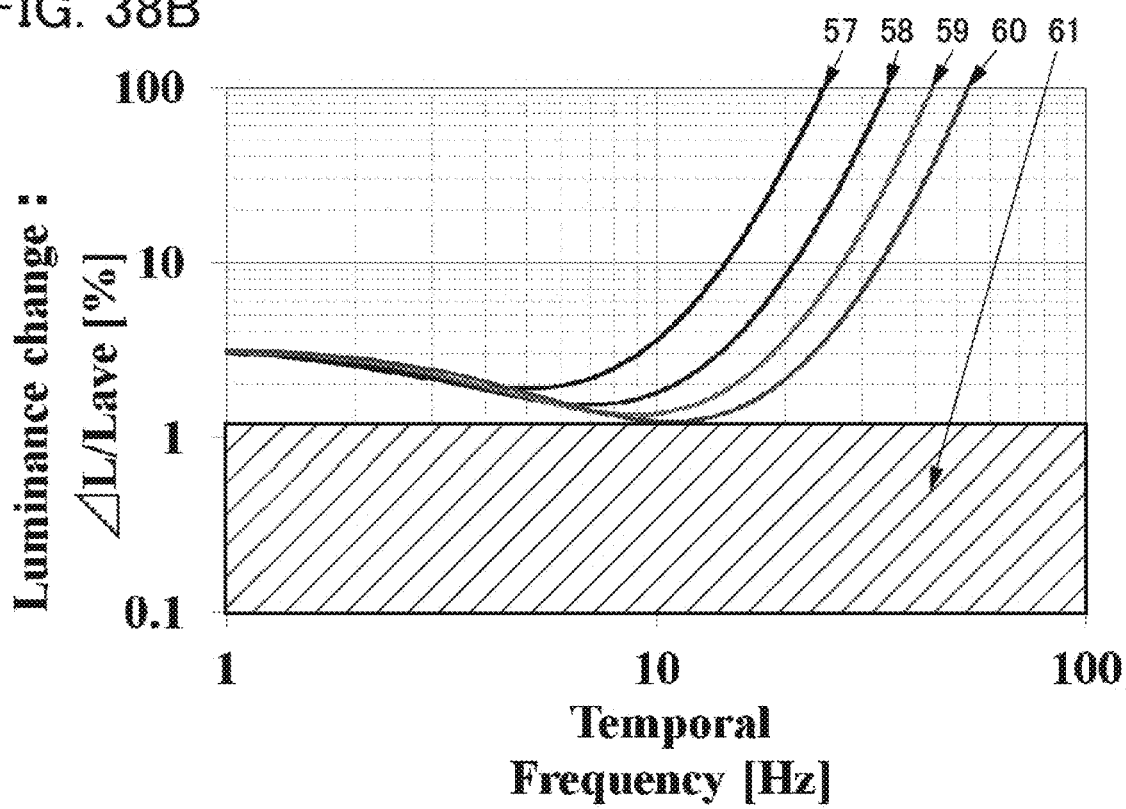

Flickers are regarded as the amount of temporal change in luminance. Formula 6 shows a value obtained by standardizing the amount of change in luminance in given period of time with an average luminance in the same period of time ("Luminance change"). FIG. 38B shows the relationship between the luminance change and frequency in which the vertical axis and the horizontal axis respectively show the value and temporal frequency ("Temporal Frequency").

In FIG. 38B, a line 57 shows a case where the luminance of the observation object is 0.5 cd/m². A line 58 shows a case where the luminance of the observation object is 5 cd/m². A line 59 shows a case where the luminance of the observation object is 50 cd/m². A line 60 shows a case where the luminance of the observation object is 500 cd/m².

A region 61 showing a luminance change smaller than the minimum value of the line 60, 1.22%, is a region where luminance change is difficult to be perceived as flickers.

From the results, the amount of luminance change difficult to be perceived as flickers was estimated as 1.22%. When this amount of luminance change was converted into the amount of voltage change, it was found that this change was within 10 mV and was determined as an allowable amount of voltage change.

In order to obtain a liquid crystal material which falls within the allowable amount of voltage change, the amount of dipole moment of a liquid crystal molecule was focused. A molecule structure with small dipole moment in a predetermined range was obtained using calculation software and a calculation method shown in Table 1.

TABLE 1

| Software | Gaussian09 |
|---|---|
| Simulation method | DFT |
| Functional | B3LYP |
| Basis function | 6-311G(d, p) |

The material obtained by calculation was synthesized and the resistivity of the material was obtained. For the measurement of resistivity, the material was mixed with a mother liquid crystal MLC-7030 (Merck ltd. Made in Japan). The mixing ratio was determined so that the proportion of the synthesized liquid crystal material was 20 wt % of the total.

The relationship between the dipole moment of the synthesized liquid crystal material which was obtained by calculation and the resistivity of the mixture with the mother liquid crystal was shown in FIG. 1 according to synthesized liquid crystal material.

It was found that a dipole moment of 3 debye or less was effective to obtain a resistivity of $1.0 \times 10^{14}$ (Ω·cm) or higher.

Liquid crystal mixtures ("improved materials") were obtained only using a plurality of materials having a dipole moment of 3 debye or less. The dipole moment of molecules contained in the plurality of materials are 0.05 to 2.18. These materials are mixed to obtain the improved materials. Table 2 shows the dielectric anisotropy, refractive index anisotropy, phase transition temperature from a liquid crystal phase (nematic phase) to an isotropic phase, and resistivity of each of the improved material and the conventional material.

TABLE 2

| | Improved material | Conventional material |
|---|---|---|
| Dielectric anisotropy | 2.2 | 5.3 |
| Refractive index anisotropy | 0.1 | 0.1 |
| Phase transition temperature [° C.] | 94 | 92.6 |
| Resistivity [Ωcm] | $7.1 \times 10^{14}$ | $6.5 \times 10^{13}$ |

Note that the point 302 and the point 304 in FIG. 1 respectively show a value of a constituent of the improved material obtained when a material before purification was added to the mother liquid crystal and a value thereof obtained when a material after purification was added to the mother liquid crystal. The resistivity of the point 304 is higher than that of the point 302, which demonstrated the effect of purification.

Figure 46:
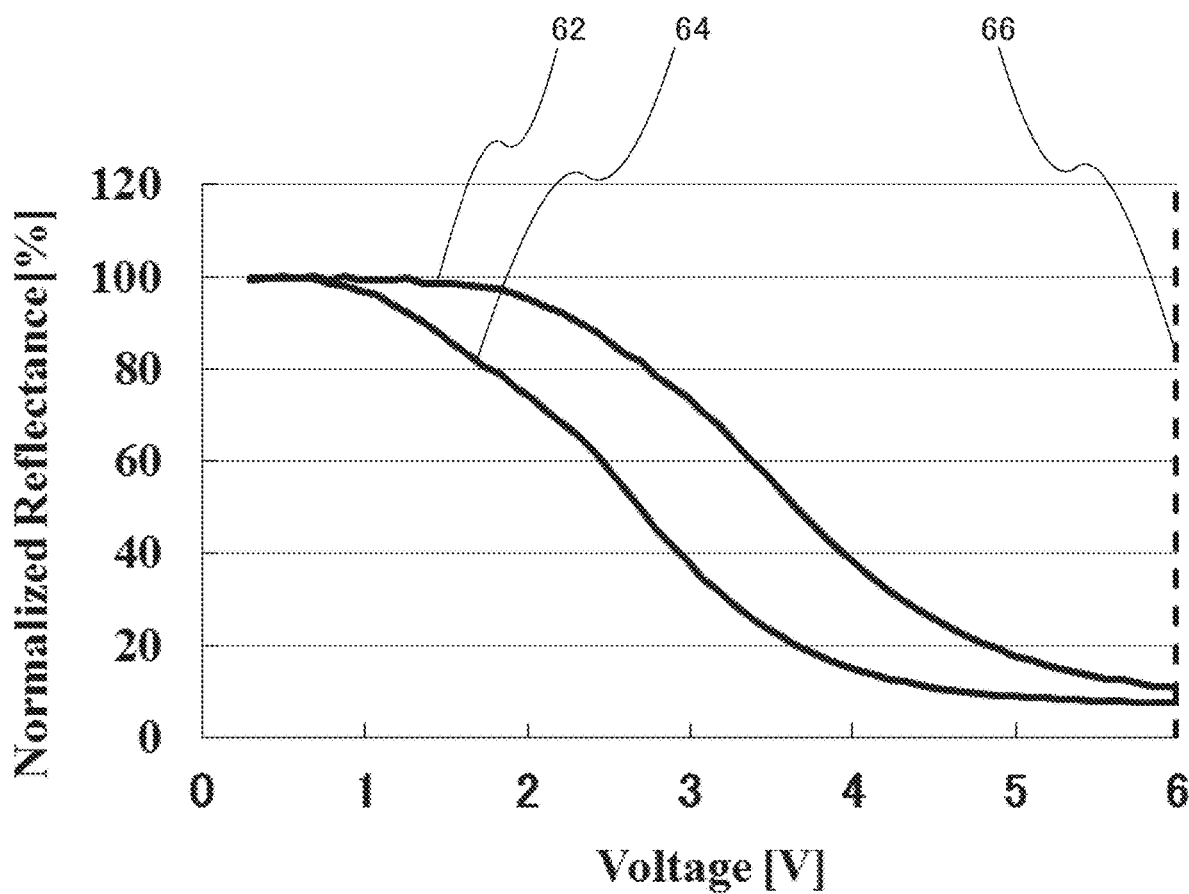
FIG. 46 A graph showing electro-optical characteristics of a display device in Example.

FIG. 46 shows characteristics of reflectance ("Normalized Reflectance")-voltage ("Voltage") of liquid crystal elements in which the improved material or the conventional material is used in the liquid crystal layer. A line 62 shows the characteristics of the improved material. A line 64 shows the characteristic of the conventional material. The dielectric anisotropy of the improved material was reduced. In an intermediate gray-level region, the characteristics of the improved material shifted to the high-voltage side by around 1 V as compared to the conventional material. However, the level of the reflectance when a voltage of 6 V was applied for performing black display (a dotted line 66) can get close to the conventional material, and was not changed enough to adversely affect the image display.

FIG. 2 shows change over time of the voltage holding ratio (VHR: Voltage Holding Ratio). The voltage holding ratio was obtained as an area ratio of a voltage of 3 V applied to electrodes between which a liquid crystal layer is sandwiched for a period of 16.6 ms to a voltage held after the electrodes are open-circuited.

From the graph shown in FIG. 2, the voltage holding ratio after 30 seconds of the conventional material (a line 31 in FIG. 2) was 98.0%, whereas the voltage holding ratio after 30 seconds of the improved material (a line 32 in FIG. 2) was 98.8%.

Next, residual DC characteristics of each of the improved material and the conventional material were measured. FIG. 5 is a graph showing the residual DC characteristics of each of the improved material as an example of the liquid crystal layer whose molecule has a dipole moment of greater than or equal to 0 debye and less than or equal to 3 debye and the conventional material as a comparative example.

In the measurement of the residual DC shown in FIG. 5, a voltage of 3 V is applied between the electrodes between which the liquid crystal layer is sandwiched for 10 seconds or 30 seconds, and then the electrodes are short-circuited for one second, and then the electrodes are open-circuited. FIG. 5 shows time-dependent change in voltage in this state. Note that the horizontal axis and the vertical axis in FIG. 5 represent time and voltage, respectively.

According to the graph shown in FIG. 5, the residual DC voltage of the line 33 and the line 34 which show the characteristics of the improved materials are lower than that of the line 35 and the line 36 which show the characteristics of the conventional materials. In addition, the value of the residual DC of the improved material was 10 mV or less in the case where a voltage of 3 V was applied for 10 seconds, and then, the electrodes are short-circuited for one second and are open-circuited for 10 minutes. The value of the residual DC thereof was 10 mV or less in the case where a voltage of 3 V was applied for 30 seconds, and then, the electrodes are short-circuited for one second and are open-circuited for 30 seconds. These values of the residual DC were demonstrated to fall within a range of the amount of voltage change that corresponds to the amount of luminance change difficult to be perceived as flickers.

If the open-circuited time is longer than 30 seconds, the amount of the residual DC in the improved material is increased to be 15 mV at the maximum. Flickers are less likely to be perceived when the improved material was used because the residual DC is smaller than that of the conventional material. More desirably, however, the open-circuited time is within 30 seconds even in the improved material so that the residual DC does not exceed 10 mV. When converted into frame frequency, 1/30 Hz or more is more desirable.

The structure described in this example can be combined as appropriate with any of the structures described in the embodiments and the other examples.

EXAMPLE 2

<<Measurement of Gray-level Deviation in Active Panel>>

In this example, a display device of one embodiment of the present invention was manufactured and evaluated.

The display devices of this example were active matrix reflective monochrome displays. For backplane-side FETs in the display devices fabricated in this example, CAAC-IGZO was used.

First, specifications of the display device fabricated in this example are shown in Table 3.

TABLE 3

| Display Type | Reflective |
| --- | --- |
| Screen Diagonal | 6.05 inch |
| Resolution | 768 (H) × 1024 (V) |
| Pixel Pitch | 120 μm (H) × 40 μm (V) |
| Pixel Density | 212 ppi |
| Source Driver | Analog Switch Integrated |
| Scan Driver | Integrated |
| Liquid Crystal Mode | Twisted-ECB Mode |
| Frame Frequency | Still Image: 1/60 Hz to 2 Hz |
| | Moving Image: 60 Hz |

The display devices fabricated in this example were active matrix reflective monochrome LCD. For backplane-side FETs in the display devices fabricated in this example, CAAC-IGZO was used.

In this example, two display devices with different liquid crystal materials were fabricated. For a first display device, the liquid crystal material, which was described in Example 1, obtained by mixing a plurality of materials whose molecules have dipole moments from 0.05 to 2.18 (hereinafter referred to as an improved material) was used in a liquid crystal layer. For a second display device, the conventional material was used as a liquid crystal material.

Figure 30:
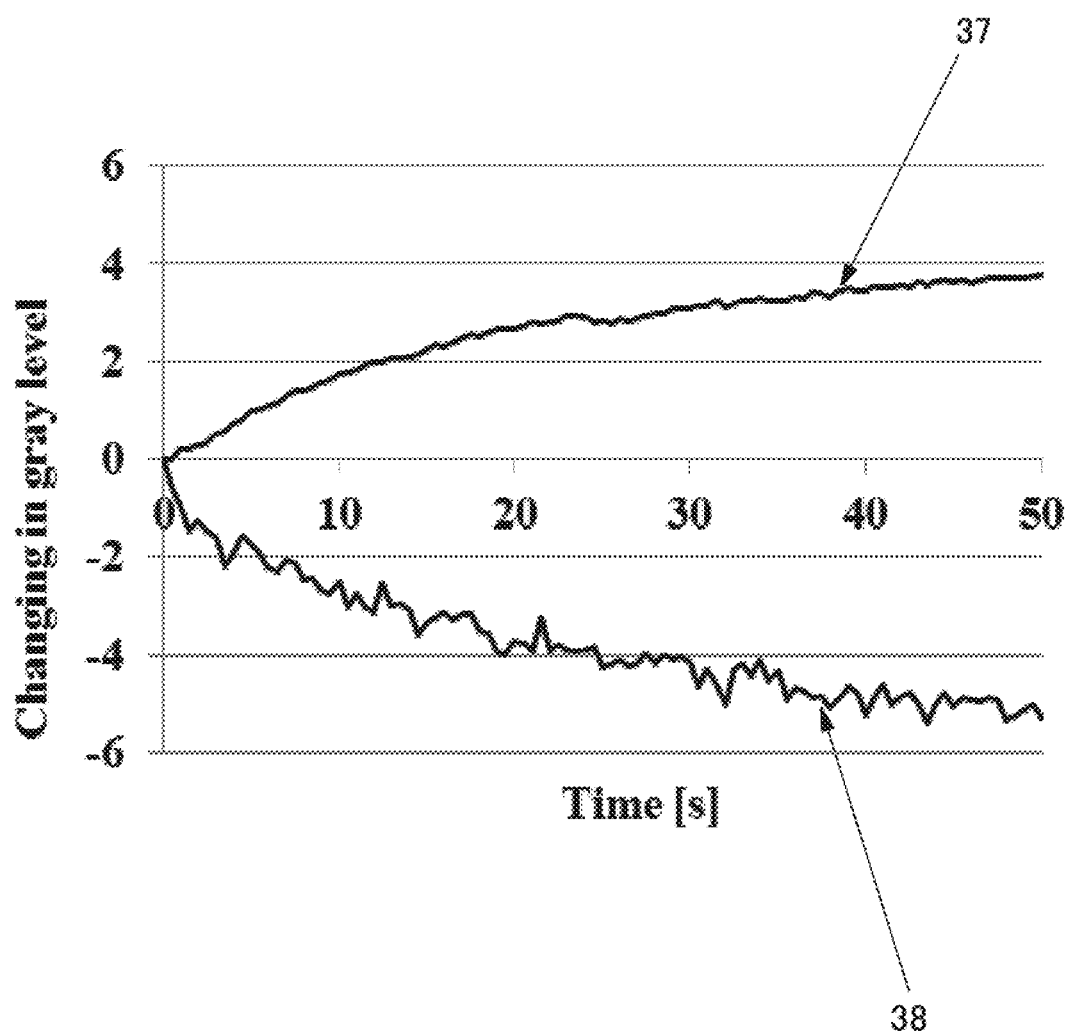
FIG. 30 A diagram showing changes in gray level in a halftone display.

FIG. 30 shows changes in grayscale during intermediate grayscale display of the above-described two kinds of display devices using the liquid crystal materials. Note that in FIG. 30, the horizontal axis and the vertical axis represent time (Time) and a change in intermediate grayscale (gray level) (Changing in gray level), respectively. In FIG. 30, a line 37 and a line 38 respectively show a temporal change in grayscale deviation of the improved material and a temporal change in grayscale deviation of the conventional material.

Note that the display device of this example was driven at a frame frequency of 0.017 Hz.

According to the results shown in FIG. 30, the change in gray level of the conventional material for one frame (here, for 50 s) is 5 levels, whereas the change in gray level of the improved material for one frame is 4 levels. That is, as compared to the conventional material, the change in grayscale of the improved material was reduced by 1 level. Therefore, it was demonstrated that the use of the improved material can suppress flickering on intermediate grayscale display.

EXAMPLE 3

<<Burn-in Examination for Active Panel>>

Next, burn-in on the two kinds of display devices fabricated was examined.

In the examination method, deviation in gray level in halftone display after white display (White→Half Tone) and deviation in gray level in halftone display after black display (Black→Half Tone) from the gray level in continuous halftone display (Half→Half Tone) were measured.

FIGS. 31A and 31B show changes in grayscale after white display or black display. Note that in FIGS. 31A and 31B, the horizontal axis and the vertical axis represent time elapsed since writing the halftone display (Time) and a change in intermediate grayscale (gray level) (Changing in gray level), respectively. In FIG. 31B, a line 39 shows a deviation in gray level in halftone display of the conventional material after black display, a line 40 shows a deviation in gray level in a continuous halftone display of the conventional material, and a line 41 shows a deviation in gray level in halftone display of the conventional material after white display. In FIG. 31A, a line 42 shows a deviation in gray level in halftone display of the improved material after white display, a line 43 shows a deviation in gray level in a continuous halftone display of the improved material, and a line 44 shows a deviation in gray level in halftone display of the improved material after black display.

Figure 31:
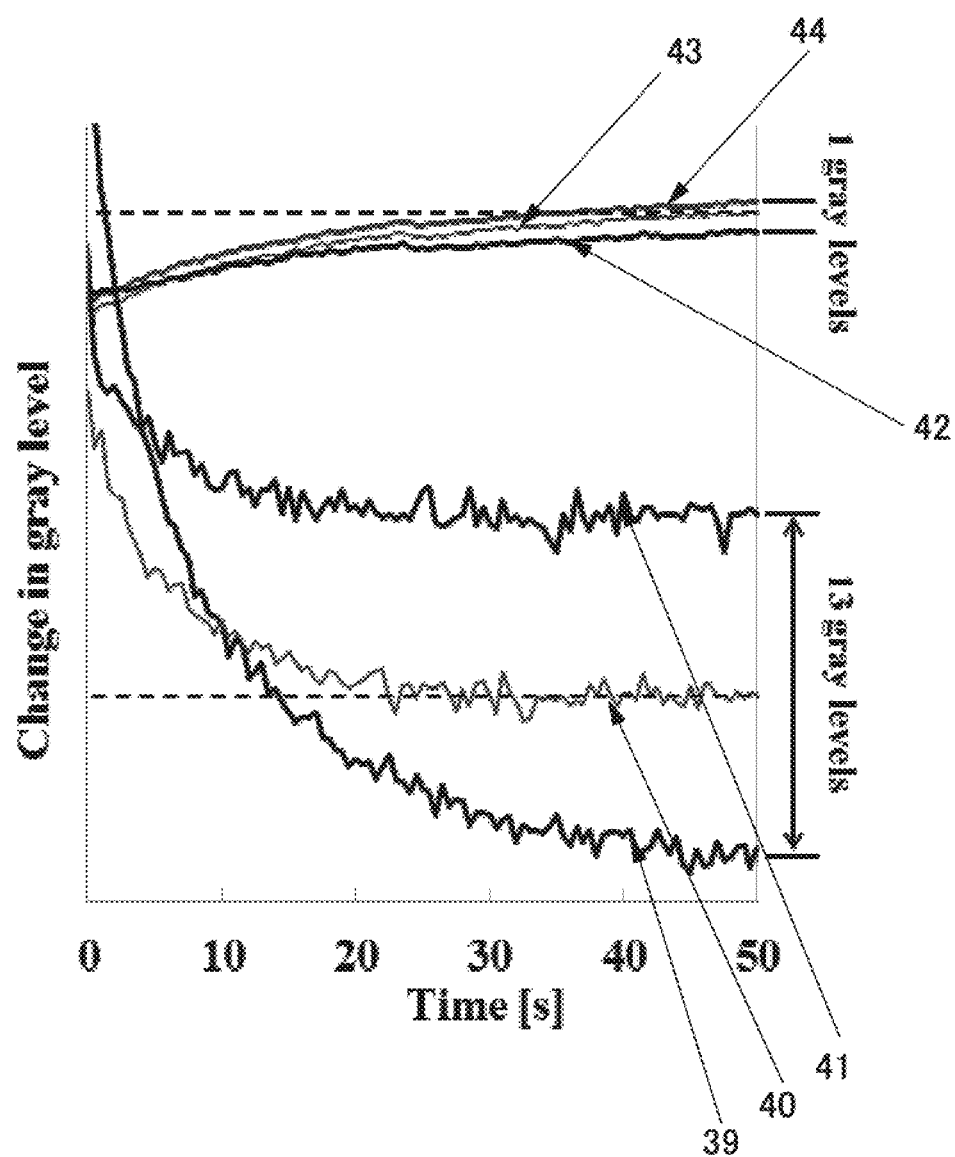
FIG. 31 A diagram showing changes in gray level after white display or black display.
Figure 32:
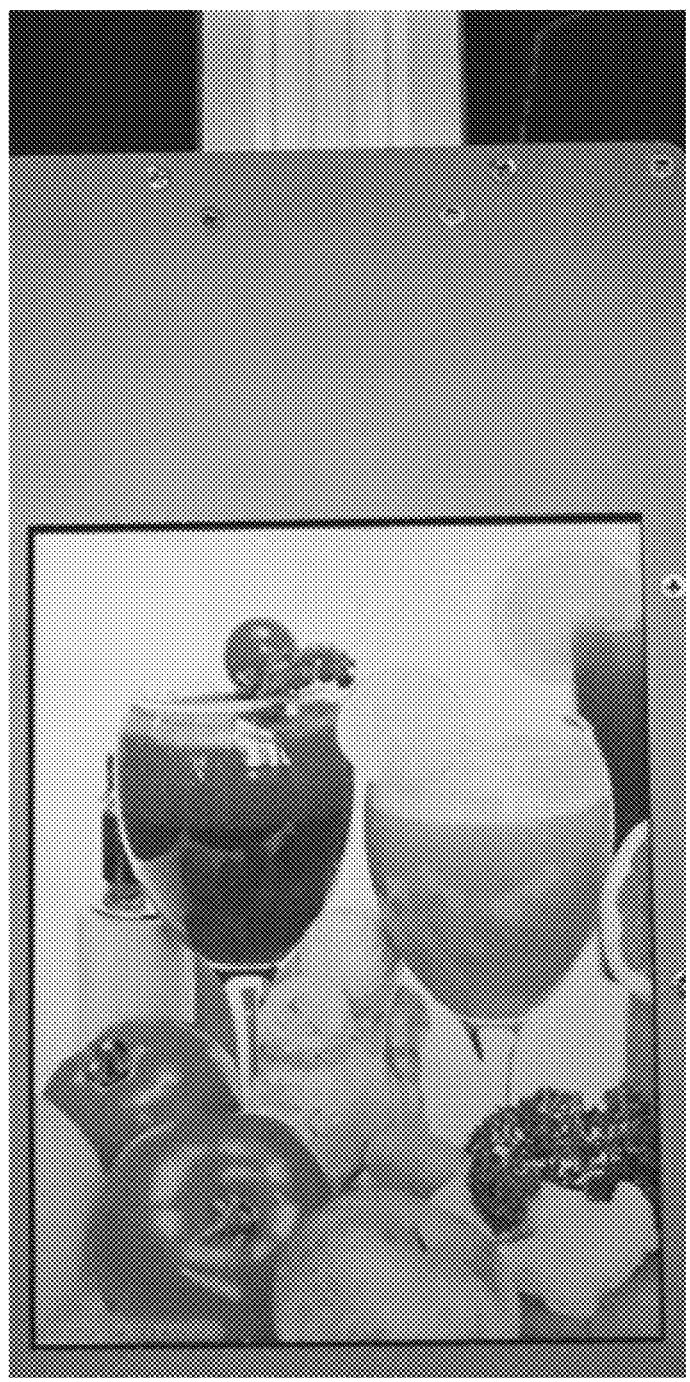
FIG. 32 A diagram showing a display example of a display device in Example.

According to the results shown in FIG. 31, the conventional material had 7-gray-level deviation between White-→Half Tone display and Black→Half Tone display. The improved material had 1.1-gray-level deviation between White→Half Tone display and Black→Half Tone display. Therefore, it was able to be demonstrated that the use of the improved material can suppress deviation in gray level. FIG. 32 shows a display example of the display device manufactured in this example. The improved material was used as a liquid crystal material. As shown in FIG. 32, excellent display was able to be obtained without practical problems.

The structure described in this example can be combined as appropriate with any of the structures described in the embodiments and the other examples.

EXAMPLE 4

<<Pixel Arrangement Comparison>>

In this example, two types of pixel arrangement methods, vertical stripe and horizontal stripe, were compared and evaluated. A display device was fabricated in consideration of the results. One embodiment of the display device manufactured in this EXAMPLE is described below.

FIG. 33A is a schematic view of a pixel region. FIG. 33A is a case where the short side of a window portion of a pixel is parallel to a signal line. FIG. 33B is a case where the long side of a window portion of a pixel is parallel to a signal line, which is shown for comparison purposes.

FIGS. 34A and 34B and FIGS. 35A and 35B show examination results of alignment state of liquid crystals in an arrangement method of pixels, signal lines, and scan lines using a liquid crystal alignment simulator (LCD Master made by SHINTECH, Inc.). Table 4 shows simulation conditions.

TABLE 4

| Calculation conditions | FEM | Base distance | 1 μm |
|---|---|---|---|
| Operation mode | Twisted ECB | amplitude | 2 |

In view of power consumption of a liquid crystal element, a normally-white operation mode is effective and a liquid crystal element in a Twisted ECB mode is employed.

Figure 34A:
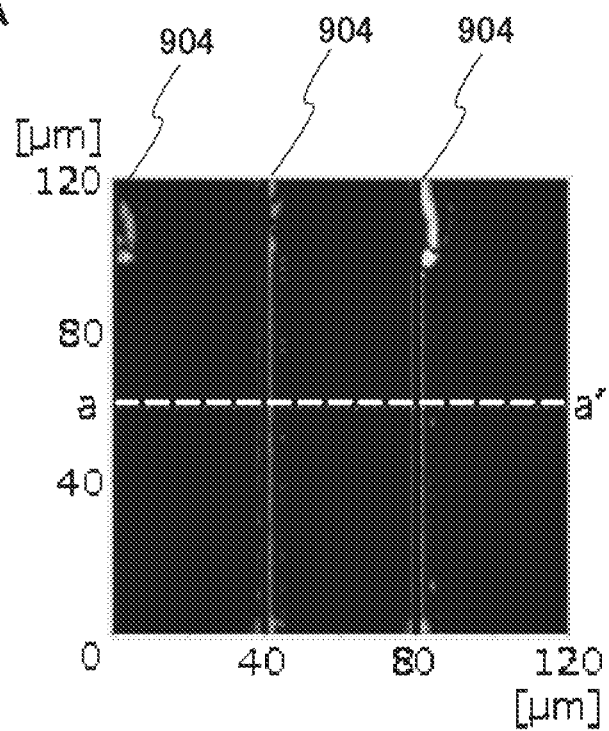
FIG. 34 A diagram illustrating simulation of liquid crystal alignment.
Figure 34B:
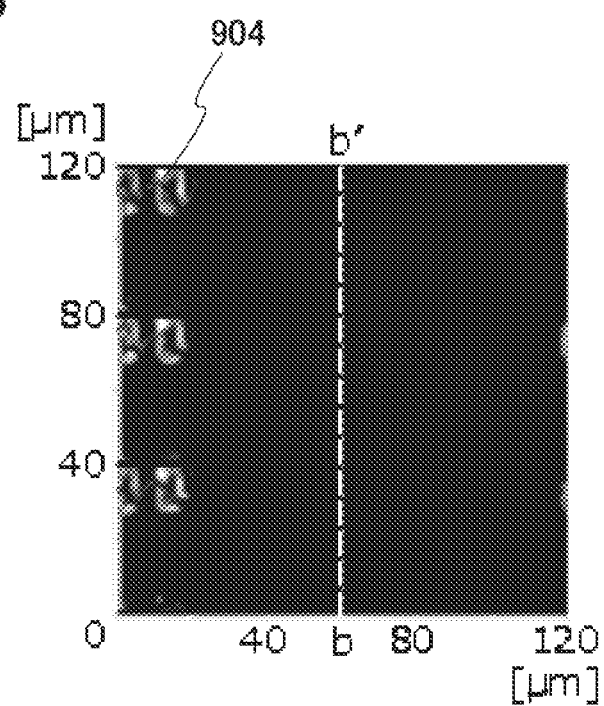

FIGS. 35A and 35B are simulation results of the alignment state of liquid crystal molecules in cross sections of regions indicated by dotted lines a-a' and b-b' in FIGS. 34A and 34B. From FIG. 34A showing the vertical stripe pixel arrangement, leakage of light 904 occur at pixel edges. Electric field is applied in a perpendicular direction to the liquid crystal layer, and most of liquid crystal molecules 905 are aligned in this direction. However, from the results of FIG. 35A, horizontal electric field is generated between pixel electrodes 906, so that liquid crystal molecules exist in this region are influenced by the horizontal electric field to be aligned horizontally to the substrate. The liquid crystal molecules in the region 907 surrounded by the dotted line in FIG. 35A are aligned horizontally, which is a cause of the leakage of light.

In contrast, in the case of the horizontal stripe pixel arrangement in FIG. 34B, the leakage of light 904 is concentrated in a region of a pixel where a transistor is provided and does not occur around the signal line.

In addition, horizontal electric field is not generated between pixel electrodes in the case of the horizontal stripe pixel arrangement. Thus, the liquid crystal molecules in the region 907 are expected to keep the alignment before electric field is applied. In fact, as shown in FIG. 35B, the liquid crystal molecules in the region 907 follow the alignment of peripheral liquid crystal molecules and are aligned horizontally to the substrate.

Molecules between pixels are in vertical alignment by the interaction with the peripheral liquid crystal molecules at the time of voltage application. This can achieve a light-blocking state, that is, black display without the light-blocking layer BM between the pixel electrodes. The display device is fabricated using the horizontal stripe pixel arrangement in consideration of these results.

Table 5 shows specifications of the display device manufactured in this example.

TABLE 5

| | |
|---|---|
| Display type | Reflective |
| Screen diagonal | 6.05 inch |
| Resolution | 768 (H) × 1024 × RGB (V) |
| Pixel pitch | 120 μm (H) × 40 μm (V) |
| Pixel density | 212 ppi |
| Aperture Ratio | 82% |
| Scan driver | Integrated |
| Liquid crystal Mode | Twisted ECB mode |
| Frame frequency | Still Image: 1/60 Hz to 2 Hz |
| | Moving Image: 60 Hz |

As a liquid crystal material, the material, which was described in EXAMPLE 1, obtained by mixing a plurality of materials whose molecules have dipole moments from 0.05 to 2.18 (hereinafter referred to as an improved material) was used.

Figures 36A, 36B:
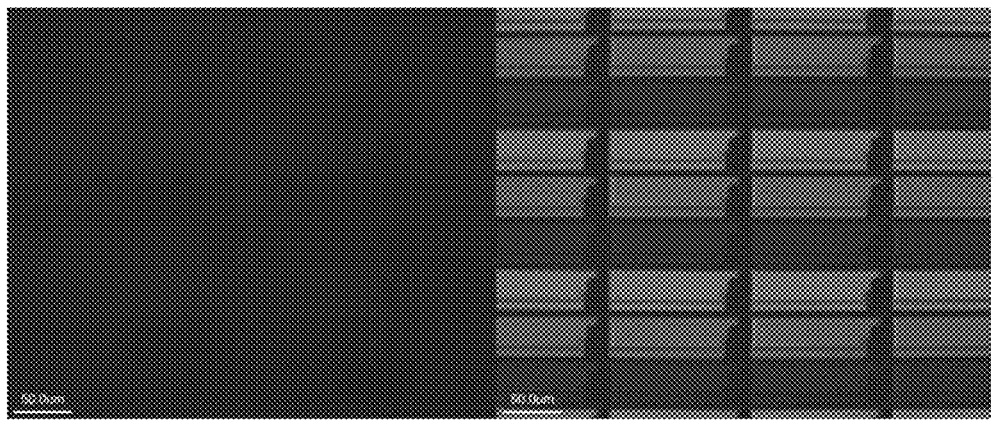
FIG. 36 A diagram illustrating a display example of a display device in Example.

FIG. 36 shows optical microscope observation results of the pixel portion of the display device. FIG. 36A shows the pixel portion when black display is performed. FIG. 36B shows the pixel portion when white display is performed. Although the light-blocking layer BM is provided only in a transistor region of the pixel, favorable display state can be obtained without no leakage of light.

FIG. 37 are display photographs of the display device. A high aperture ratio, 82%, is achieved by introduction of the above-mentioned effects. Moreover, the use of the improved material as a liquid crystal material achieved 1/60 Hz driving as a driving method for reducing refresh rate. Furthermore, a touch panel is incorporated for input/output.

The display device fabricated in this example was an active matrix reflective LCD color display. For backplane-side FETs in the display device fabricated in this example, CAAC-IGZO was used.

Table 6 shows off-state current (Ioff) characteristics of an FET on the backplane side and Ioff characteristics of a conventional Si FET for comparison purposes.

In Table 6, the amount of reduction in holding voltage of a pixel ΔV is represented as frame frequencies.

TABLE 6

| | | | ΔV [mV] | | |
|---|---|---|---|---|---|
| | Ioff [A/μm] | W/L | 60 Hz | 1 Hz | 0.2 Hz |
| LTPS | ~5 × $10^{-14}$ | 0.3 | 2.5 | 150 | 750 |
| a-Si | ~$10^{-15}$ | 5 | 1 | 50 | 250 |
| CAAC-OS | <$10^{-19}$ | 1 | 2 × $10^{-5}$ | $10^{-3}$ | 5 × $10^{-3}$ |

L = 3 μm

Among the transistors shown in Table 6, a transistor including an CAAC-OS was used as a pixel FET and had a size of W (channel width)/L (channel length)=3 μm/3 μm. Table 6 indicates that the transistor has an extremely Ioff. This low Ioff enables IDS driving (idling stop driving: driving in which data writing is performed, and then data rewriting is stopped) for still image display.

In addition, owing to the low Ioff, the amount of reduction in holding voltage ΔV is as small as about 5×$10^{-3}$ V even at a frame frequency as low as 0.2 Hz; thus, low power consumption driving was achieved.

Figure 37A:
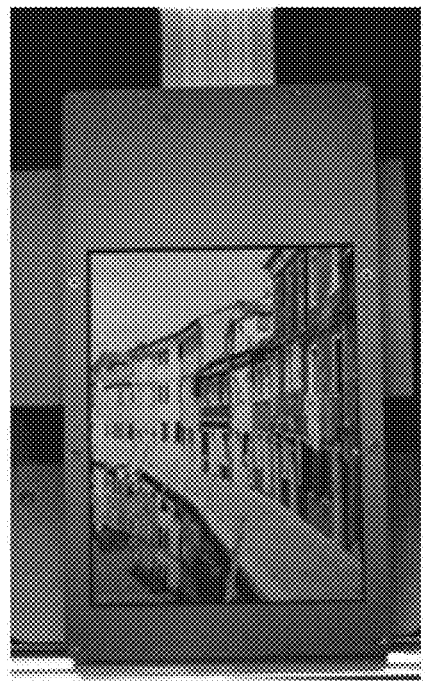
FIG. 37 A diagram illustrating a display example of a display device in Example.
Figure 37B:
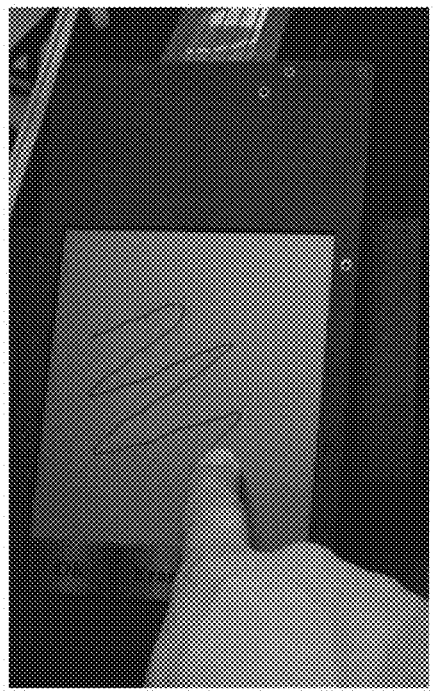

The display device was fabricated in combination with an input means, and thus was able to be used as an input/output device. Display examples of the input/output device are shown in FIGS. 37A and 37B.

The structure described in this example can be combined as appropriate with any of the structures described in the embodiments and the other examples.

EXAMPLE 5

<<Comparison Between States of Occurrence of Flickers>>

In this example, comparison results between states of occurrence of flickers in the display device are shown.

Figure 44:
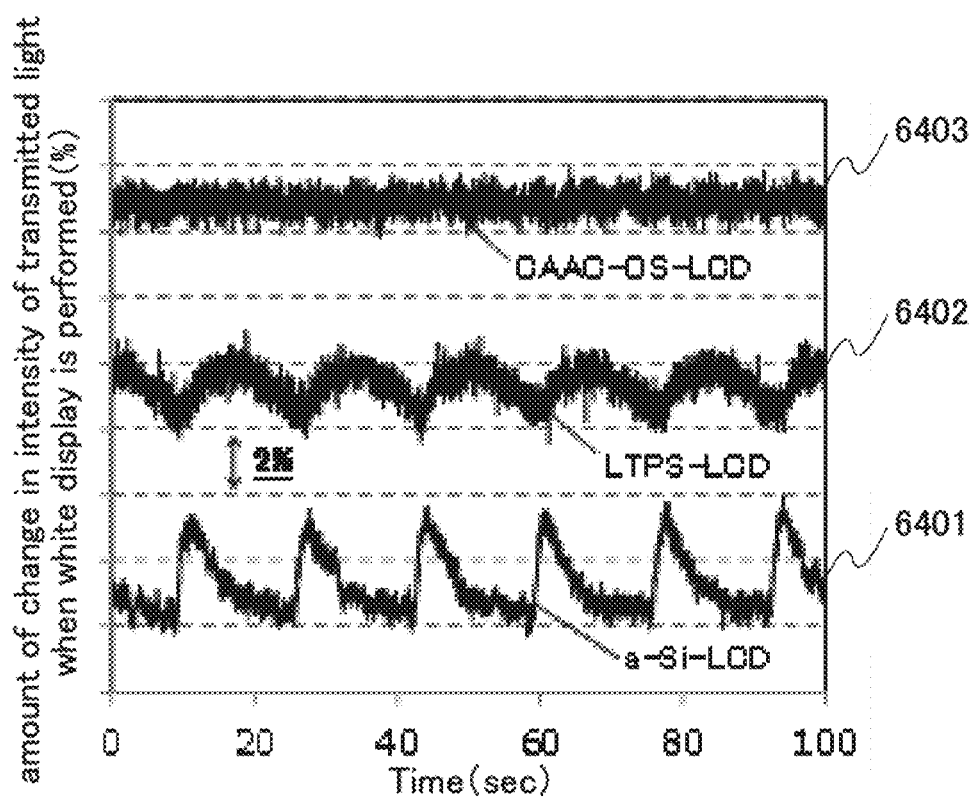
FIG. 44 A diagram showing occurrence of flickers.

FIG. 44 shows examination results of the amount of change of flickers in a general amorphous Si liquid crystal display (a-Si LCD), a low-temperature polysilicon (LTPS) LCD, and a CAAC-OS LCD panel which is one embodiment of the present invention. In FIG. 44, the vertical axis and the horizontal axis respectively represent the amount of change in intensity of transmitted light and time.

The line 6401 indicating the amount of change in intensity of transmitted light of the a-Si LCD panel and the line 6402 indicating the amount of change in intensity of transmitted light of the LTPS LCD panel each show, even in 60 Hz driving, a waveform showing the occurrence of flickers and containing a vibration component for 16 ms period. In contrast, the line 6403 indicating the amount of change in intensity of transmitted light of the CAAC-OS LCD panel does not show such a waveform containing a vibration component for 16 ms period like the line 6401 and the line 6402, which demonstrated that the flickering was suppressed.

The structure described in this example can be combined as appropriate with any of the structures described in the embodiments and the other examples.

EXAMPLE 6

<<Evaluation in Resolution of Display Surface>>

Figure 41A:
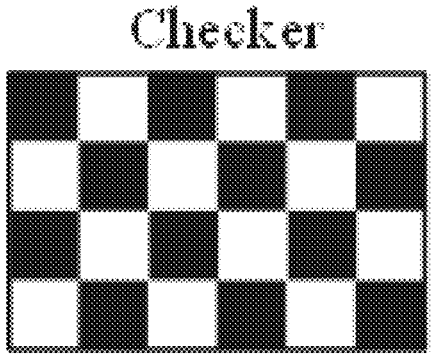
FIG. 41 A diagram showing test pattern for resolution evaluation in Example.
Figure 41B:
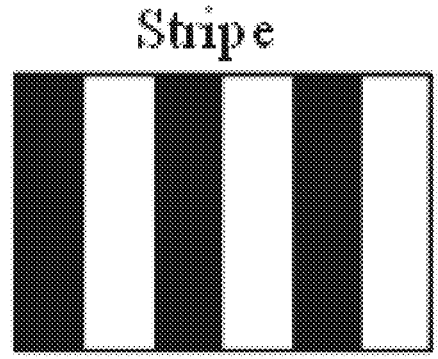

In this example, evaluation in optimum resolution for a display surface of a display device or the like was carried out. As a method for schematically representing a case of recognizing a character, a figure, or the like, two kinds of test patterns shown in FIGS. 41A and 41B were used. These two test patterns were displayed with micro sizes to evaluate distances possible to be perceived. The distance between the display device and a test subject was from 0 cm to 45 cm in the evaluation since the distance is about 20 to 40 cm for general reading.

The evaluation in resolution was carried out using a panel and conditions shown in Table 7.

TABLE 7

| Panel | 2.78 inch 1058 ppi OLED Display |
|---|---|
| Luminance | 100 cd/m² |
| Test pattern | Checker, Stripe |
| Display resolution of test pattren | 1058 ppi, 529 pppi, 354 ppi, 265 ppi, 212 ppi |
| Test subject | 6 persons (with normal vision) |
| Test details | See the panel from the front in a bright place Measure the distance at which the test pattern can be distinguished |

Four conditions of 2 to 5 pixel periods were used as discrimination patterns in the evaluation. They are minimum patterns capable of being expressed by panels having resolutions corresponding to 1058 ppi, 529 ppi, 354 ppi, and 265 ppi.

Figure 42:
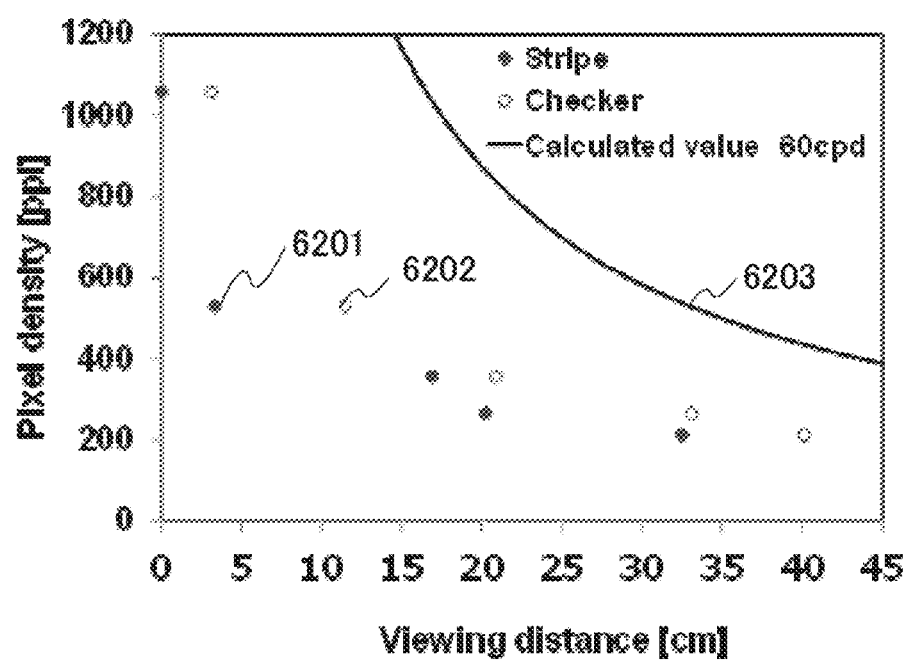
FIG. 42 A diagram showing results of resolution evaluation in Example.

When the evaluation, any of the discriminations pattern was displayed on the panel with a given resolution. FIG. 42 shows results of average distances at which the test subject distinguished the patterns of the panel gradually approached from a distance. In FIG. 42, the horizontal axis and the vertical axis respectively represent the distance between the display device and the test subject (Viewing distance) and resolution (Pixel Density). In FIG. 42, a point 6201 (black dot) and a point 6202 (white dot) respectively show evaluation results of the stripe pattern in FIG. 41B and the checker pattern in FIG. 41A.

FIG. 42 also, show a line 6203 indicating results of calculating human-distinguishable resolution for each viewing distance when the limit of human-distinguishable spatial frequency is 60 cpd (cycle per degree). According to the calculation, as the viewing distance is reduced, the pattern size per viewing angle is increased and thus the human-distinguishable resolution is also increased. In fact, however, a deviation from an ideal curve showed a tendency to increase which is influenced by difficulty in focusing at close range. From these results, the optimum resolution is about 400 ppi for achieving a low power consumption device capable of expressing characters distinguished without uncomfortable feeling in view of the reading distance is 20 to 40 cm and the power consumption.

The structure described in this example can be combined as appropriate with any of the structures described in the embodiments and the other examples.

EXAMPLE 7

In this example, display devices employing horizontal stripe were fabricated. The specifications of the display devices are a 212 ppi-6.05 inch reflective LCD and a 434 ppi-5.9 inch reflective. The specifications and characteristics of the fabricated panels are shown in Table 8.

TABLE 8

| Type | High aperture ratio | High resolution |
|---|---|---|
| Display type | Reflective | |
| Screen diagonal | 6.05 inch | 5.9 inch |
| Resolution | 768 (H) × 1024 × RGB (V) | 1536 (H) × 2048 × RGB (V) |
| Pixel pitch | 120 μm (H) × 40 μm (V) | 58.5 μm (H) × 19.5 μm (V) |
| Pixel density | 212 ppi | 434 ppi |
| Aperture Ratio | 82% | 68.80% |
| Scan driver | Integrated | |
| Liquid crystal Mode | Twisted ECB mode | |
| Frame frequency | Still Image: 1/60 Hz to 2 Hz Moving image: 60 Hz | |

Owing to the horizontal stripe, the 212 ppi- and the 434 ppi-display devices achieved high values of 82% and 68.8%, respectively. In addition, the frame frequency was able to be 1 Hz driving in the higher aperture ratio type, which achieved super-low power consumption. Note that the left half specifications of the display device in Table 8 are the same as the specifications of the display device in Table 5.

Figure 43:
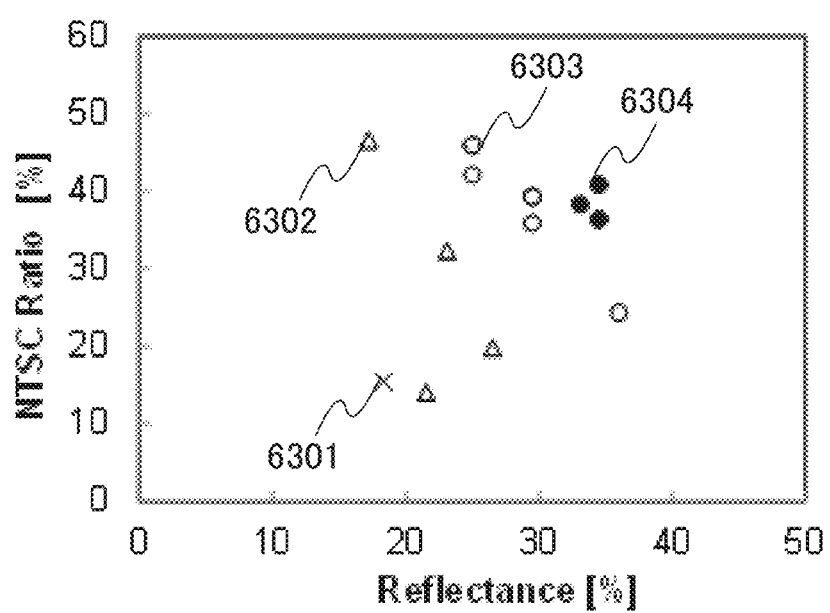
FIG. 43 A diagram showing optical characteristics of a display device in Example.

Moreover, introduction of a high reflectance electrode and optimization of a CF (color filter) were performed for the fabricated panel. FIG. 43 shows the introduction effects of the improvement items to the 212 ppi reflective LCD. The vertical axis and the horizontal axis in FIG. 43 show NTSC ratio (NTSC Ratio) and reflectance (Reflectance), respectively. In FIG. 43, a point 6301 ("x"), a point 6302 (white triangle), a point 6303 (white dot), and a point 6304 (black dot) respectively show characteristics of the display device before the improvement, a value after the CF optimization, a value after optimization of the reflective electrode, and characteristics after optimization of the driving method.

Table 9 shows optical characteristics of the fabricated reflective LCD.

TABLE 9

| Type | Reflectivity | NTSC ratio |
| --- | --- | --- |
| High resolution | 25.10% | 37% |
| High aperture ratio | 34.50% | 40.80% |

The reflectance was measured with a measurement apparatus in which incident light enters at an angle inclined by 30° from the normal direction of the display surface of the display device and the light reflected by the display device is set in the normal direction of the display surface of the display device. The reflectance is a value when the reflectance of a standard white plate is 100%.

The NTSC ratio is specified by National Television System Committee and an area ratio of a triangle obtained by connecting the dots on (x,y) chromaticity diagram for the three primary colors of red, blue, and green of a measurement object when the area of the triangle obtained by connecting the dots on (x,y) chromaticity diagram for the three primary colors of red, blue, and green is 100%.

Figure 47:
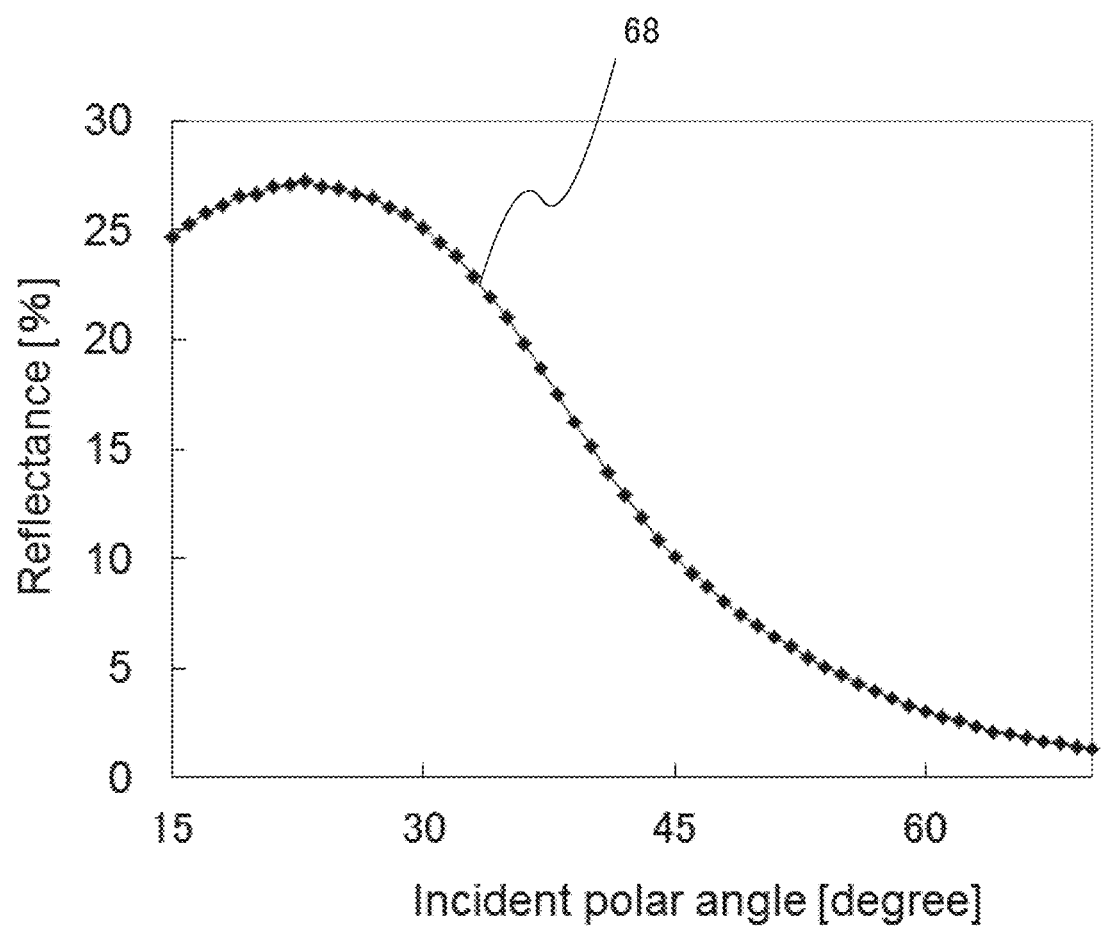
FIG. 47 A graph showing optical characteristics of a display device in Example.

In the 434 ppi-display device, the incident angle of incident light was shifted by 1° between 15° to 70° to measure the reflectance characteristics. A line 68 in FIG. 47 corresponds to the results.

Figure 48:
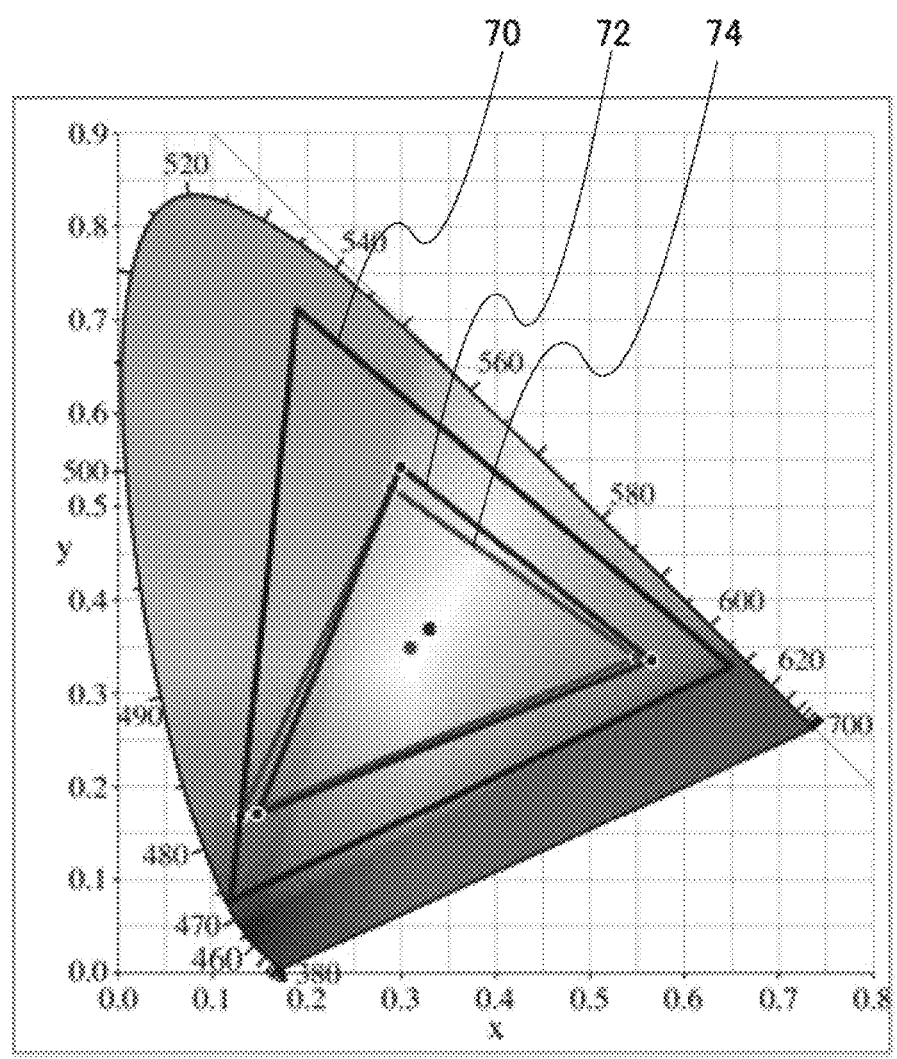
FIG. 48 A chromaticity diagram of a display image of a display device in Example.

FIG. 48 shows (x,y) chromaticity diagrams of the 212 ppi-panel and the 434 ppi-panel. A triangle 72 and a triangle 74 in FIG. 48 respectively correspond to the 212 ppi-panel and the 434 ppi-panel and are obtained by connecting three dots on the (x,y) chromaticity diagram when the three primary colors of red, blue, and green are displayed. For comparison purposes, a triangle 70 obtained by connecting dots of the three primary colors of red, blue, and green on the (x,y) chromaticity diagram specified by the above-mentioned NTSC is also shown.

Figure 45A:
FIG. 45 A diagram showing a display example of a display device in Example.
Figure 45B:
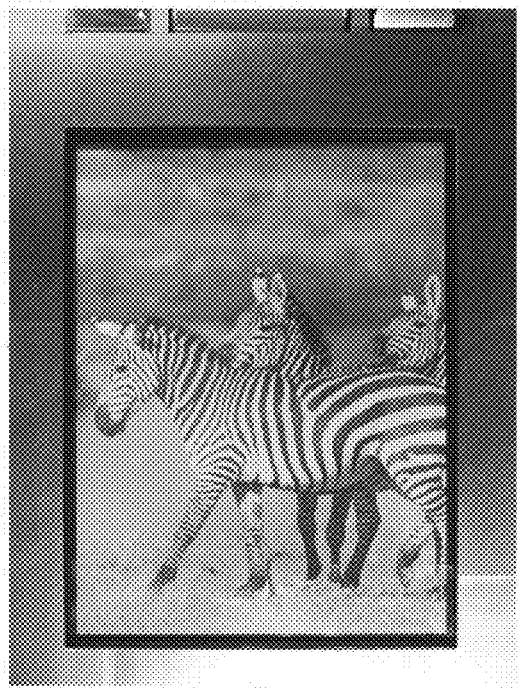
Figure 45C:

By the introduction of the improved effects, the high-resolution type achieved a high resolution of 434 ppi, a reflectance of 25%, and NTSC ratio of 37%. FIGS. 45A and 45B show the display photographs. For a purpose of the use as an electronic book, a memo function with a touch panel is also included (FIG. 45C).

In the fabrication of the display device in this example, like in the Embodiment 9 and Example 4, simulation was performed using a liquid crystal alignment simulator (LCD Master made by SHINTECH, Inc.) on leakage of light that might occur around the pixel. The pixel arrangements used in the simulation are shown in FIG. 49. The operation mode of liquid crystals is a twisted ECB (Twisted ECB) mode line in EXAMPLE 4.

Figure 49A:
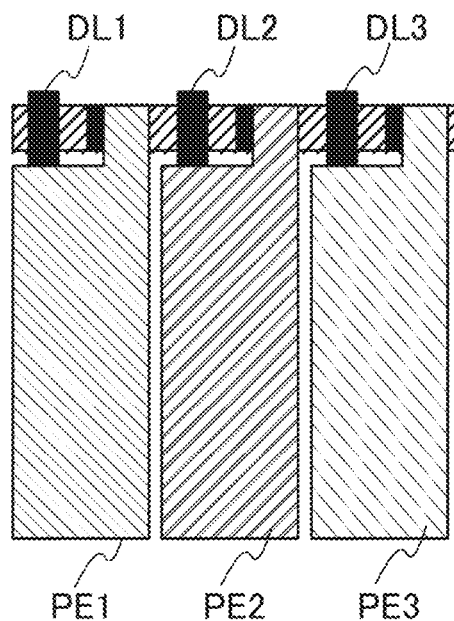
FIG. 49 A diagram showing pixel arrangement used in the liquid crystal simulation in Example.
Figure 49B:
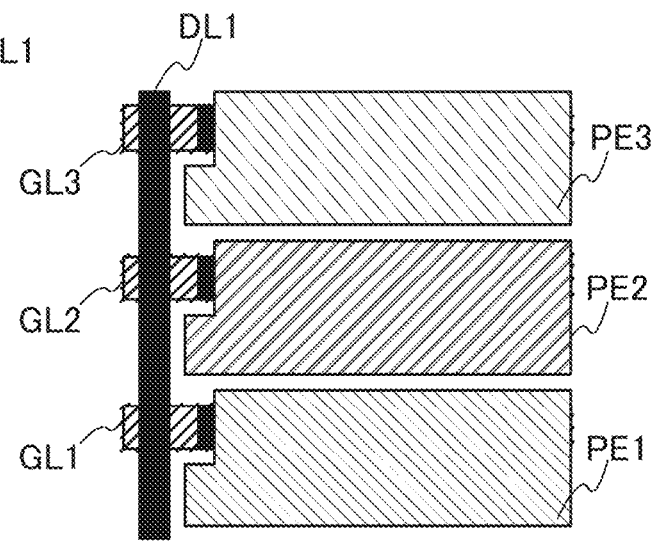

FIG. 49A is an example of the vertical stripe pixel arrangement (Vertical Stripe). FIG. 49B is an example of the horizontal stripe pixel arrangement (Horizontal Stripe). In FIG. 49A, the longer sides of the pixel electrodes PE1, PE2, and PE3 are parallel to the signal lines DL1, DL2, and DL3, and the scan line GL1 is also included. In FIG. 49B, the longer sides of the pixel electrodes PE1, PE2, and PE3 are parallel to the scan lines GL1, GL2, and GL3, and the signal line DL1 is included.

Table 10 shows voltage setting values of the pixel electrodes PE1, PE2, and PE3, the signal lines DL1, DL2, and DL3, and the scan line GL1 in the vertical stripe pixel arrangement. Table 10 also shows voltage setting values of the pixel electrodes PE1, PE2, and PE3, the scan lines GL1, GL2, and GL3, and the signal line DL1 in the horizontal stripe pixel arrangement. Note that the potential of a counter electrode (Counter Electrode) is 0 V in both of the vertical stripe pixel arrangement and the horizontal stripe pixel arrangement.

The simulation for both of the vertical stripe pixel arrangement and the horizontal stripe pixel arrangement were performed on the assumption that their driving methods were a source line inversion driving.

TABLE 10

| Analysis mode | | FEM (LCD Master 3D) |
| --- | --- | --- |
| Driving mode | | Twisted ECB |
| Pixel density | | 434 ppi |
| Base distance | | 0.5 μm |
| Magnification | | 2 |
| Boundary condition | | Periodic |
| Calculation mode (optical) | | reflectance |
| Polarization | | Right-handed circular |
| | (A) Vertical Stripe | (B) Horizontal Stripe |
| PE1 | 6 V | 6 V |
| PE2 | −6 V | 6 V |
| PE3 | 6 V | 6 V |
| GL1 | <−6 V | <−6 V |
| GL2 | — | <−6 V |
| GL3 | — | <−6 V |
| DL1 | 6 V | 6 V |
| DL2 | −6 V | — |
| DL3 | 6 V | — |
| Counter Electrode | 0 V | 0 V |

Figure 50A:
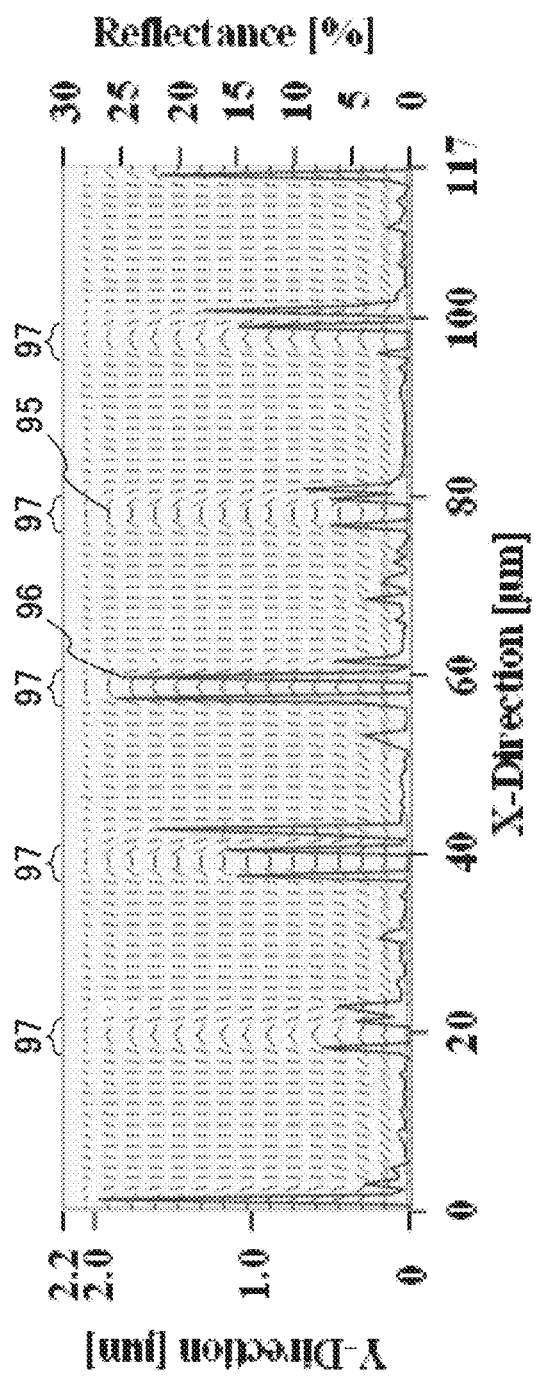
FIG. 50 A diagram showing simulation for liquid crystal alignment.
Figure 50B:
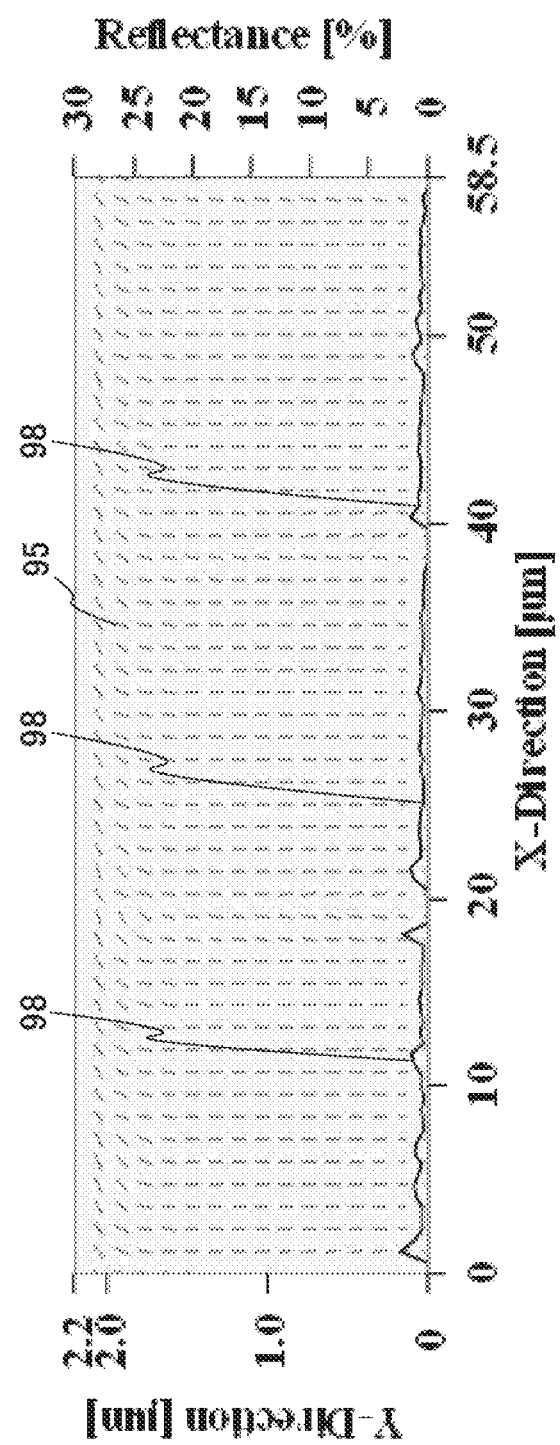

FIG. 50 shows the simulation results. FIG. 50A shows simulation results for the vertical stripe pixel arrangement. FIG. 50B shows simulation results for the horizontal stripe pixel arrangement. The vertical axis shows the reflectance (Reflectance). The horizontal axis shows position in a direction parallel to the scan line in the pixel region (X-Direction). Many fine lines distributed in FIGS. 50A and 50B are alignment vectors 95.

The line 96 indicating the reflectance in FIG. 50A is largely changed depending on position. There is a position where the reflectance reaches 25%. This is mainly because leakage of light in a boundary region 97 between pixels. Because of the source line inversion driving, voltage polarities of adjacent pixels are positive and negative and a potential difference is large. In addition, as the resolution of pixel is increased and the aperture ratio of pixel is increased, the distance between the pixels are reduced, so that the influence of an adjacent pixel from the periphery of a pixel into the inside of the pixel shows a tendency to increase. The inclination of the alignment vector 95 in the region 97 is difference from that in other regions, which shows the influence of the adjacent pixel.

When color display is performed in the vertical stripe pixel arrangement, adjacent pixels have different color phases. Thus, if the influence of the adjacent pixel is large, the independence of color phases in the pixels is decreased and thus the color purity and color reproducibility are decreased.

In contrast, in FIG. 50B, the amplitude of the line 98 showing the reflectance is substantially decreased; from 2 to 3% at most. The distance between a plurality of signal lines DL1 in the horizontal stripe pixel arrangement is larger than that in the vertical stripe pixel arrangement, and accordingly the influence of the adjacent pixel becomes small. The inclination of the alignment vector 95 is not changed so much, which reflects the effects.

In the case where color display is performed in the horizontal stripe pixel arrangement, adjacent pixels in the direction parallel to the scan line as in FIG. 51B can have the same color phase, and color filters having different color phases by the scan lines can be provided. Owing to this arrangement in which adjacent pixels have the same color phase, reduction in color purity can be suppressed even if the influence of the adjacent pixel is easily exerted due to the source line inversion driving. In contrast, the influence of the adjacent pixel is easily exerted in the vertical stripe pixel arrangement in FIG. 51A, and the independence of color phases is decreased. As a result, the color purity of a displayed image might be decreased.

The display device in this example was manufactured using the above examination results for reference. To examine whether the simulation tendency is practically observed, a prototype of the display device was manufactured.

Figure 52A:
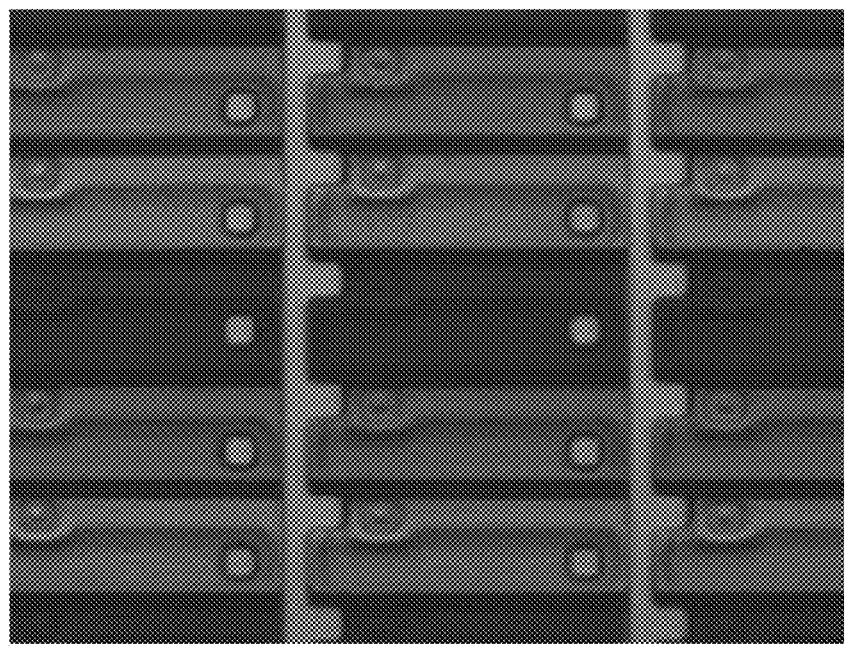
FIG. 52 A diagram showing a display example of a display device in Example.
Figure 52B:
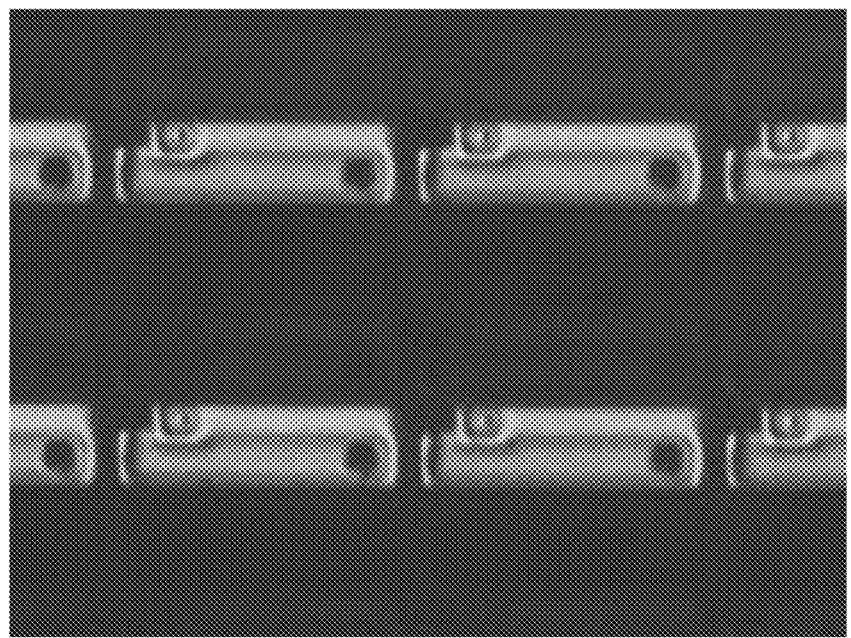

FIGS. 52A and 52B show microscopic observation results of a pixel region of the display device. FIG. 52A shows a state where pixels of red, green, and blue are arranged. FIG. 52B shows the pixel region of the display device displaying green color which is obtained by enlarged by a microscope. In the display device of this pixel arrangement, only green pixel is in a bright state. The red pixel and the blue pixel are in a dark state. It was demonstrated that owing to the horizontal stripe pixel arrangement, the aperture ratio was improved and moreover leakage of light around the pixels did not occur.

Figure 53:
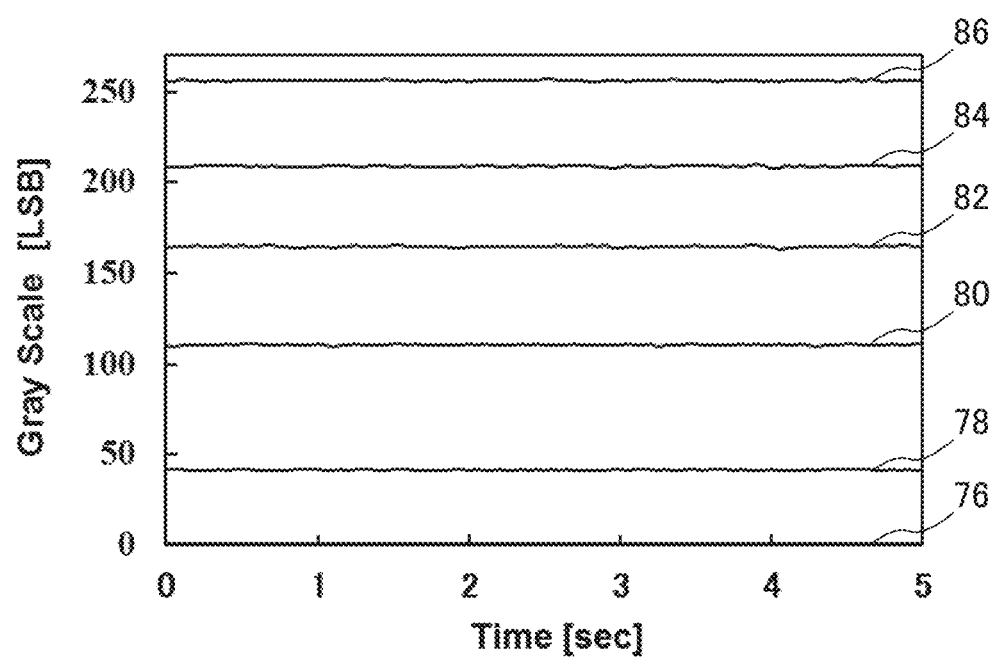
FIG. 53 A graph showing optical characteristics of a display device in Example.

FIG. 53 shows measurement results of temporal change in luminance when the display device shown in this example performs halftone display in the second mode in Embodiment 3 at a frame frequency of 1 Hz. The vertical axis represents brightness of halftone gray scale when the half tone for the display device is divided into 256 levels between brightness and darkness. The horizontal axis represents elapsed time. The halftone gray scales are divided into 6 types: 0/255, 41/255, 110/255, 165/255, 208/255, and 255/255 represented by a line 76, a line 78, a line 80, a line 82, a line 84, and a line 86, respectively.

In any of the halftone gray scales, change in luminance over time is small, and thus, it was shown that change in luminance can be suppressed in spite of frame switching every second.

Figure 54:
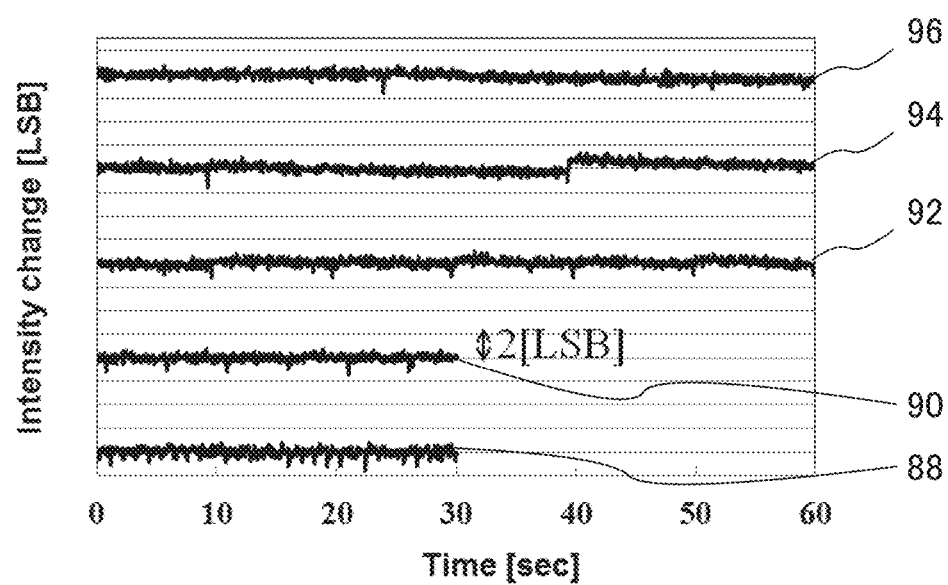
FIG. 54 A graph showing optical characteristics of a display device in Example.

In addition, FIG. 54 shows measurement results of temporal change in luminance when the display device performs halftone display at each frequency in the case where the frame frequency in the second mode in Embodiment 3 is 1 Hz or less. The frame frequencies and measurement results are shown: results at 1 Hz, ⅕ Hz, 1/10 Hz, 1/30 Hz, and 1/60 Hz are shown by lines 88, 90, 92, 94, and 96, respectively. Note that the lines 88, 90, 92, 94, and 96 are position-shifted in FIG. 54 for easy comparison, and the absolute value of each luminance does not differ as shown.

The minimum level of halftone stages is 1 LSB (Least Significant Bit)=1/256. Scales 99 having 2 LSB intervals are shown in FIG. 54. As shown in FIG. 54, even when the frame frequency becomes 1 Hz or less, in other words, a 1 frame period is longer than 1 second and becomes 1 minute which is the maximum, change in luminance is suppressed about 2 LSB.

The structure described in this example can be combined as appropriate with any of the structures described in the embodiments and the other examples.

REFERENCE NUMERALS 11 electrode
12 electrode
13 alignment film
14 alignment film
15 liquid crystal molecule
21 polarizing plate
22 polarizing plate
23 light detector
24 arrow
25 arrow
31 line
32 line
33 line
34 line
35 line
36 line
37 line
38 line
39 line
40 line
41 line
42 line
43 line
44 line
45 line
46 line
47 line
48 line
49 line
50 line
51 line
52 line
53 line
54 line
55 line
56 line
57 line
58 line
59 line
60 line
61 region
62 line
64 line
66 dotted line
68 line
70 triangle
72 triangle
74 triangle
76 line
78 line
80 line
82 line
84 line
86 line
88 line
90 line
92 line
94 line
95 alignment vector
96 line
97 region
98 line
99 scale
100 transistor
101 substrate
102 gate electrode
103 insulating layer
104 oxide semiconductor layer
104a channel region 104b n-type region
104c n-type region
105a electrode
105b electrode
106 insulating layer
107 insulating layer
110 transistor
114 oxide semiconductor layer
114a oxide semiconductor layer
114b oxide semiconductor layer
120 transistor
124 oxide semiconductor layer
124a oxide semiconductor layer
124b oxide semiconductor layer
124c oxide semiconductor layer
150 transistor
151 insulating layer
152 insulating layer
154 insulating layer
156 insulating layer
160 transistor
164 oxide semiconductor layer
164a oxide semiconductor layer
164b oxide semiconductor layer
164c oxide semiconductor layer
170 transistor
202 pixel
204 pixel
206 pixel
208 signal line
210 scan line
302 point
304 point
306 dotted line
500 input unit
500_C signal
600 liquid crystal display device
610 control unit
615_C second-order control signal
615_V second-order image signal
620 arithmetic unit
625_C first-order control signal
625_V first-order image signal
630 display portion
631 pixel portion
631a region
631b region
631c region
631p pixel
632 G driver circuit
632_G G signal
633 S driver circuit
633_S S signal
634 pixel circuit
634c(i) capacitor
634c(i+1) capacitor
634t transistor
635 display element
635_1 pixel electrode
635LC liquid crystal element
650 light supply portion
671 arithmetic unit
672 memory unit
673 graphic unit
674 display means
700 display module
701 substrate
702 pixel portion
704 source driver circuit portion
705 substrate
706 gate driver circuit portion
708 FPC terminal portion
710 signal line
711 wiring portion
712 sealing material
716 FPC
717 protective film
734 insulating film
736 coloring film
738 light-blocking film
750 transistor
752 transistor
760 connection electrode
764 insulating film
766 insulating film
768 insulating film
770 planarization insulating film
772 conductive film
774 conductive film
775 liquid crystal element
776 liquid crystal layer
778 structure body
780 anisotropic conductive film
790 capacitor
800 input/output device
801 display module
802 pixel
802B sub-pixel
802G sub-pixel
802R sub-pixel
803c capacitance
803g scan line driver circuit
803t transistor
810 base material
811 wiring
819 terminal
820U sensor unit
821 electrode
822 electrode
823 insulating layer
834 window portion
836 base material
837 protective base material
837p protective layer
839 sensor circuit
850 input device
86'7p anti-reflective layer
872 reflective electrode
880 liquid crystal element
890 protective film
891 FPC terminal portion
900 signal line
901 scan line
902 pixel
903 pixel transistor region
904 leakage of light
905 liquid crystal molecule
906 pixel electrode
907 region
1400 portable information terminal
1401 housing
1402 display portion
1403 operation button
1410 mobile phone device 1411 housing
1412 display portion
1413 operation button
1414 speaker
1415 microphone
1420 music reproducing device
1421 housing
1422 display portion
1423 operation button
1424 antenna
5100 pellet
5120 substrate
5161 region
6201 point
6202 point
6203 line
6301 point
6302 point
6303 point
6304 point
6401 line
6402 line
6403 line
BM light-blocking layer
BR wiring
CS wiring
DATA sensing signal
DL signal line
DL1 signal line
DL2 signal line
DL3 signal line
DL4 signal line
DLi signal line
DLx signal line
FPC1 flexible substrate
FPC2 flexible substrate
GL scan line
GL1 scan line
GL2 scan line
GL3 scan line
GLy scan line
M1 transistor
M2 transistor
M3 transistor
M4 transistor
OUT terminal
PE1 pixel electrode
PE2 pixel electrode
PE3 pixel electrode
PE4 pixel electrode
PEx pixel electrode
RES wiring
Rx arrow
Ry arrow
VPI wiring
VPO wiring
VRES wiring

The invention claimed is:

1. A display device comprising:
  a pixel comprising:
    a transistor comprising an oxide semiconductor in a channel thereof;
    a pixel electrode electrically connected to the transistor; and
    a liquid crystal layer over the pixel electrode; and
  a driver circuit for outputting a signal to the pixel,
  wherein:
    the liquid crystal layer comprises a liquid crystal mixture formed only of materials having a dipole moment of 3 debye or less,
    the liquid crystal layer has a resistivity of $1.0 \times 10^{14}$ (Ω·cm) or more,
    the driver circuit is configured to switch a first mode in which the signal for a moving image is output to the pixel at a frequency of 30 Hz or more, and a second mode in which the signal for a still image is output to the pixel at a frequency of 1 Hz or less, and
    the pixel is configured to display the still image at a frame frequency of 1/30 Hz to 1 Hz.

2. The display device according to claim 1, wherein the oxide semiconductor contains In, Ga, and Zn.

3. The display device according to claim 1, wherein a voltage holding ratio of the pixel is in a range of 98.8% or more and 100% or less.

4. A display module comprising:
  the display device according to claim 1; and
  a touch sensor.

5. An electronic device comprising:
  the display device according to claim 1, and
  an operation key or a battery.

6. A display device comprising:
  a pixel comprising:
    a transistor comprising an oxide semiconductor in a channel thereof;
    a reflective electrode electrically connected to the transistor; and
    a liquid crystal layer over the reflective electrode; and
  a driver circuit for outputting a signal to the pixel,
  wherein:
    the reflective electrode has a projection and a depression,
    the liquid crystal layer comprises a liquid crystal mixture formed only of materials having a dipole moment of 3 debye or less,
    the liquid crystal layer has a resistivity of $1.0 \times 10^{14}$ (Ω·cm) or more,
    the driver circuit is configured to switch a first mode in which the signal for a moving image is output to the pixel at a frequency of 30 Hz or more, and a second mode in which the signal for a still image is output to the pixel at a frequency of 1 Hz or less, and
    the pixel is configured to display the still image at a frame frequency of 1/30 Hz to 1 Hz.

7. The display device according to claim 6, wherein the oxide semiconductor contains In, Ga, and Zn.

8. The display device according to claim 6, wherein a voltage holding ratio of the pixel is in a range of 98.8% or more and 100% or less.

9. A display module comprising:
  the display device according to claim 6, and
  a touch sensor.

10. An electronic device comprising:
  the display device according to claim 6, and
  an operation key or a battery.

* * * * *